United States Patent
Ruggiero et al.

(10) Patent No.: US 6,866,017 B2
(45) Date of Patent: Mar. 15, 2005

(54) METHOD AND SYSTEM FOR ENGINE BRAKING IN AN INTERNAL COMBUSTION ENGINE USING A STROKE LIMITED HIGH PRESSURE ENGINE BRAKE

(75) Inventors: Brian Ruggiero, East Granby, CT (US); Neil Fuchs, New Hartford, CT (US); Zhou Yang, South Windsor, CT (US)

(73) Assignee: Diesel Engine Retarders, Inc., Christiana, DE (US)

( * ) Notice: Subject to any disclaimer, the term of this patent is extended or adjusted under 35 U.S.C. 154(b) by 79 days.

(21) Appl. No.: 10/101,629

(22) Filed: Mar. 21, 2002

(65) Prior Publication Data

US 2002/0174849 A1 Nov. 28, 2002

Related U.S. Application Data

(60) Provisional application No. 60/292,319, filed on May 22, 2001.

(51) Int. Cl.$^7$ ............................................. F02D 13/04
(52) U.S. Cl. ................................... 123/321; 123/90.15
(58) Field of Search ............................... 123/321, 322, 123/90.15, 90.17

(56) References Cited

U.S. PATENT DOCUMENTS

| | | | |
|---|---|---|---|
| 3,220,392 A | 11/1965 | Cummins | |
| 4,395,884 A | 8/1983 | Price | |
| 4,474,006 A | 10/1984 | Price et al. | |
| 4,697,558 A | * 10/1987 | Meneely | ...................... 123/321 |
| 4,793,307 A | * 12/1988 | Quenneville et al. | ....... 123/323 |
| 5,012,778 A | 5/1991 | Pitzi | |
| 5,410,882 A | 5/1995 | Davies et al. | |
| 5,540,201 A | 7/1996 | Feucht et al. | |
| 5,615,653 A | 4/1997 | Faletti et al. | |
| 5,735,242 A | 4/1998 | Kahlenbeck et al. | |
| 5,813,231 A | 9/1998 | Faletti et al. | |
| 5,839,281 A | 11/1998 | Sumser et al. | |
| 6,134,890 A | 10/2000 | Church et al. | |
| 6,148,793 A | 11/2000 | Faletti et al. | |
| 6,170,474 B1 | 1/2001 | Israel | |
| 6,205,975 B1 | 3/2001 | Ruedin et al. | |
| 6,220,032 B1 | 4/2001 | Schmidt et al. | |
| 6,293,248 B1 | * 9/2001 | Zsoldos et al. | .............. 123/321 |
| 6,394,067 B1 | * 5/2002 | Usko et al. | ................. 123/321 |
| 6,510,824 B2 | * 1/2003 | Vorih et al. | .............. 123/90.12 |

OTHER PUBLICATIONS

A. Flotho et al., New Engine Brake Systems for Commercial Vehicles (1999).

* cited by examiner

Primary Examiner—John T. Kwon
(74) Attorney, Agent, or Firm—Collier Shannon Scott PLLC

(57) ABSTRACT

The present invention is directed to an engine braking assembly and method for producing a bleeder braking event in an engine having at least one engine valve, at least one engine cylinder, and intake and exhaust manifolds. The engine braking assembly comprises an engine housing, having a hydraulic circuit formed therein; a high-pressure fluid source adapted to store high-pressure fluid therein; a valve for controlling the flow of the high-pressure fluid, in communication with the high-pressure fluid source through the hydraulic circuit; a control device for selectively controlling the valve; and a valve actuation assembly in communication with the valve through the hydraulic circuit, wherein the valve actuation assembly receives the high-pressure fluid through the valve and wherein the hydraulic force created by the high-pressure fluid actuates and holds open the at least one engine valve to produce the bleeder braking event.

14 Claims, 43 Drawing Sheets

METHOD AND SYSTEM FOR ENGINE BRAKING IN AN INTERNAL COMBUSTION ENGINE USING A STROKE LIMITED HIGH PRESSURE ENGINE BRAKE

CROSS REFERENCE TO RELATED PATENT APPLICATION

This application claims priority on U.S. Provisional Patent Application Ser. No. 60/292,319, for Method and System For Engine Braking in an Internal Combustion Engine With Exhaust Pressure Regulation and Turbocharger Control, file May 22, 2001, and U.S. patent application Ser. No. 09/960,386, now U.S. Pat. No. 6,594,996 for Method and System For Engine Braking in an Internal Combustion Engine With Exhaust Pressure Regulation and Turbocharge Control, filed Sep. 24, 2001.

FIELD OF THE INVENTION

The present invention relates generally to a system and method for engine braking in internal combustion engines. In particular, the present invention relates to an engine braking system and method for producing main, compression-release, bleeder, exhaust gas recirculation, and/or other auxiliary engine valve events using a stroke-limited, high-pressure engine brake.

BACKGROUND OF THE INVENTION

Flow control of exhaust gas through an internal combustion engine has been used in order to provide vehicle engine braking. Generally, engine braking systems may control the flow of exhaust gas to incorporate the principles of compression-release type braking, exhaust gas recirculation, exhaust pressure regulation, and/or bleeder type braking.

The operation of a compression-release type engine brake, or retarder, is well known. During engine braking, the exhaust valves may be selectively opened to convert, at least temporarily, a power producing internal combustion engine into a power absorbing air compressor. As a piston travels upward during its compression stroke, the gases that are trapped in the cylinder are compressed. The compressed gases oppose the upward motion of the piston. During engine braking operation, as the piston approaches the top dead center (TDC), at least one exhaust valve is opened to release the compressed gases in the cylinder to the exhaust manifold, preventing the energy stored in the compressed gases from being returned to the engine on the subsequent expansion down-stroke. In doing so, the engine develops retarding power to help slow the vehicle down. An example of a prior art compression release engine brake is provided by the disclosure of the Cummins, U.S. Pat. No. 3,220,392 (November 1965), which is hereby incorporated by reference.

The principles of exhaust gas recirculation (EGR) are also well known. An EGR system allows a portion of the exhaust gases to flow back into the engine cylinder and is primarily used to reduce the amount of $NO_x$ created by the engine during positive power operations. An EGR system can also be used to control the pressure and temperature in the exhaust manifold and engine cylinder during engine braking cycles. Generally, there are two types of EGR systems, internal and external. External EGR systems recirculate exhaust gases back into the engine cylinder through an intake valve(s). Internal EGR systems recirculate exhaust gases back into the engine cylinder through an exhaust valve(s).

Furthermore, control of EGR may be achieved by selectively varying the levels of exhaust back pressure using Exhaust Pressure Regulation (EPR). By controlling EGR with EPR, the levels of pressure and temperature in the exhaust manifold and engine cylinders may be maintained such that optimal degrees of engine braking are attained at any engine speed. An example of a method and system for optimizing engine braking using EGR and EPR is provided by the disclosure of Israel, U.S. Pat. No. 6,170,474 (Jan. 9, 2001) for Method and System For Controlled Exhaust Gas Recirculation in an Internal Combustion Engine With Application to Retarding and Powering Function, which is hereby incorporated by reference.

The operation of a bleeder type engine brake has also long been known. During engine braking, in addition to the normal exhaust valve lift, the exhaust valve(s) may be held slightly open continuously throughout the remaining engine cycle (full-cycle bleeder brake) or during a portion of the cycle (partial-cycle bleeder brake). The primary difference between a partial-cycle bleeder brake and a full-cycle bleeder brake is that the former does not have exhaust valve lift during most of the intake stroke.

Usually, the initial opening of the braking valve(s) in a bleeder braking operation is far in advance of the compression TDC (i.e., early valve actuation) and then lift is held constant for a period of time. As such, a bleeder type engine brake requires much lower force to actuate the valve(s) due to early valve actuation, and generates less noise due to continuous bleeding instead of the rapid blow-down of a compression-release type brake. Moreover, bleeder brakes often require fewer components and can be manufactured at lower cost. Thus, an engine bleeder brake can have significant advantages.

Despite these advantages, however, bleeder type engine brakes have not been widely used because they typically produce less braking power than the compression-release type brakes in heavy duty diesel engines with a conventional fixed geometry turbocharger (FGT). This reduced braking power occurs especially at low and moderate engine speeds.

With the introduction of variable geometry turbochargers (VGT), however, bleeder brakes become a more attractive option. Through the use of VGT, both the intake and exhaust manifold pressures may be much higher than those produced using conventional FGT. These increased pressures may correspond to greatly improved bleeder brake performance, especially at low and moderate engine speeds.

The prior art methods and systems do not disclose incorporating VGT to improve bleeder braking performance. For example, Faletti et al., U.S. Pat. No. 6,148,793 (Nov. 21, 2000), discloses a compression-release type braking system utilizing a variable geometry turbocharger, but does not disclose a bleeder braking system using VGT for optimizing engine braking. Similarly, Church et al., U.S. Pat. No. 6,134,890 (Oct. 24, 2000), discloses a method for controlling VGT for providing precise control of turbo boost pressure. The >890 patent does not, however, disclose a system and method utilizing VGT to control exhaust back pressure for improving bleeder braking performance.

Also, Price et al., U.S. Pat. No. 4,395,884 (Aug. 2, 1983) and U.S. Pat. No. 4,474,006 (Oct. 2, 1984), disclose principles similar to those of a variable geometry turbo to control engine braking, but do not disclose methods and systems of engine bleeder braking using VGT. In addition, A. Flotho et al., New Engine Brake Systems for Commercial Vehicles (1999), which is hereby incorporated by reference, discloses a two-stage turbocharger adapted to enhance engine braking, but the geometry of the turbocharger is not variable. Accordingly, there is a significant need for a method and system for engine braking in an internal combustion engine with VGT that captures the inherent advantages of bleeder braking operation and provides improved bleeder braking performance.

Current variable geometry turbochargers typically include a mechanical stop that prevents the geometry (vanes) of the VGT from fully closing. This is so because, once the vanes are fully closed, the significant pressure gradient across the VGT creates control instability and prevents the vanes from being re-opened. The mechanical stop of most VGTs is based on optimum engine positive power operation, and is usually not optimum for engine braking. This means that the increased exhaust manifold pressures created below this position, and, thus, opportunities for improved engine braking, may be forfeited.

None of the prior art methods and systems teach or suggest minimizing the pressure gradient across the VGT to avoid control instability and maximize the VGT geometry variation range. Accordingly, there is an additional need for a method and system for controlling engine braking in an internal combustion engine with VGT that captures the advantages of bleeder braking operation but eliminates or reduces the limitations caused by the mechanical stop features of conventional variable geometry turbochargers. FIG. 1 illustrates an example of a comparison between improved bleeder brake performance results in a full-cycle bleeder braking system with VGT according to the present invention obtained by the present Assignee and performance using conventional VGTs with the mechanical stop limitation.

In addition, the braking performance of a bleeder braking system can be further optimized by using EGR and EPR to tune exhaust back pressure. By combining EGR and EPR with fully operational VGT, the levels of pressure and temperature in the exhaust manifold and engine cylinders may be maintained such that optimal degrees of engine braking are attained at any engine speed. None of the prior art systems and methods, of which the present inventors are aware, teach or suggest this combination.

The systems and methods of the present invention respond to the needs left unanswered by the prior art. The present invention provides systems and methods for improving bleeder brake performance using any combination of turbocharger control, EGR, and EPR. The present invention further provides systems and methods for eliminating or reducing the limitations caused by the mechanical stop features of conventional VGT so that the VGT variation range may be extended for wider application in both engine braking and positive power operations. In addition, the present invention provides improved mechanisms and devices to achieve a bleeder braking cycle.

OBJECTS OF THE INVENTION

It is, therefore, an object of the present invention to overcome the shortcomings present in known engine bleeder braking systems and methods.

It is an object of the present invention to improve performance of an engine braking system using turbocharger control.

It is another object of the present invention to improve performance of a bleeder brake system using VGT.

Another object of the present invention is to control the pressure gradient across a VGT turbine in order to avoid VGT control instability problems.

It is another object of the present invention to move the minimum hard stop in VGTs to a more closed position or eliminate the minimum hard stop altogether such that the VGT variation range may be extended for a wider application in both engine braking and positive power operations.

It is another object of the present invention to control the exhaust manifold pressure using a combination of VGT, pressure regulation valve(s), and/or a bleeder brake.

It is another object of the present invention to control the exhaust manifold temperature using a combination of VGT, pressure regulation valve(s), and/or a bleeder brake.

It is yet another object of the present invention to initialize a bleeder brake event with valve float (valve separating from its seat) controlled by EPR.

Another object of the present invention is to control EGR using EPR, VGT, and/or a bleeder brake.

Still another object of the present invention is to optimize bleeder braking performance at all engine speeds, especially at low and moderate engine speeds, without exceeding engine operating limits at high engine speeds.

It is another object of the present invention to provide an engine braking system that generates less noises than known engine braking systems.

Another object of the present invention is to provide an engine system that reduces the amount of $NO_x$ created by the engine.

Another object of the present invention is to provide a control method and system for engine bleeder braking using EGR, EPR, and VGT control.

Yet another object of the present invention is to provide various valve actuation subsystems for use in a bleeder brake engine braking system.

It is another object of the present invention to provide an engine braking assembly that uses high-pressure fluid to actuate at least one engine valve during an engine braking event.

Another object of the present invention is to provide a bleeder brake system using a high-pressure bleeder brake assembly.

Additional objects and advantages of the present invention are set forth, in part, in the description which follows, and, in part, will be apparent to one of ordinary skill in the art from the description and/or from the practice of the invention.

BRIEF SUMMARY OF THE INVENTION

The present invention is directed to a system for producing a bleeder braking event in an engine having at least one engine valve, at least one engine cylinder, and intake and exhaust manifolds. The engine braking assembly comprises an engine housing, having a hydraulic circuit formed therein; a high-pressure fluid source adapted to store high-pressure fluid therein; valve means for controlling the flow of the high-pressure fluid, in communication with the high-pressure fluid source through the hydraulic circuit; control means for selectively controlling the valve means; and a valve actuation assembly in communication with the valve means through the hydraulic circuit, wherein the valve actuation assembly receives the high-pressure fluid through the valve means and wherein the hydraulic force created by the high-pressure fluid actuates and holds open the at least one engine valve to produce the bleeder braking event.

In accordance with the present invention, the valve actuation assembly may include a piston housing secured on the engine housing; a piston adapted to move within the piston housing, wherein the hydraulic force created by the high-pressure fluid causes the piston to actuate and hold open the at least one engine valve during the braking event; and a return spring, having a first end secured to the piston housing and a second end secured to the piston. The return spring biases the piston away from the at least one engine valve when the braking event is disabled.

In accordance with the present invention, the engine braking assembly may further include means for regulating the pressure of at least one of the intake and exhaust manifolds and creating a force differential across the at least one engine valve. The pressure regulating means may include: a turbocharger connected to the intake and exhaust manifolds, wherein the turbocharger is adapted to change the flow of exhaust gases through the turbocharger; and a pressure regulation valve coupled to at least one of the intake and exhaust manifolds.

The present invention is also directed to a method for controlling a bleeder braking event in an engine having at least one engine valve, at least one engine cylinder, and intake and exhaust manifolds. The method includes the steps of: supplying high-pressure fluid from a high-pressure fluid source to a valve assembly; selectively activating the valve assembly to communicate the high-pressure fluid to a valve actuation assembly; actuating and holding open the at least one engine valve with the hydraulic force created by the high-pressure fluid communicated to the valve actuation assembly to create the bleeder braking event; and releasing the high-pressure fluid when the bleeder braking event is disabled.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

The present invention will now be described in connection with the following figures in which like reference numbers refer to like elements and wherein.

DETAILED DESCRIPTION OF THE INVENTION

Reference will now be made in detail to a preferred embodiment of the engine system 10 of the present invention, an example of which is illustrated in the accompanying drawings.

Figure 1:
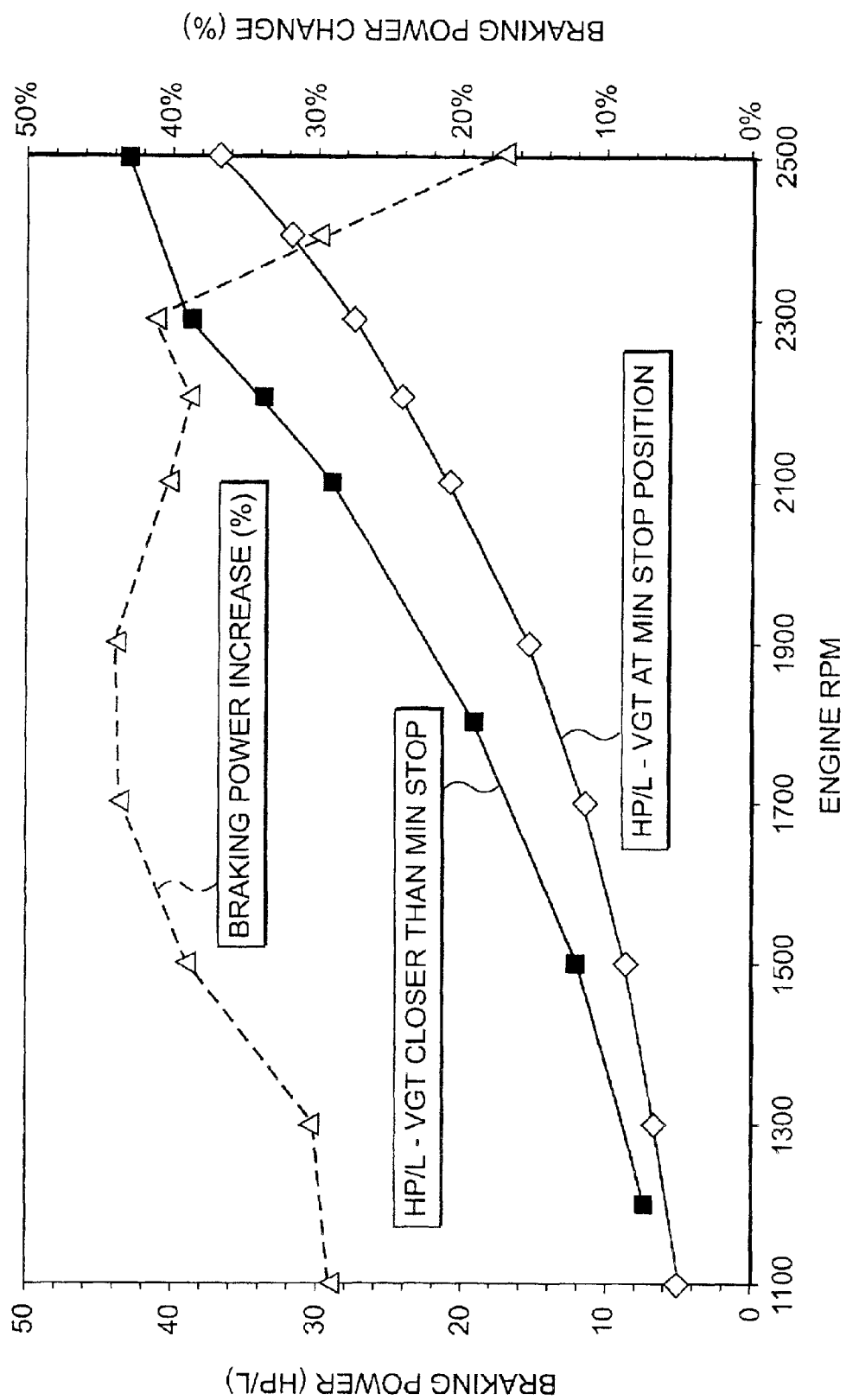
FIG. 1 is a graph illustrating a comparison between improved bleeder brake performance according to the present invention and performance by a braking system using conventional VGT with a mechanical stop limitation.
Figure 2:
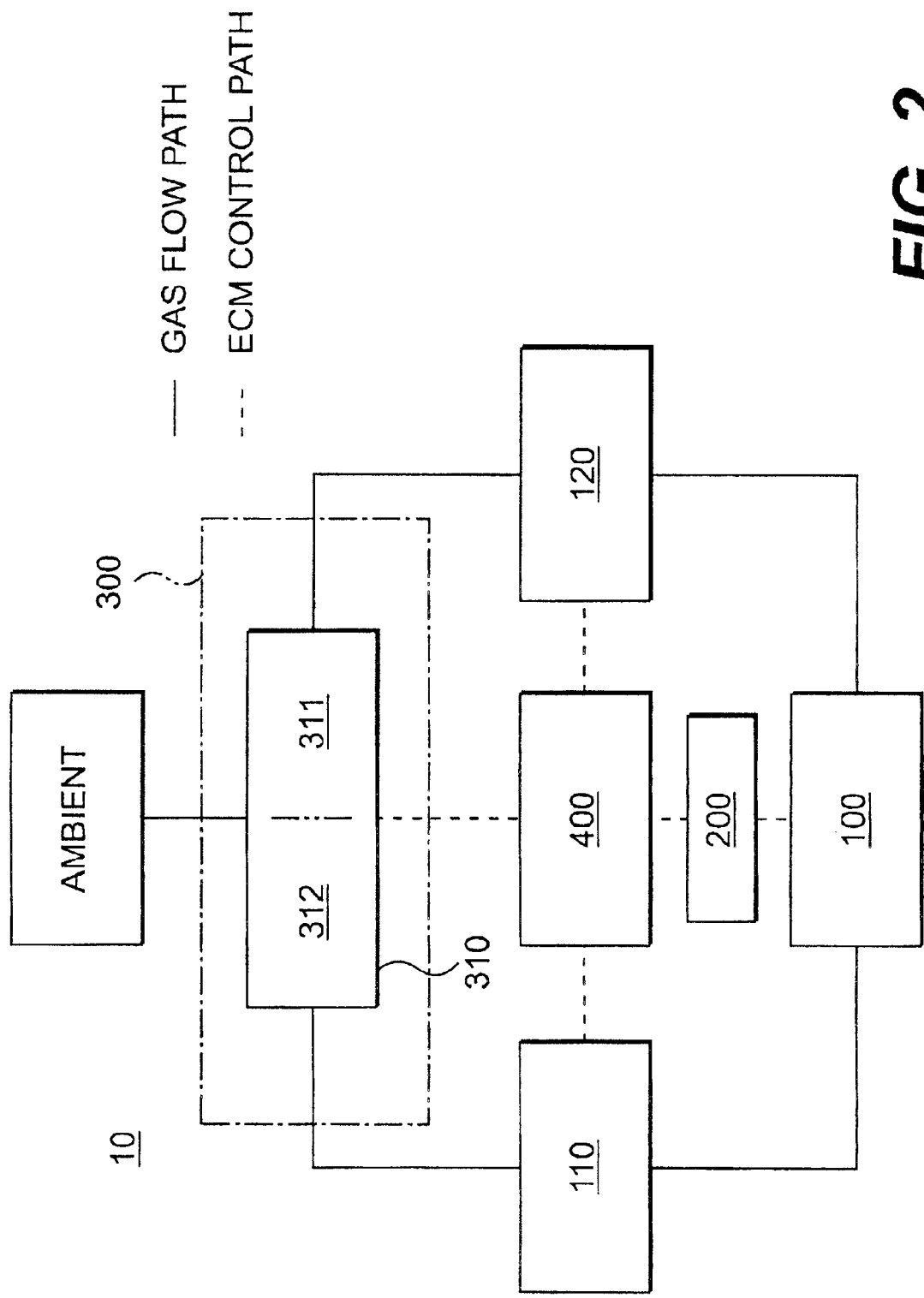
FIG. 2 is a schematic diagram illustrating the general relationship of the engine braking components according to the present invention.

FIG. 2 illustrates the general relationship of engine components in the internal combustion engine system 10. The engine system 10 includes an engine block 100 connected to an intake manifold 110 and an exhaust manifold 120. The engine block 100 includes at least one intake and at least one exhaust valve (not shown). The engine system 10 further includes a valve actuation subsystem 200, pressure regulation means 300, a turbocharger 310, and engine control means 400.

The actuation of the exhaust valve and/or the intake valve of the present invention can be controlled as required by the valve actuation subsystem 200. In the preferred embodiment of the present invention, the valve actuation subsystem 200 opens the at least one engine valve to produce a bleeder braking event. It is contemplated, however, that the valve actuation subsystem 200 may be used for producing main, compression-release, exhaust gas recirculation, and/or other auxiliary engine valve events. The actuation subsystem 200 may comprise various hydraulic, hydro-mechanical, pneumatic, electromagnetic, and/or other actuation means, which will be discussed in detail below.

As will be apparent to those of ordinary skill in the art, the turbocharger 310 includes a turbine 311 and a compressor 312. The pressure from normally wasted engine exhaust gasses causes the turbine 311 to rotate. As the turbine 311 rotates, it drives the compressor 312 which is coupled to the turbine 311. The rotating compressor 312 creates a high volume of air at increased pressure (turbo boost pressure) which develops increased power during combustion.

In the preferred embodiment of the present invention, the turbocharger 310 is a variable geometry turbocharger (VGT). A VGT has movable components (geometry) that can change the area of the turbocharger through which engine exhaust gases flow. In the preferred embodiment of the present invention, the geometry of the turbocharger 310 is varied by changing the vane position, which generates a different air flow passage (or resistance) through which the exhaust gases flow. There are several known embodiments for a variable geometry turbocharger, such as, for example, the swing-vane type and the sliding-vane type, and it is contemplated that the present invention could use any of these and/or new VGTs developed by the Assignee or others. Other embodiments of the turbocharger 310, including, but not limited to, a dual entry fixed geometry turbocharger (FGT) with a diverter mechanism, and/or any system or device which could control the flow area and/or direction of the exhaust gases, are considered well within the scope of the present invention.

The engine control means (ECM) 400 may control the valve actuation subsystem 200, the turbocharger 310, and the pressure regulation means 300 such that the desired level of engine braking is achieved and the level of pressure and/or temperature in the exhaust manifold 120 and/or the engine cylinder does not exceed predetermined limits dictated by the design and materials making up the components of the engine 100. The ECM 400 may include a computer and may be connected to sensors through any connection means, such as electrical wiring or gas passageways, to the engine cylinder, the intake manifold 110, the exhaust manifold 120, or any other part of the engine system. The ECM 400 may also be connected to an appropriate engine component, such as a tachometer, capable of providing the ECM 400 with a measurement of engine speed and/or other engine parameters.

In general, the gas flow path of the engine system 10 is illustrated by the solid line shown in FIG. 2. During engine positive power cycles, intake air flows through the intake manifold 110 and enters the engine cylinder through the at least one intake valve during the intake stroke. The air is mixed with fuel in the engine cylinder and the mixture is used by the engine 100 to generate power. The combustion gases are then discharged from the engine 100 through the exhaust manifold 120. The exhausted gases enter and drive the turbine 311 of the turbocharger 310, which is coupled to the compressor 312. The compressor 312 provides a high volume of air into the intake manifold 110 at increased pressure. The pressurized air is forced into the engine 100, and because of the increased weight of the compressed air, more fuel can be scheduled to produce more horsepower from the engine. During engine braking cycles, the pressurized air through the compressor 312 of the turbocharger 310 increases the boost level. The increased boost pressure increases the retarding force against which engine pistons must work and, thus, the engine braking power.

It should be noted that the exhaust gases (air during braking) may flow back into the engine cylinder and/or intake manifold 110 from the exhaust manifold 120. This process is called exhaust gas recirculation (EGR). As discussed above, EGR may be used to control engine emission (through $NO_x$ reduction) during engine power operation and to improve engine retarding during engine braking operation.

The pressure regulation means 300 may be provided by various means for regulating the pressure in the exhaust manifold 120. The pressure regulation means 300 may be used to reduce the pressure drop across the turbine 311 of the turbocharger 310 when the VGT gap position needs to be opened from the fully closed position (or nearly fully closed position) without any mechanical control problems associated with re-opening it.

Figure 13:
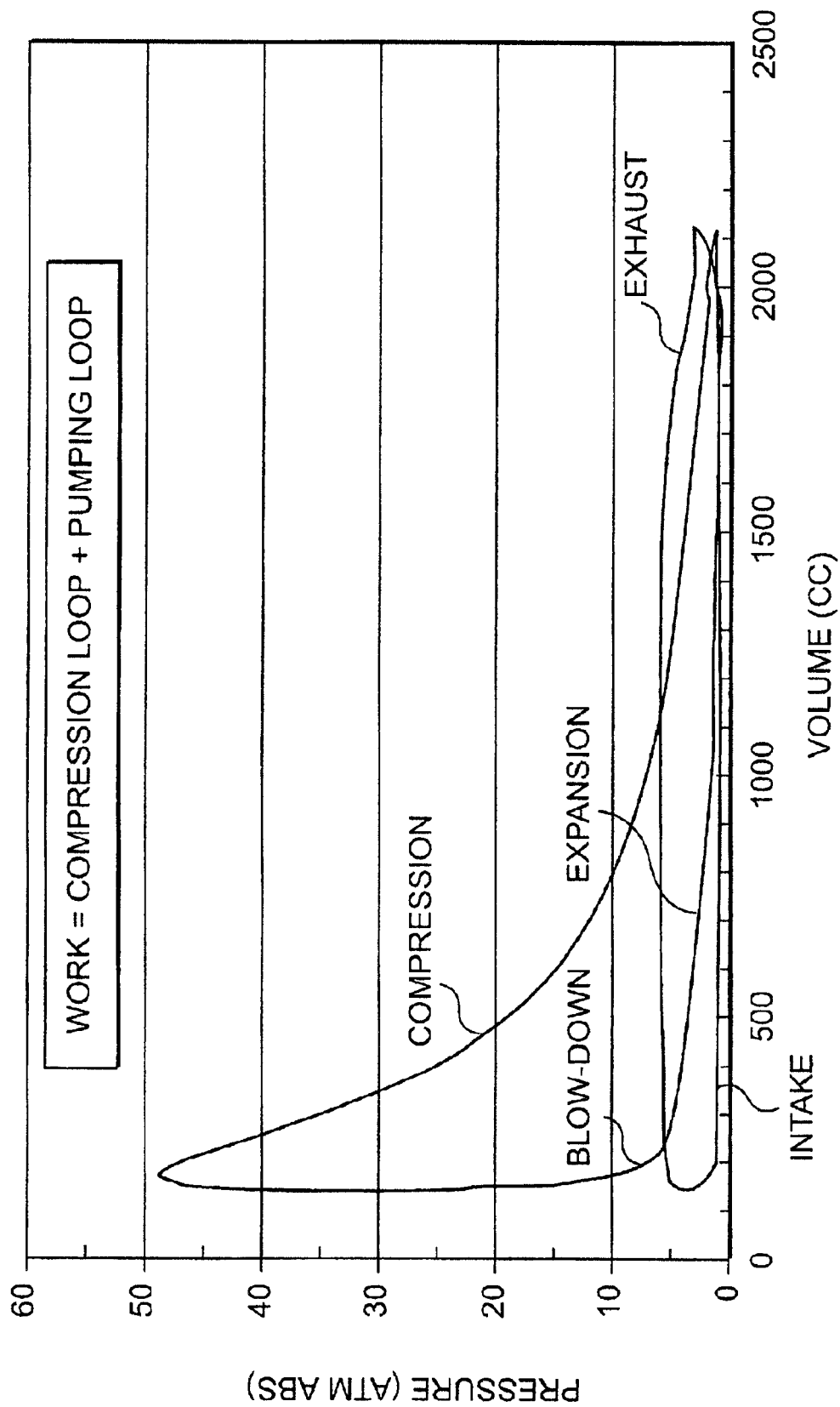
FIG. 13 is a pressure-volume graph illustrating higher engine braking from increased pumping work according to an embodiment of the present invention.

In addition, the pressure regulation means 300 may provide for optimum engine braking for all engine speeds by controlling the pressure and temperature in the exhaust manifold 120, the turbo speed, and, thus, the intake boost pressure. The pressure in the exhaust manifold 120 is the most important parameter for a bleeder braking system, especially at moderate and low engine speeds when the intake boost pressure is low. Higher exhaust manifold pressure improves bleeder braking performance in two ways. First, the higher exhaust manifold pressure increases the pumping work during the exhaust and intake strokes. FIG. 13 is a pressure-volume graph illustrating higher engine braking from increased pumping work according to the present invention. Second, the higher pressure in the exhaust manifold 120 increases EGR to back charge the cylinder (exhaust boost) to generate higher compression release braking power.

The various embodiments of the pressure regulation means 300 will now be described with reference to FIGS. 3–7. In the preferred embodiment, the pressure regulation means 300 includes a pressure regulation valve 350.

Figure 3:
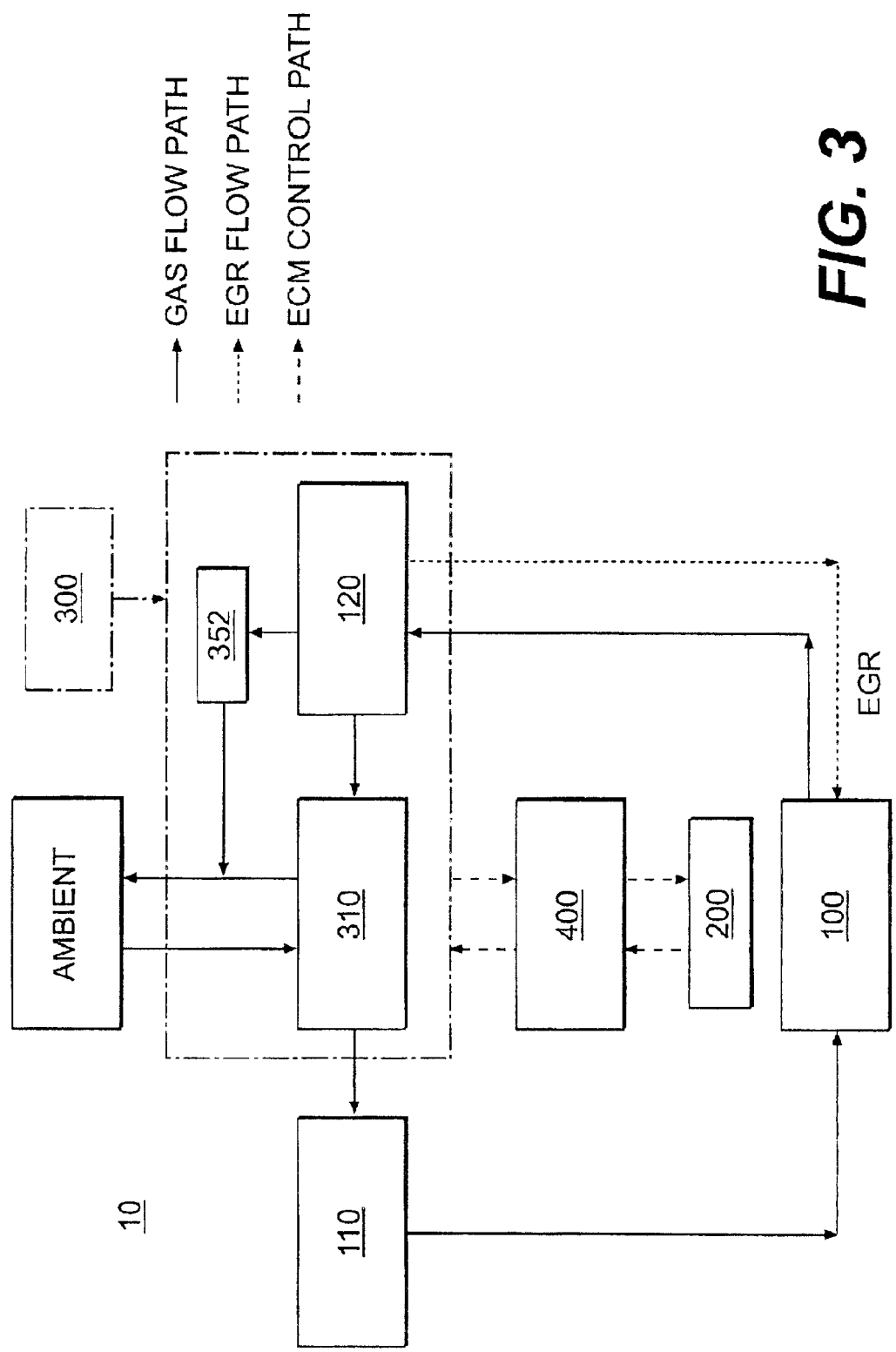
FIG. 3 is a schematic diagram illustrating exhaust pressure regulation according to a first embodiment of the present invention.

In one embodiment of the present invention, as shown in FIG. 3, the pressure regulation valve 350 is a waste gate 352 coupled to the exhaust manifold 120 and located before the turbine 311 portion of the turbocharger 310. In this position, the waste gate 352 controls the pressure drop across the turbine 311 by changing the pressure upstream from the turbocharger 310 (i.e., the pressure in the exhaust manifold 120). By opening the waste gate 352, exhaust gases are allowed to bypass the turbocharger 310 and the pressure drop across the VGT can be controlled. In one embodiment of the present invention the waste gate 352 is a variable flow waste gate. As such, the ECM 400 may control the waste gate 352 to provide the required pressure drop across the turbine 311 to avoid VGT mechanical instability. In addition, the ECM 400 may control the waste gate 352 to provide a pressure level in the exhaust manifold 120 for optimum engine performance.

In addition to controlling the pressure drop across the turbine 311 to facilitate a wider VGT variation range, and, correspondingly, improved bleeder braking performance, the pressure regulation means 300 and/or the turbocharger 310 may provide for internal EGR through the at least one exhaust valve. During exhaust gas recirculation, exhausted gases (air during braking) from the exhaust manifold 120 flow back into the engine cylinder through the at least one exhaust valve. In this manner, the pressure and temperature of the exhaust manifold 120 and the engine cylinder may be controlled for better engine braking and/or lower $NO_x$ emission.

Figure 4:
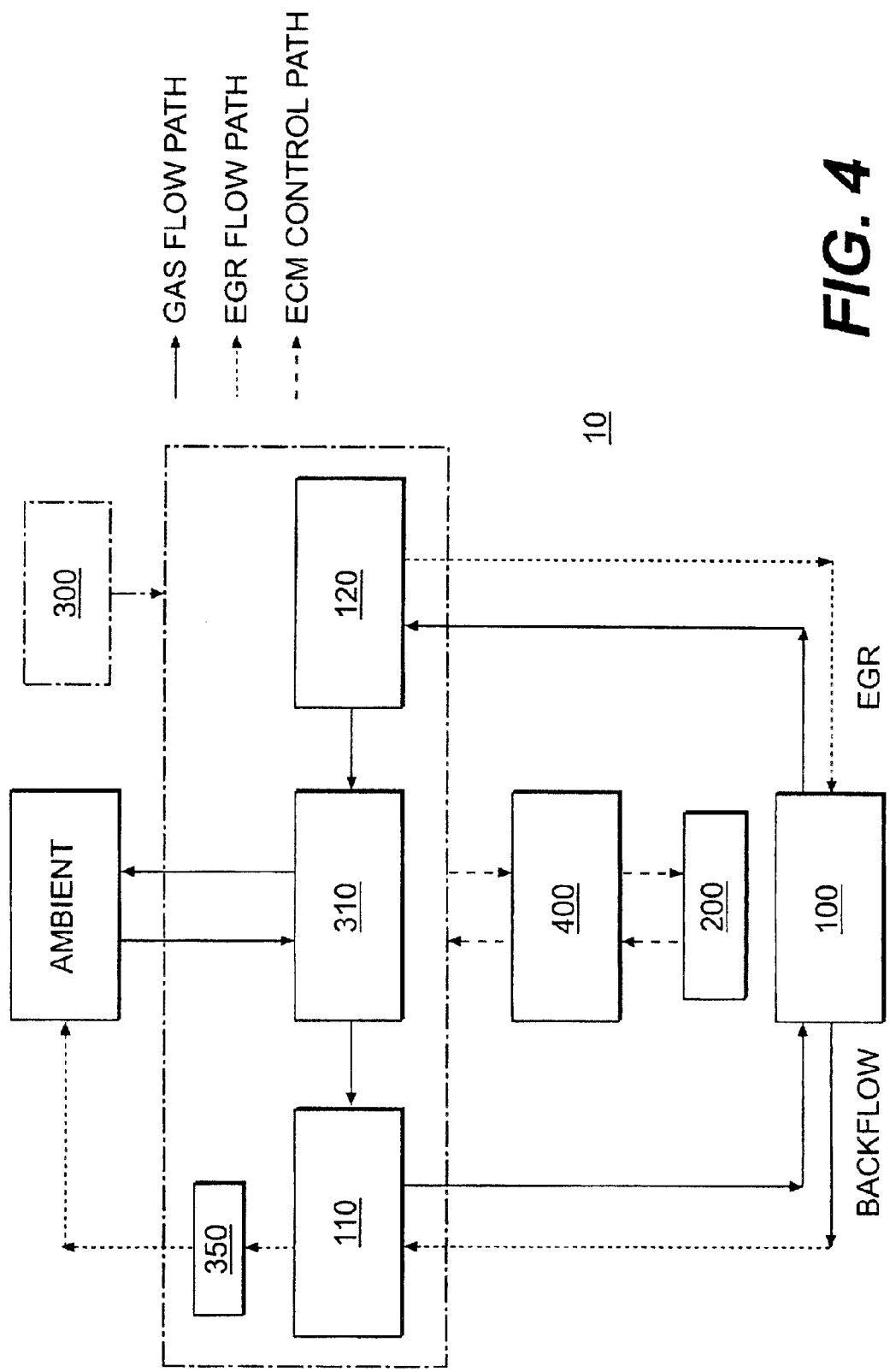
FIG. 4 is a schematic diagram illustrating exhaust pressure regulation according to a second embodiment of the present invention.

In another embodiment of the present invention, as shown in FIG. 4, the pressure regulation valve 350 is coupled to the intake manifold 110. In this position, the pressure regulation valve 350 controls the pressure in the exhaust manifold 120, and thus, the pressure drop across the turbine 311 by changing the pressure in the intake manifold 110. The control of the pressure drop across the turbine 311 may be accomplished in two ways. First, because the pressure in the exhaust manifold 120 is coupled with the intake boost pressure through the turbocharger 310, a lower boost pressure will lead to a lower turbo speed. This, in turn, leads to a lower pressure gradient across the turbine 311.

Second, where the engine braking system 10 is a bleeder braking system, such as, for example, a full-cycle bleeder brake, the exhaust manifold 120 is in direct communication with the intake manifold 110 through engine valve overlap during the bleeder cycle. Engine valve overlap occurs when both the at least one intake valve and the at least one exhaust valve are open at the same time. By opening the pressure regulation valve 350, the exhaust gases (air during braking) in the exhaust manifold 120 may flow back into the engine cylinder through the exhaust valve(s), and then into the intake manifold 110 through the intake valve(s). This back flow causes the pressure in the exhaust manifold 120, and thus, the pressure gradient across the turbine 311, to be reduced, leading to improved VGT control stability.

In addition, the pressure regulation valve 350 may provide for an internal EGR event through the intake bleeder. During exhaust gas recirculation, the exhausted gases (air during braking) from the exhaust manifold 120 flow back into the engine cylinder through the at least one exhaust valve. In this manner, the pressure and temperature of the exhaust manifold 120 and the engine cylinder may be controlled for better engine braking and/or lower $NO_x$ emission of the engine 100.

Operation of the pressure regulation valve 350 in the intake manifold 110 has several additional advantages over prior known systems. Because the pressure regulation valve 350 is located in the intake manifold 110, it is subjected to lower temperatures, and, thus, is less susceptible to durability problems. Moreover, because the pressure regulation valve 350 discharges directly to the ambient, the engine braking system 10 does not require additional manifold piping to bypass the turbocharger 310 and is simpler and less expensive to produce.

Figure 5:
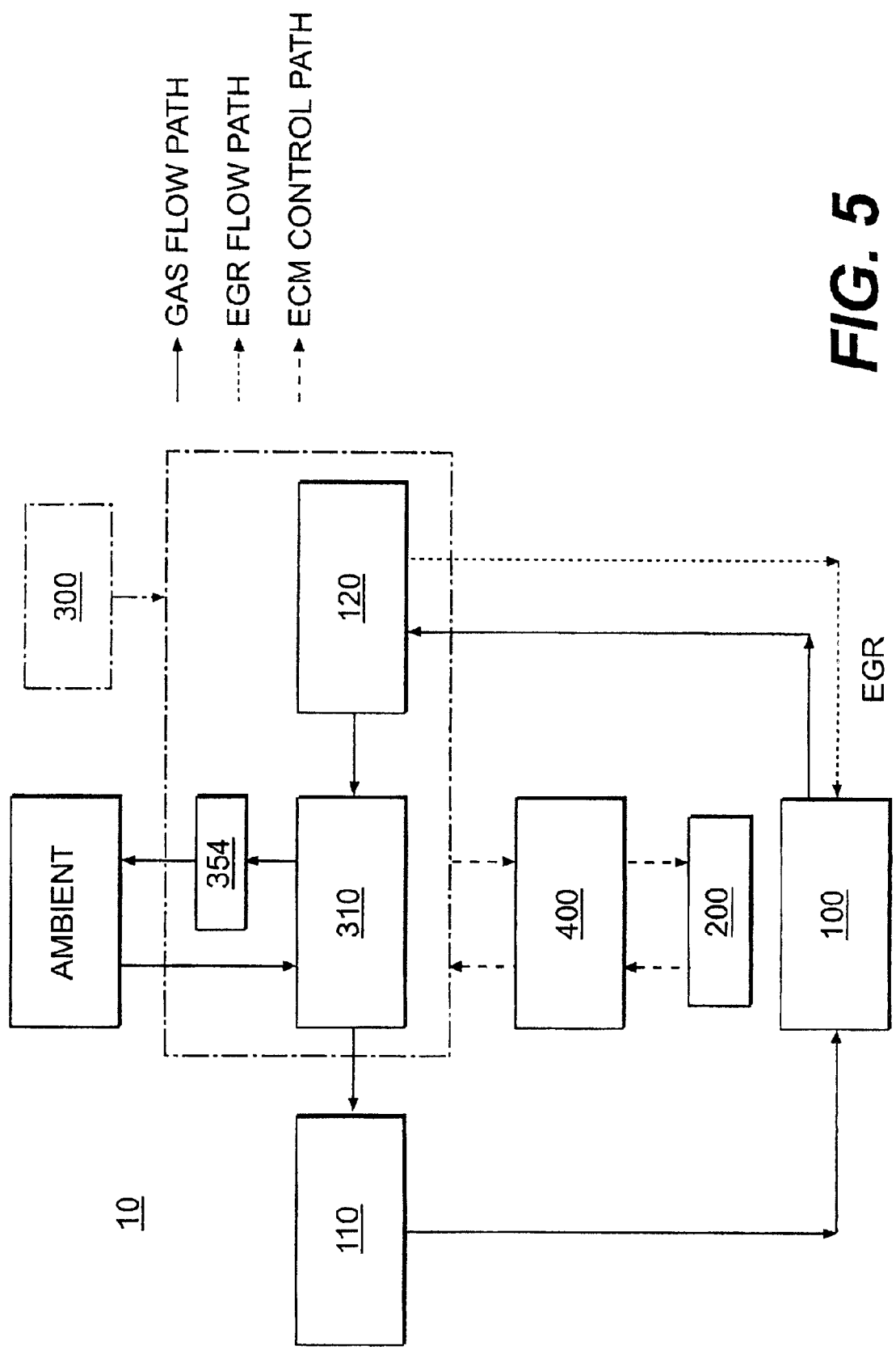
FIG. 5 is a schematic diagram illustrating exhaust pressure regulation according to a third embodiment of the present invention.

In another embodiment of the present invention, as shown in FIG. 5, the pressure regulation valve 350 is an exhaust restrictor 354 located after the turbine 311 portion of the turbocharger 310. The exhaust restrictor 354 may be located, for example, in exhaust piping downstream of the turbine 311. In this position, the exhaust restrictor 354 of the present invention controls the pressure drop across the turbine 311 by changing the pressure downstream from the turbocharger 310 (i.e., the exhaust exit back pressure). In one embodiment, the exhaust restrictor 354 is a controllable, variable-size exhaust brake. Other embodiments of the exhaust restrictor 354, however, are considered well within the scope of the present invention.

In addition, the exhaust restrictor 354, along with the turbocharger 310, may provide for an internal EGR event. During exhaust gas recirculation, exhausted gases (air during braking) from the exhaust manifold 120 flow back into the engine cylinder through the at least one exhaust valve. In this manner, the pressure and temperature of the exhaust manifold 120 and the engine cylinder may be controlled for better engine braking and/or lower $NO_x$ emission of the engine 100.

Figure 6:
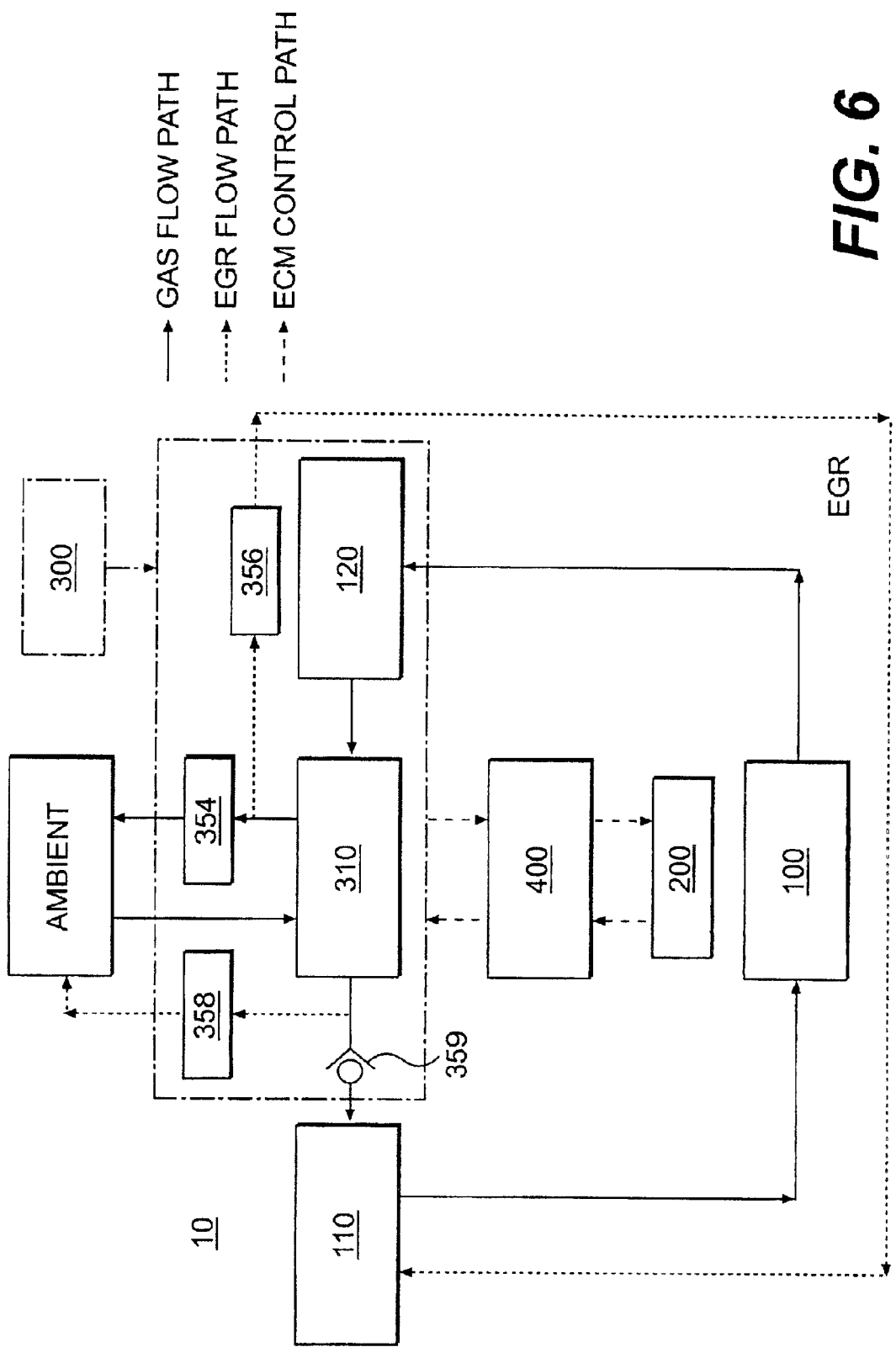
FIG. 6 is a schematic diagram illustrating exhaust pressure regulation according to a fourth embodiment of the present invention.

In another embodiment of the present invention, as shown in FIG. 6, a first pressure regulation valve 350 is an exhaust restrictor 354 located downstream of the turbine 311 portion of the turbocharger 310. In this position, the exhaust restrictor 354 controls the pressure drop across the turbine 311 by changing the pressure downstream from the turbocharger 310 (i.e., exhaust exit back pressure). In addition, an EGR valve 356 placed downstream of the turbocharger 310 but upstream of the exhaust restrictor 354 provides a low-pressure-loop external EGR event such that hot braking gas can cool and flow back into the intake manifold 110 through an externally cooled EGR passage. The EGR valve 356 also prevents the turbocharger 311 from stalling, which would eliminate any intake boost.

Moreover, the exhaust restrictor 354 and the EGR valve 356 may be tuned for braking optimization (for different engine speeds or different braking levels). In addition, during positive power cycles, EGR optimization (for different engine speeds and loads) for emission reduction can be achieved by tuning the exhaust restrictor 354 and the EGR valve 356 (from fully open to fully closed) for different levels of EGR, turbo operation, and boost.

The pressure regulation means 300 may further include a second pressure regulation valve 358 downstream of the compressor 312 of the turbocharger 310 and a one-way check valve 359 located between the intake manifold 110 and the compressor 312 to control back flow due to EGR and prevent compressor problems, such as compressor surge.

Figure 7:
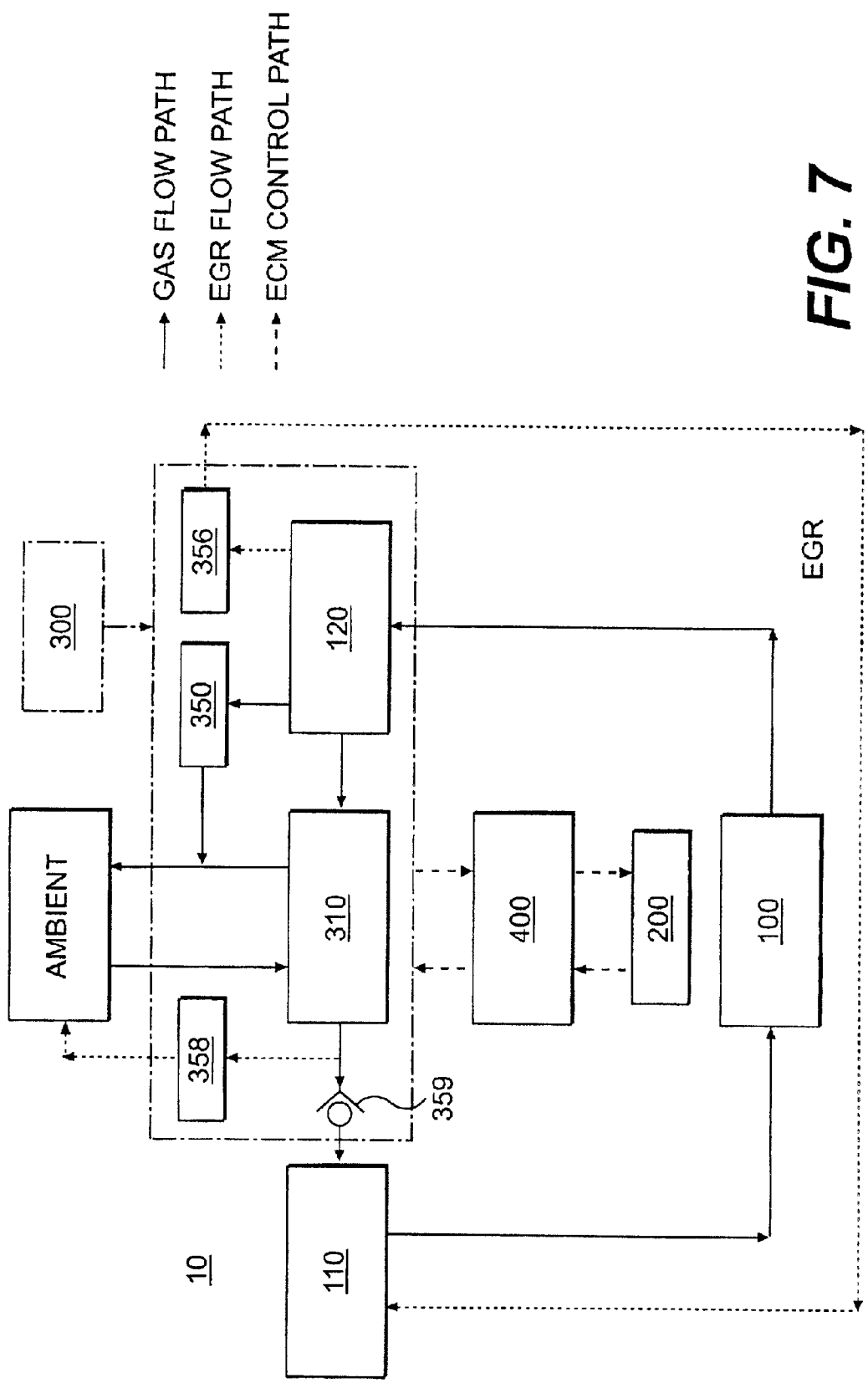
FIG. 7 is a schematic diagram illustrating exhaust pressure regulation according to a fifth embodiment of the present invention.

In a similar embodiment, as shown in FIG. 7, a first pressure regulation valve 350 and the EGR valve 356 may be placed upstream from the turbocharger 310. In this manner, a high-pressure-loop external EGR event is created. The pressure regulation means 300 may further include a second pressure regulation valve 358 downstream of the compressor 312 of the turbocharger 310 and a one-way check valve 359 located between the intake manifold 110 and the compressor 312 to control back flow due to EGR and prevent compressor problems, such as compressor surge.

The pressure in the exhaust manifold 120, and thus, the pressure gradient across the turbine 311 may be controlled in the same manner as described with reference to the embodiment of the present invention shown in FIG. 3 for better engine braking and/or lower $NO_x$ emission.

It is contemplated by the present inventors that the turbocharger 310 is not limited to a VGT-type turbocharger. In another embodiment of the present invention, the turbocharger 310 may be a dual entry fixed geometry turbocharger (FGT) and may be combined with a diverter mechanism such that the exhaust flow can be directed to one portion of the turbine 311 of the turbocharger 310 to achieve the same effects as by closing a variable geometry turbocharger.

Figure 12:
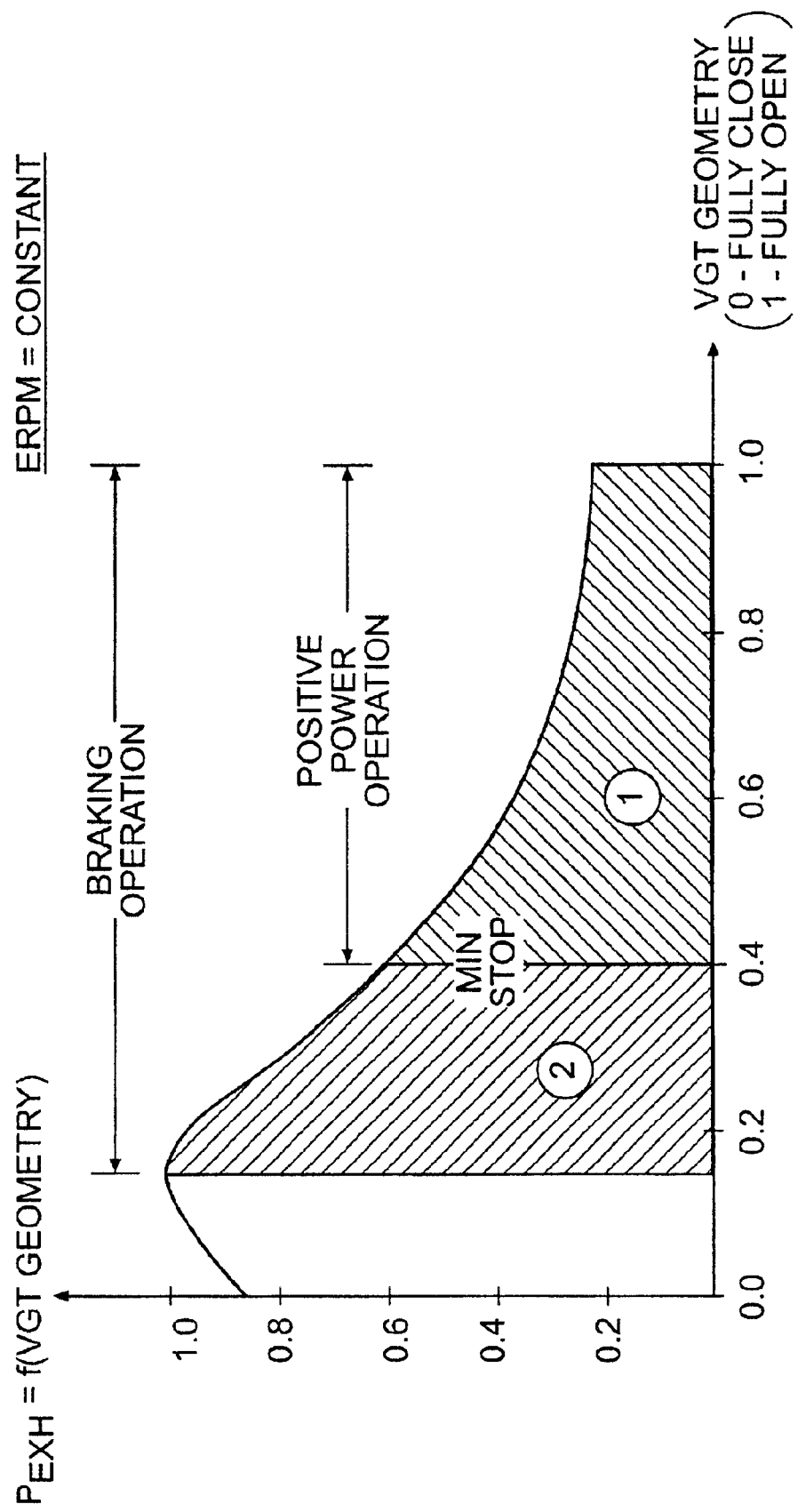
FIG. 12 illustrates exhaust manifold pressure as a function of VGT geometry for a fixed engine speed in a braking system.

FIG. 12 illustrates exhaust manifold pressure as a function of VGT geometry for a fixed engine speed. For example, prior to the present invention, engine braking systems using VGT could only utilize exhaust manifold pressures represented in the area 1. Conversely, through application of the systems and methods of the present invention, the minimum stop may be eliminated or greatly reduced. As shown in FIG. 12, this increases the available exhaust manifold pressures by an area 2, corresponding to improved engine braking performance. It is to be understood that FIG. 12 is for exemplary purposes only, and, as will be apparent to those of ordinary skill in the art, the actual values represented may vary depending on a variety of factors, such as, for example, the specifications of the engine 100 and the turbocharger 310.

Figure 11:
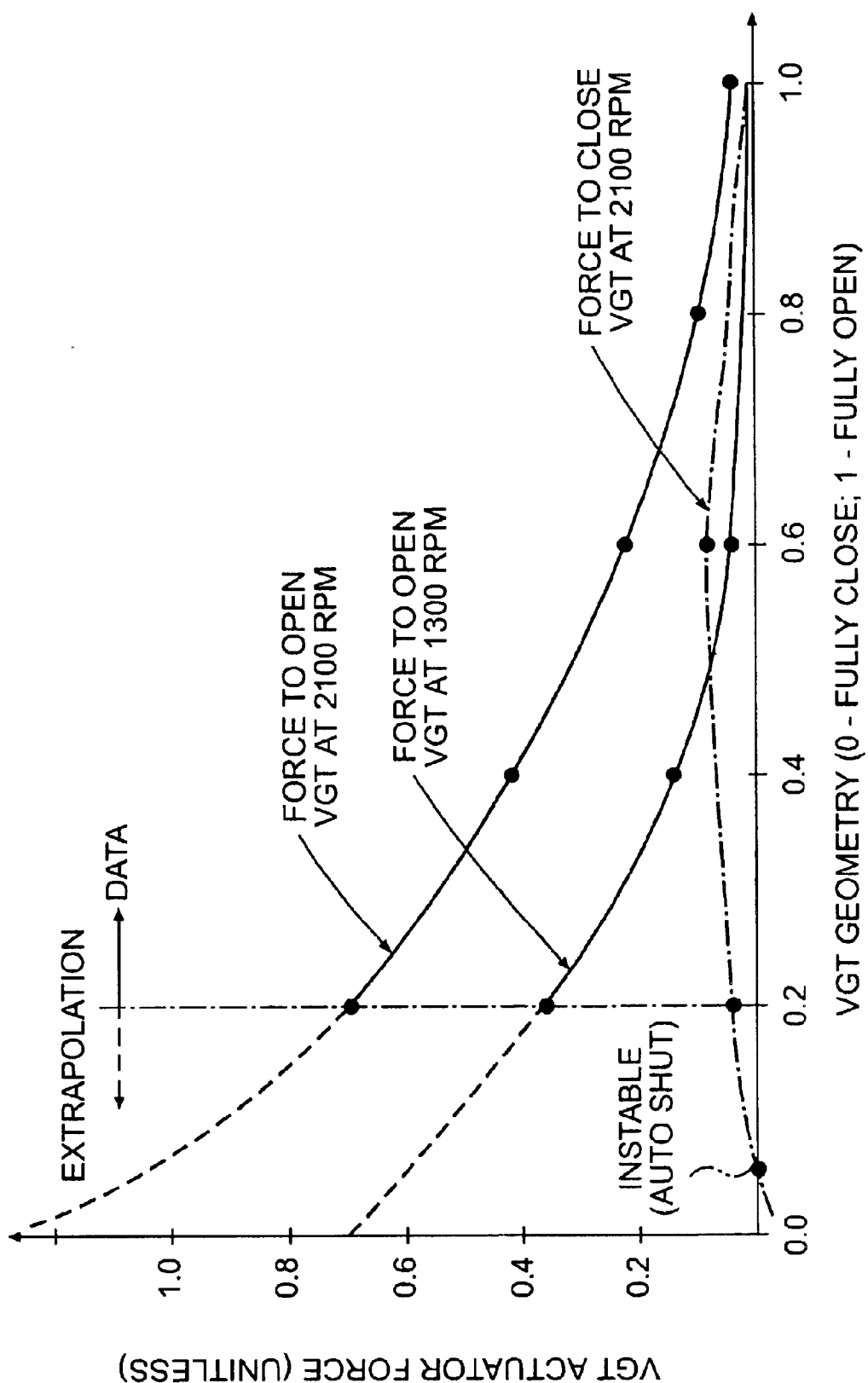
FIG. 11 is a graph illustrating the forces required to open and close a VGT with moving vanes at various engine speeds as a function of VGT geometry position prior to the present invention.

As discussed above, minimizing or reducing the VGT minimum stop position can pose catastrophic turbocharger performance issues. When the VGT vanes close below the minimum stop position, mechanical control instability occurs and the VGT vanes may not be able to be re-opened. FIG. 11 illustrates the forces required to open and close vanes of a variable geometry turbocharger at various engine speeds from various geometry positions prior to the present invention. For example, at an engine speed of 2100 RPM, the turbocharger may become unstable as it approaches a fully closed geometry. Conversely, by controlling the pressure drop across the turbine according to systems and methods of the present invention, the VGT control instability problem may be eliminated.

In one embodiment, the present invention is a method for controlling the engine braking system 10. The method may include controlling the geometry of the turbocharger 310 for a given engine speed in an open-loop system (i.e. no feedback) for maximum engine braking. The method may further include adjusting, or tuning, the pressure regulation valve(s) 350 in a closed-loop system for different levels of braking, such as, for example, 50% braking or braking for cruise control. In addition, the method may include controlling the pressure gradient across the turbocharger 310 to reduce the vane opening and/or closing forces such that the turbocharger 310 may be re-opened without any mechanical control instability problems.

The control of the engine braking system 10 for one embodiment of the present invention will now be described with reference to FIG. 8. It is to be understood that any one or a combination of the above described embodiments of the pressure regulation means 300 may be used to optimize the braking provided by the engine braking system 10 of the present invention.

Figure 8:
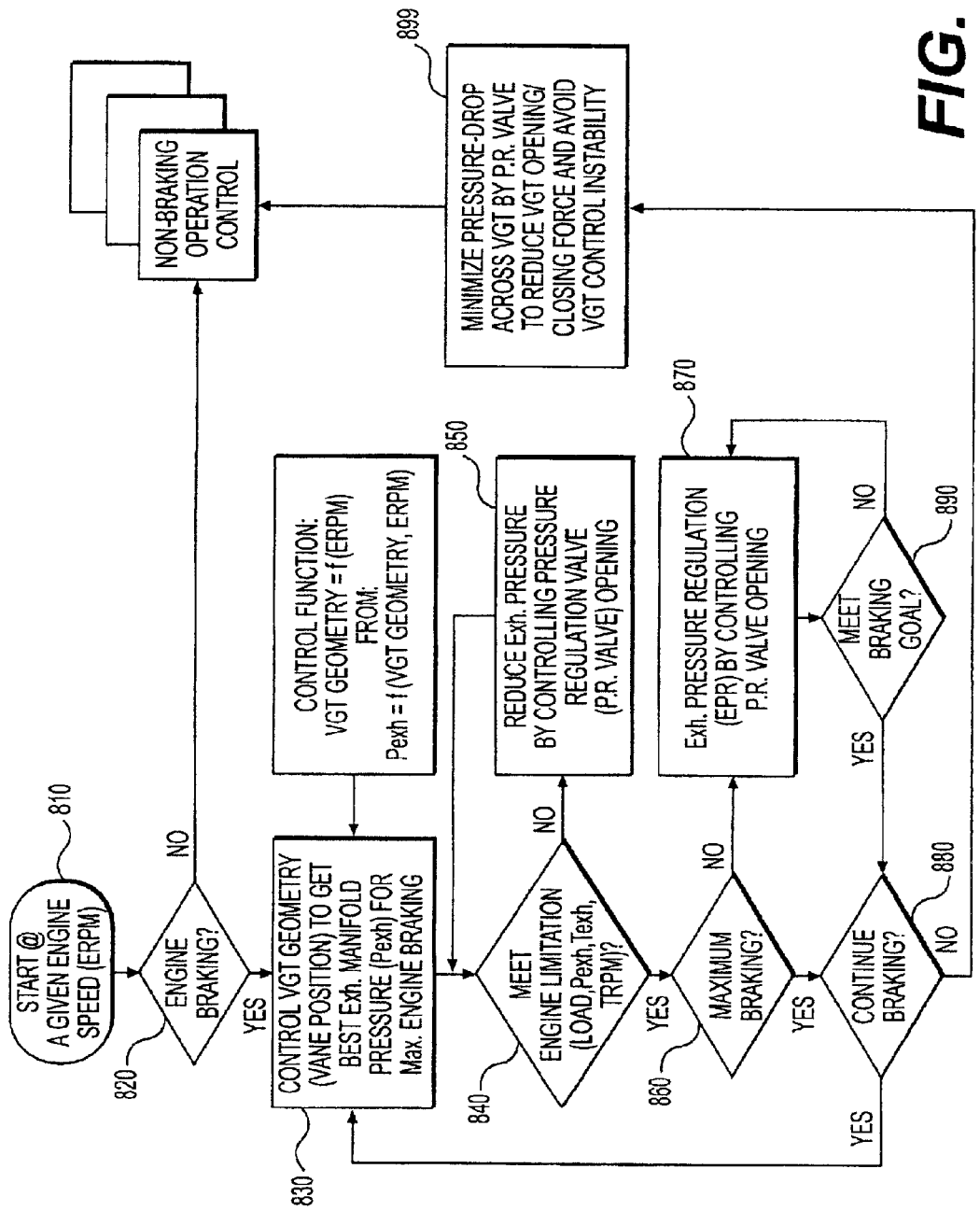
FIG. 8 is a block diagram illustrating a method for controlling an engine braking system according to one embodiment of the present invention.

FIG. 8 illustrates a control diagram for controlling the engine braking system 10 of the present invention. In control block 810, the ECM 400 receives the current engine speed via its connection to an appropriate engine component, such as a tachometer. Again, as discussed above, the engine speed may be determined by the ECM 400 by any number of known means, as will be apparent to one of ordinary skill in the art.

Next, in control block 820, the ECM 400 determines whether engine braking is desired. If it is not, the ECM 400 continues with non-braking operation control.

Figure 9:
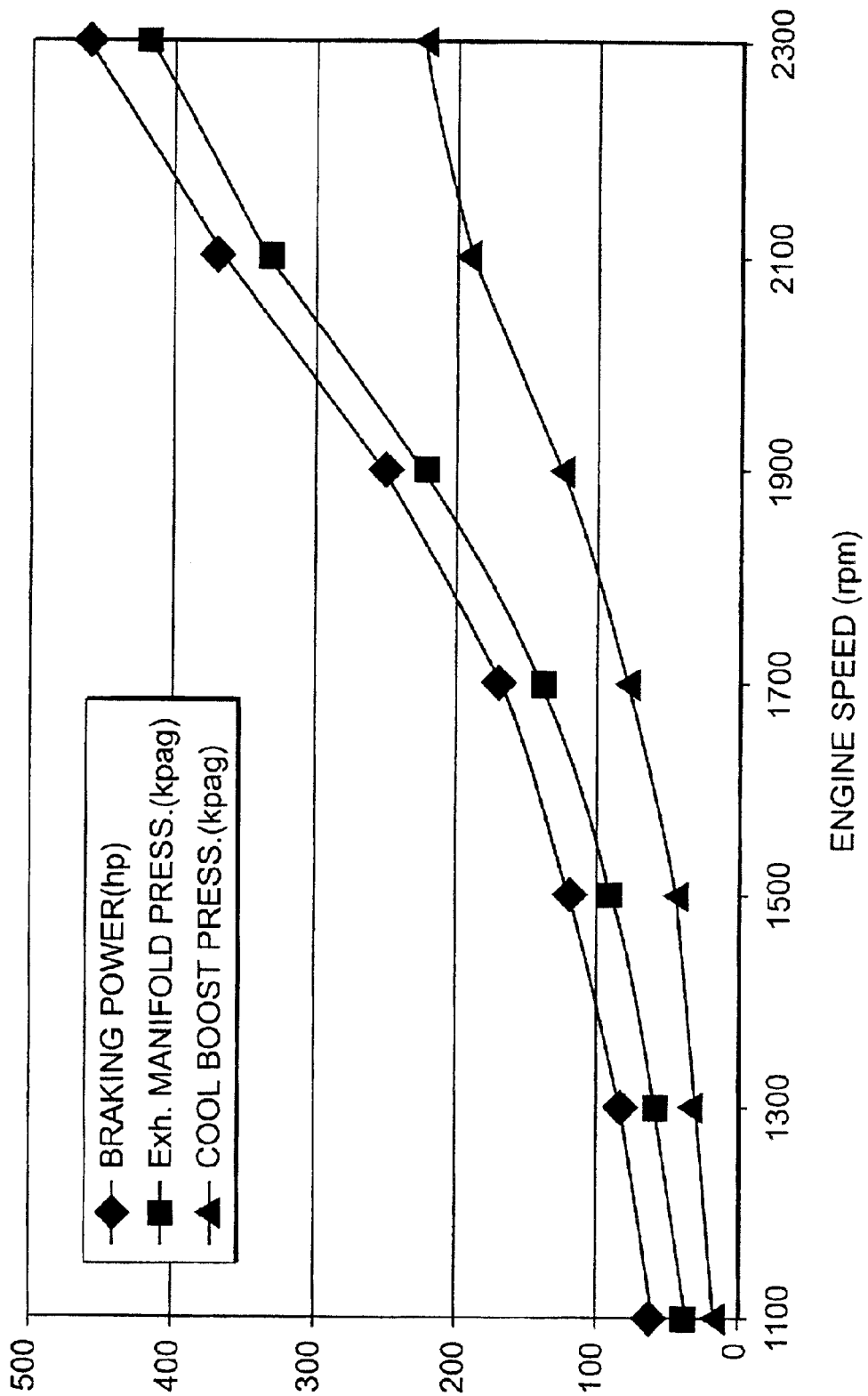
FIG. 9 is a graph illustrating the variation of braking power with engine speed for a full-cycle bleeder braking system.

If engine braking is desired, the ECM 400, in control block 830, controls the geometry of the turbocharger 310 to provide the best exhaust manifold pressure for maximum engine braking at the given engine speed. As shown in FIG. 9, the variation of braking power with engine speed is more correlated to the exhaust manifold pressure rather than the cool boost pressure for a full-cycle bleeder braking system.

It is contemplated, however, that the braking power of the present invention could be controlled by controlling any combination of the exhaust manifold pressure and/or the boost pressure.

Figure 10:
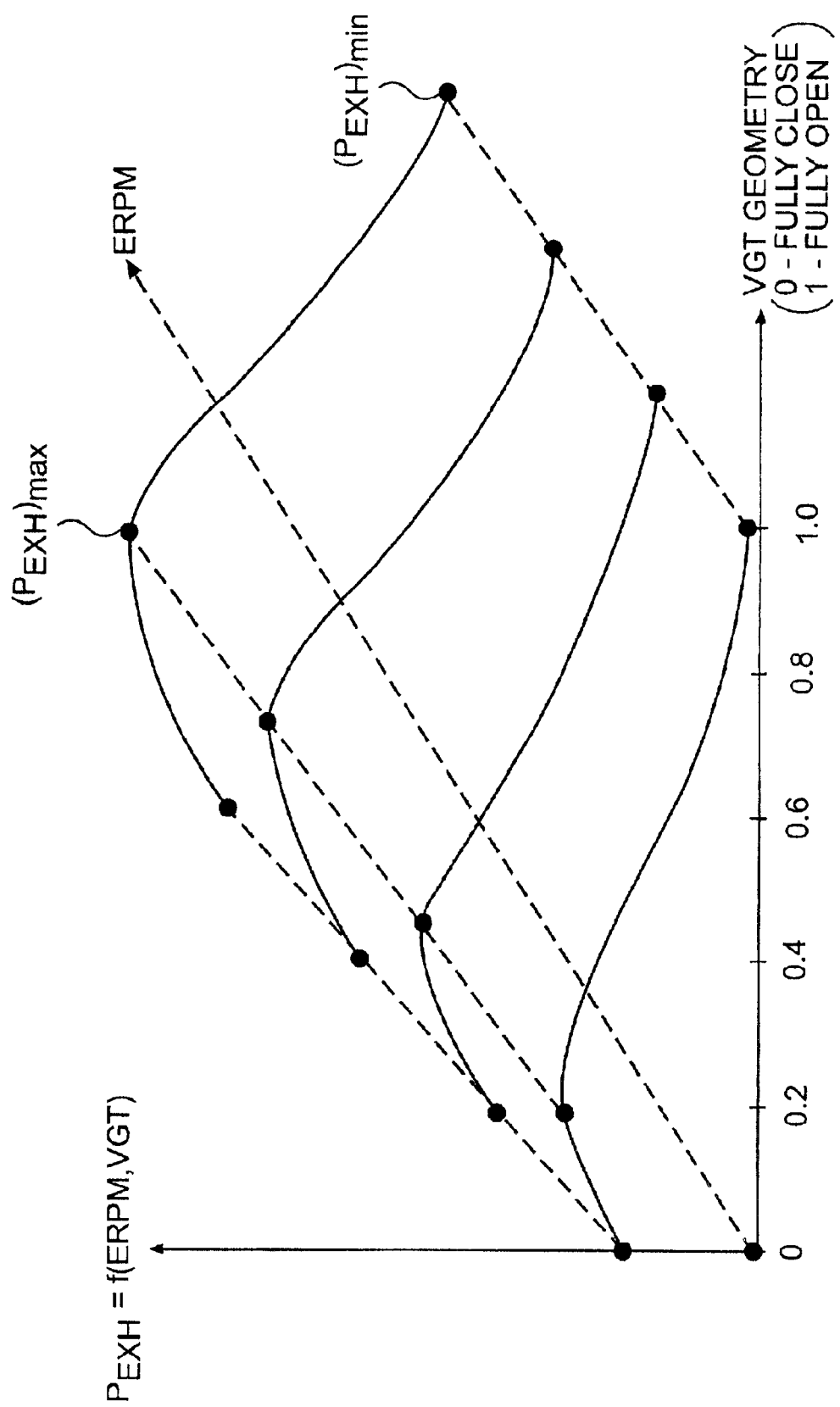
FIG. 10 illustrates a control map depicting the exhaust manifold pressure (Pexh) as a function of engine speed (ERPM) speed and VGT geometry.

The pressure in the exhaust manifold 110 is a function of the turbocharger 310 geometry and the speed of the engine 100, for a given engine braking system 10 and a fixed opening of the pressure regulation valve 350. FIG. 10 illustrates a control map that depicts the exhaust manifold pressure (Pexh) as a function of engine speed (ERPM) and VGT geometry. As illustrated by the map, the maximum exhaust manifold pressure may be achieved at higher engine speeds with less closing of the turbocharger 310. For example, at lower engine speeds, the turbocharger 310 may need to be closed to 20% open to achieve the maximum exhaust manifold pressure, while at higher engine speeds, the turbocharger 310 may be left 40% open. It is to be understood that FIG. 10 is for exemplary purposes only, and, as will be apparent to those of ordinary skill in the art, the actual values on the control map may vary depending on a variety of factors, such as, for example, the specifications of the engine 100 and the turbocharger 310.

In control block 840, the ECM 400 determines whether any limitations for any of the measured engine parameters, have been exceeded. The measured engine parameters may include, but are not limited to, the braking load, the exhaust manifold pressure, the exhaust manifold temperature, and/or the turbine speed. The engine parameters may be measured by any means known to those of ordinary skill in the art, including, but not limited to, sensors connected to the turbocharger 310, the engine cylinder, the exhaust manifold 120, or any other part of the engine system.

If any one or more of the engine parameters is exceeded, the ECM 400 reduces the exhaust manifold pressure by controlling the opening of the pressure regulation valve 350, as shown in control block 850. This process continues in closed-loop system fashion until the engine parameter is no longer exceeded.

As shown in control block 860, the ECM 400 determines whether the maximum braking achieved (control block 830) is needed. If maximum braking is required, the ECM 400 continues to control block 880. It is possible, however, that the maximum braking level is not required. For example, the engine braking system 10 may be adapted to provide braking levels other than maximum braking, such as, for example, any lower level of braking, and/or braking for cruise control. If the maximum braking level is not required, the ECM 400 adjusts the exhaust manifold pressure by controlling the opening of the pressure regulation valve 350, as shown in control block 870. This process continues in closed-loop system fashion until the desired level of engine braking has been met, as shown in control block 890.

The ECM 400 then determines whether continued braking is required, as shown in control block 880. If continued braking is required, the control flow of the present invention returns to control block 830 and the geometry of the turbocharger 310 is again controlled to provide the best exhaust manifold pressure for maximum engine braking at a newly updated engine speed. Because braking has occurred at this point, the engine speed may have changed, and correspondingly, the geometry may need to be adjusted from its previous position.

If continued braking is not required, as shown in control block 899, the ECM 400 minimizes the pressure gradient across the turbocharger 310 by controlling the pressure regulation means 300 according to one or any combination of the methods discussed above. This process reduces the required VGT opening and/or closing force and prevents VGT control instability. Thus, the present invention allows the mechanical stops inherent in conventional VGTs to be eliminated, or at a minimum, moved to a more closed position.

After the pressure gradient across the turbocharger 310 has been controlled, the ECM 400 then proceeds with non-braking operation control. It will be apparent that the method of the present invention allows different levels of engine braking to be achieved at a given engine speed by controlling the pressure regulation means 300 and the geometry of the turbocharger 310. This control, in turn, leads to improved engine braking performance. It will also be apparent that the method of the present invention may be used to improve positive power operation due to a wider variation range of the VGT after the removal or shift of the mechanical stop.

Figure 14:
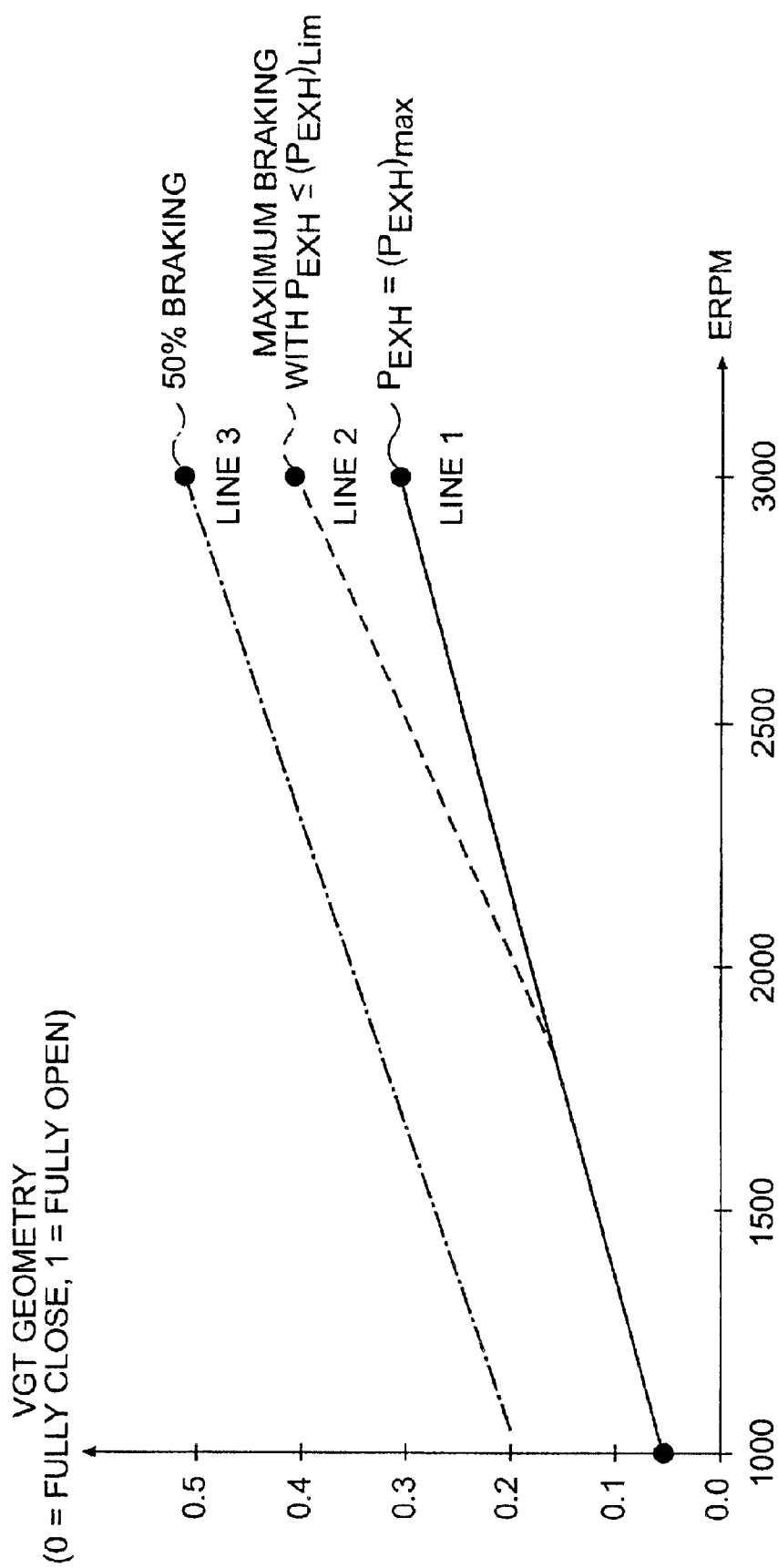
FIG. 14 is a control diagram illustrating VGT geometry setting as a function of engine speed according to an embodiment of the present invention.

In another embodiment, the present invention is a method for controlling the engine braking system 10. The method may include controlling the geometry of the turbocharger 310 as a function of engine speed and pressure (exhaust or intake, preferably exhaust). It is contemplated that the maximum braking level may not be required. For example, the engine braking system 10 may be adapted to provide braking levels other than maximum braking, such as, for example, any lower level of braking, and/or braking for cruise control. FIG. 14 is a control diagram illustrating the VGT geometry setting as a function of engine speed. Line 1 in FIG. 14 illustrates the VGT geometry setting for maximum exhaust manifold pressure at different engine speeds. Line 2 in FIG. 14 illustrates the VGT geometry setting for maximum braking without excessive exhaust manifold pressures (and exceeded limitations for certain engine parameters) at high engine speeds. Line 3 in FIG. 14 illustrates the VGT geometry setting for lower level braking (for example, 50% braking) at different engine speeds. Again, it is to be understood that FIG. 14 is for exemplary purposes only, and, as will be apparent to those of ordinary skill in the art, the actual values on the control map may vary depending on a variety of factors, such as, for example, the specifications of the engine 100 and the turbocharger 310.

The method may further include adjusting, or tuning, the pressure regulation valve 350 at each level of VGT opening. The combination of the position of the pressure regulation valve 350 and the position of the VGT opening provides the different levels of braking. In addition, the method may include minimizing the pressure gradient across the turbocharger 310 to reduce the vane opening and/or closing forces such that the turbocharger 310 may be re-opened without any mechanical control instability problems.

Bleeder Braking Devices

In the preferred embodiment of the present invention, the valve actuation subsystem 200 is a bleeder brake. The valve actuation subsystem 200 may be varied based on at least any of the following attributes: its assembly to the engine 100, the means used to initiate brake valve lift (BVL), the means used to maintain the BVL, the valve lift profile, the number of braking valves used, the valve lift with respect to the engine speed (fixed or variable), and the pressure regulation means 300 used in combination with the valve actuation subsystem 200. A chart illustrating the various embodiments of the valve actuation subsystem 200 is shown in FIG. 15.

Figure 15:
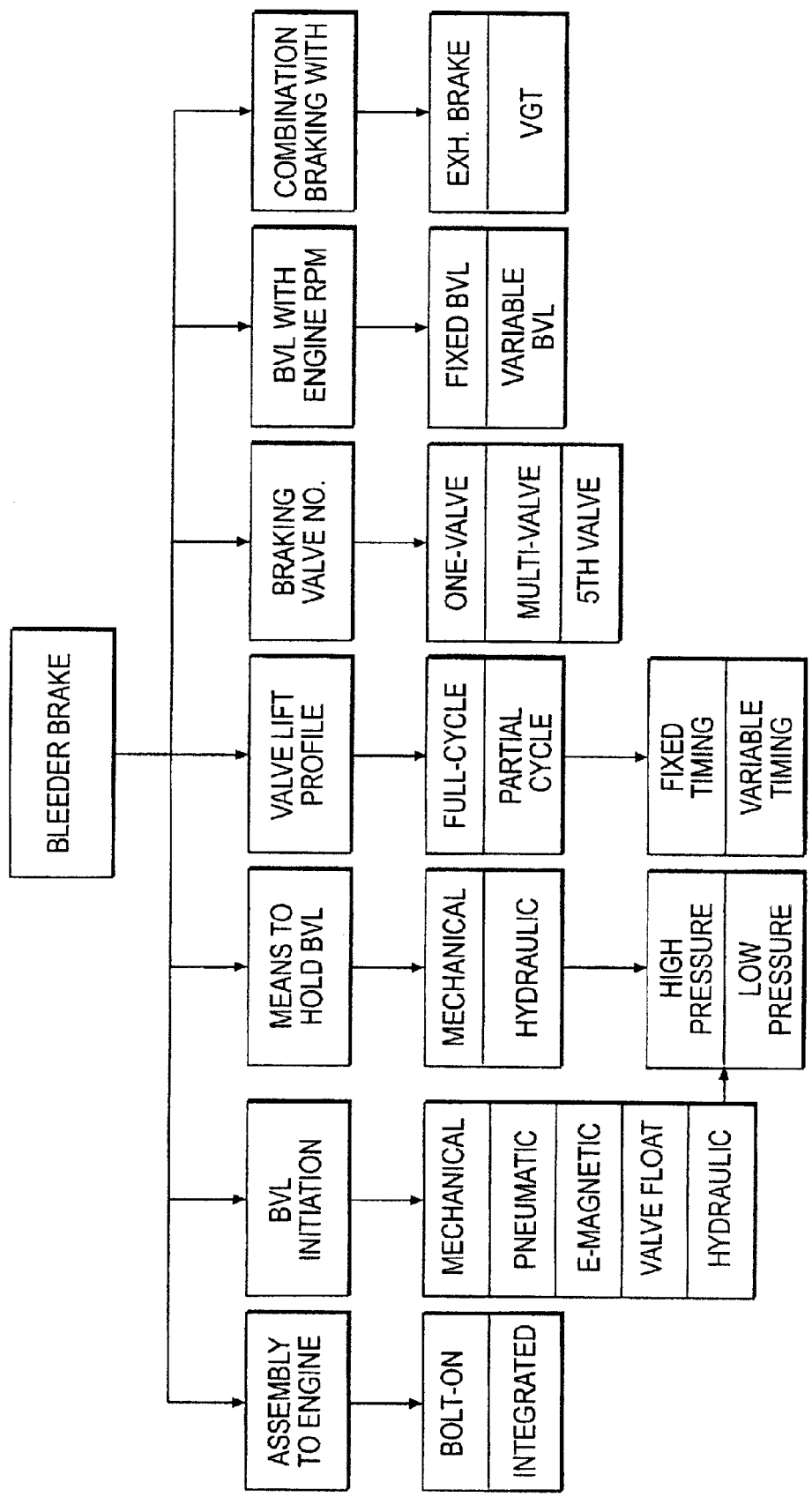
FIG. 15 is a chart illustrating the various possible embodiments of the valve actuation system according to the present invention.

As shown in FIG. 15, the means of assembling the valve actuation subsystem 200 may include, but is not limited to, bolt-on and integrated assembly means.

The means used to initiate BVL may include, but is not limited to, mechanical means, pneumatic means, electromagnetic means, valve float, high-pressure hydraulic means, low-pressure hydraulic means, and/or any combination of the above.

The means used to hold the BVL may include, but is not limited to, mechanical means, high-pressure hydraulic means, low-pressure hydraulic means, and/or any combination of the above.

Figure 16:
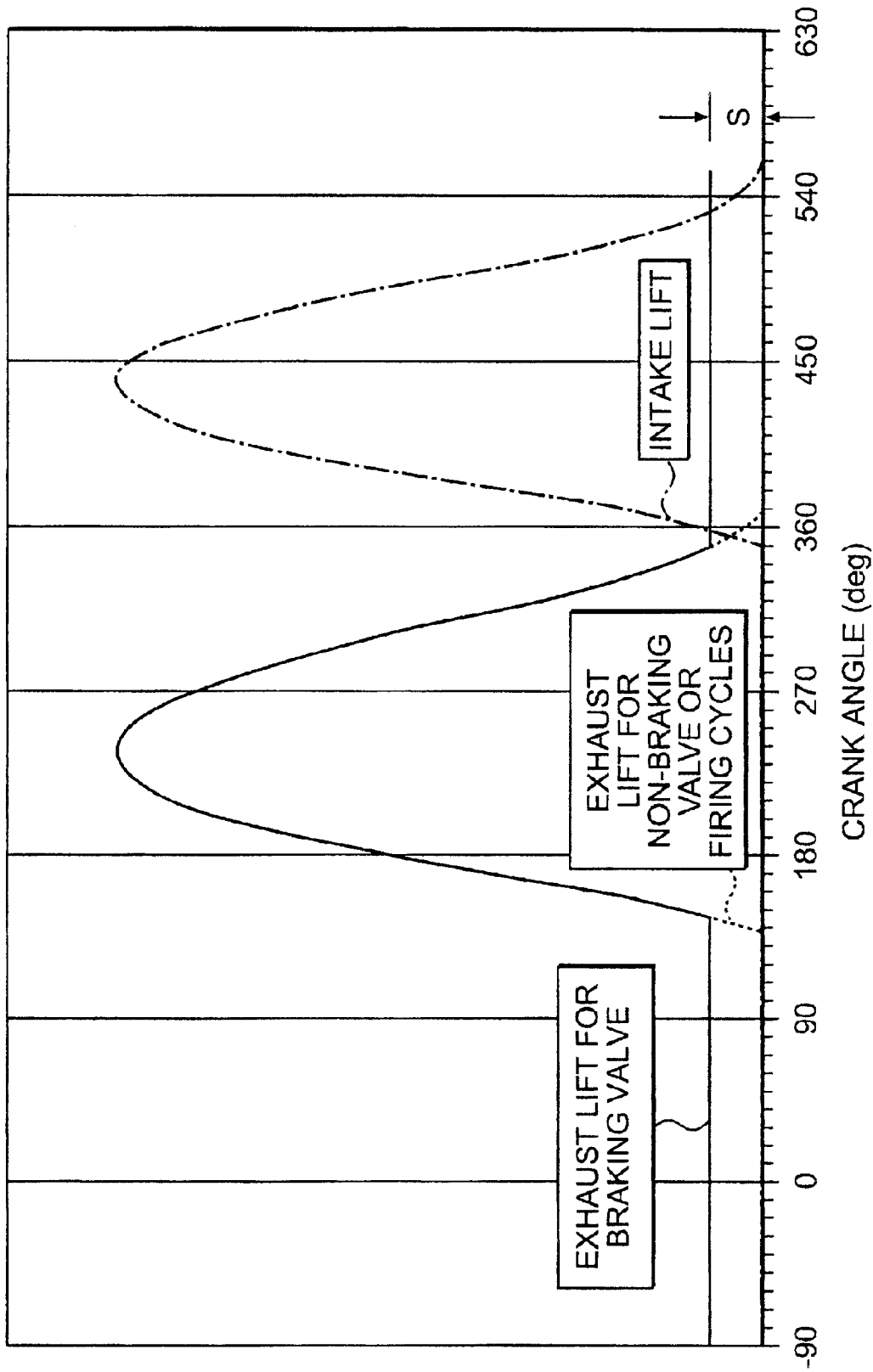
FIG. 16 illustrates a valve lift profile for at least one embodiment of the valve actuation subsystem of the present invention.
Figure 17:
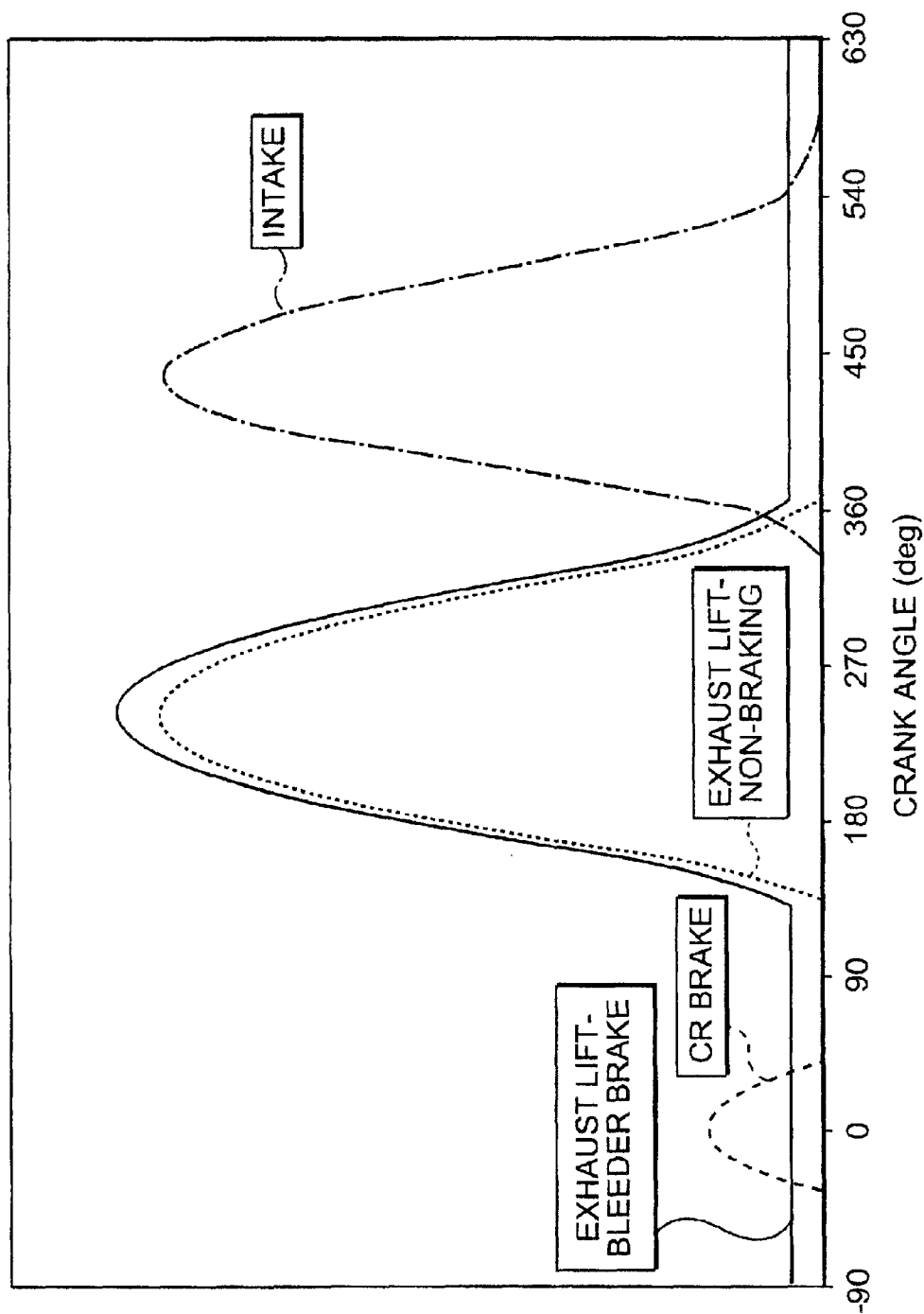
FIG. 17 illustrates a valve lift profile for at least one embodiment of the valve actuation subsystem of the present invention.
Figure 18:
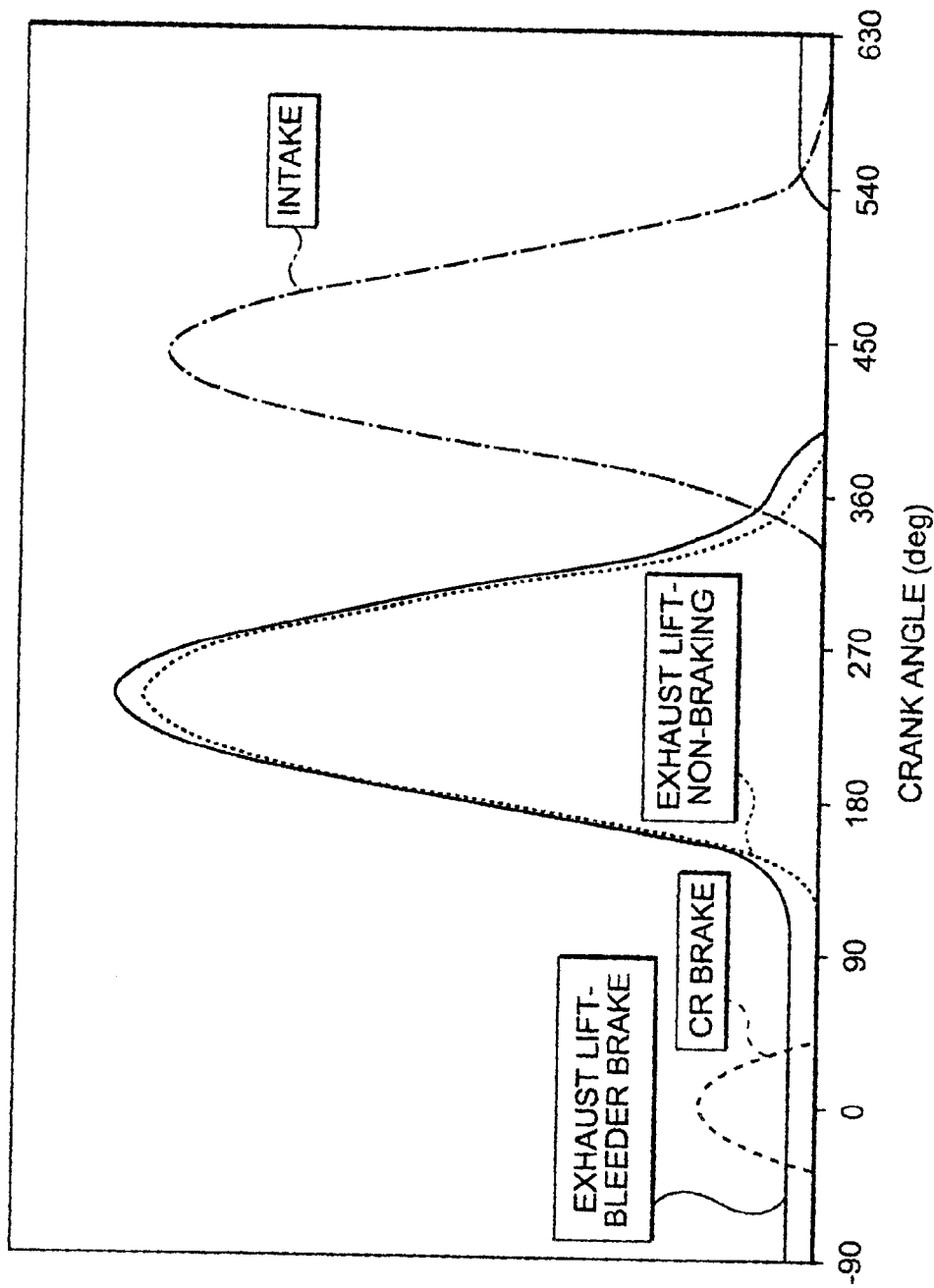
FIG. 18 illustrates a valve lift profile for at least one embodiment of the valve actuation subsystem of the present invention.

In at least one embodiment of the present invention, the valve lift profile is a full-cycle bleeder brake valve lift profile with no additional braking valve lift, as shown in FIG. 16. In at least one embodiment of the present invention, the valve lift profile is a full-cycle bleeder brake valve lift profile with additional braking valve lift as compared to the non-braking valve lift profile, as shown in FIG. 17. In at least one embodiment of the present invention, the valve lift profile is a partial-cycle bleeder brake valve lift profile, as shown in FIG. 18.

Figure 19:
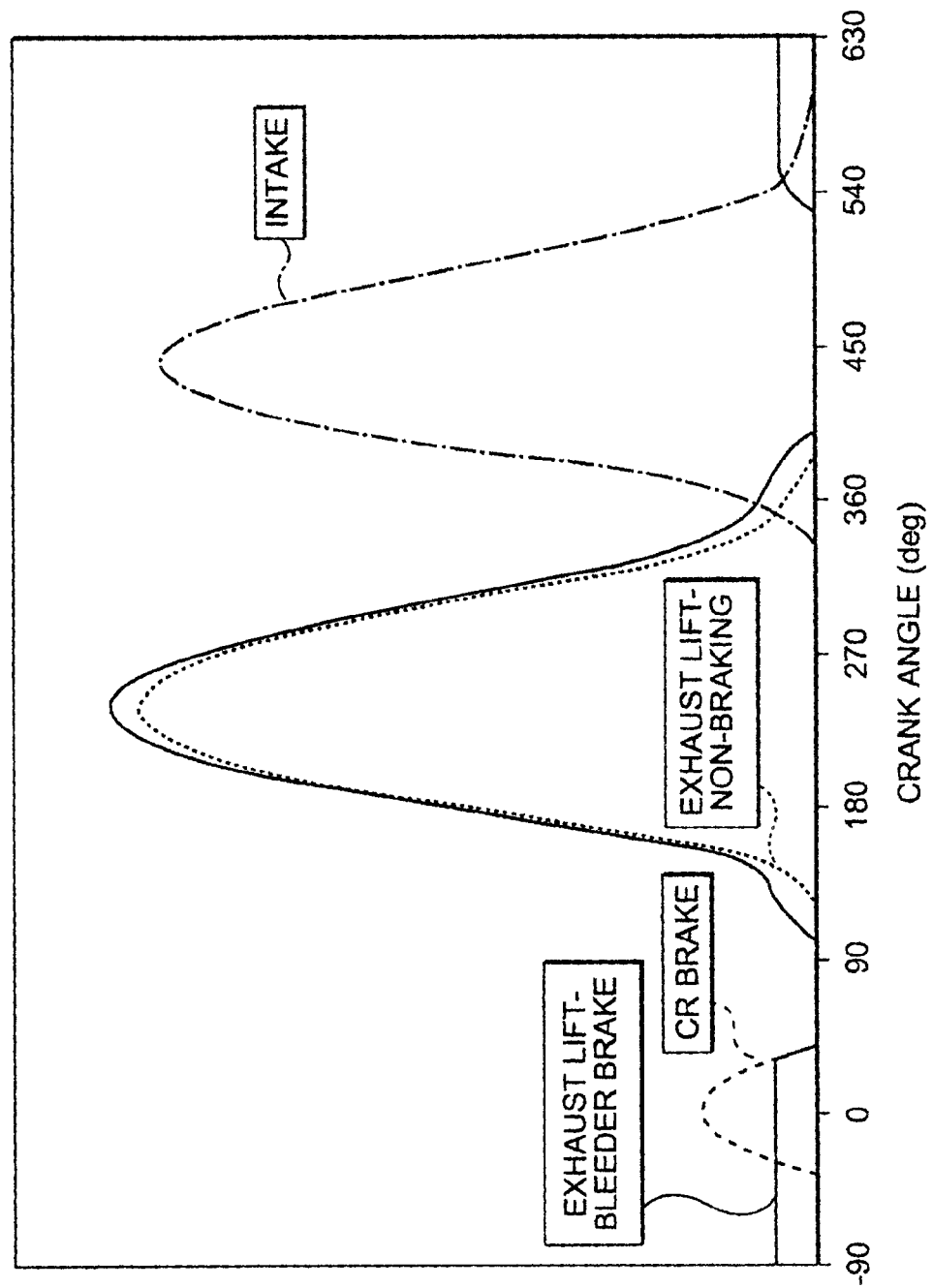
FIG. 19 illustrates a valve lift profile for at least one embodiment of the valve actuation subsystem of the present invention.

The valve actuation subsystem 200 of the present invention may also be used to achieve an ideal braking valve lift profile, as shown in FIG. 19. The braking valve lift is initiated by valve float, by mechanical means, or by other means near the end of the intake stroke such that braking gas (air) can flow back into the engine cylinder for higher compression release braking power. This event is a first braking gas recirculation (BGR) event. The bleeder braking valve lift is maintained through any of the means discussed above. After a compression release event, the braking valve lift is reset during the expansion stroke. The resetting reduces the cylinder pressure (vacuum effect) and increases pumping work. The braking valve is re-opened before the beginning of the normal exhaust valve lift such that braking gas (air) can flow back into the engine cylinder (a second BGR event) for higher pumping work due to higher pressure in the engine cylinder and exhaust manifold. The valve lift then undergoes the normal exhaust valve lift and is reset at the beginning of the intake stroke. Optimum timing and magnitude of the bleeder valve lift may depend on engine speed, and the position of the turbocharger 310 geometry, as well as other engine parameters.

Other valve lift profiles, such as, but not limited to, a compression-release brake valve lift profile are considered well within the scope of the present invention. Moreover, the valve lift may be either fixed or variable.

As will be apparent to those of ordinary skill in the art, the valve actuation subsystem 200 of the present invention may be adapted to actuate one valve, multiple valves, and/or a dedicated braking valve.

The various embodiments of the valve actuation subsystem 200 of the present invention will now be described in detail.

Stroke-Limited High Pressure Bleeder Brake

Figure 20:
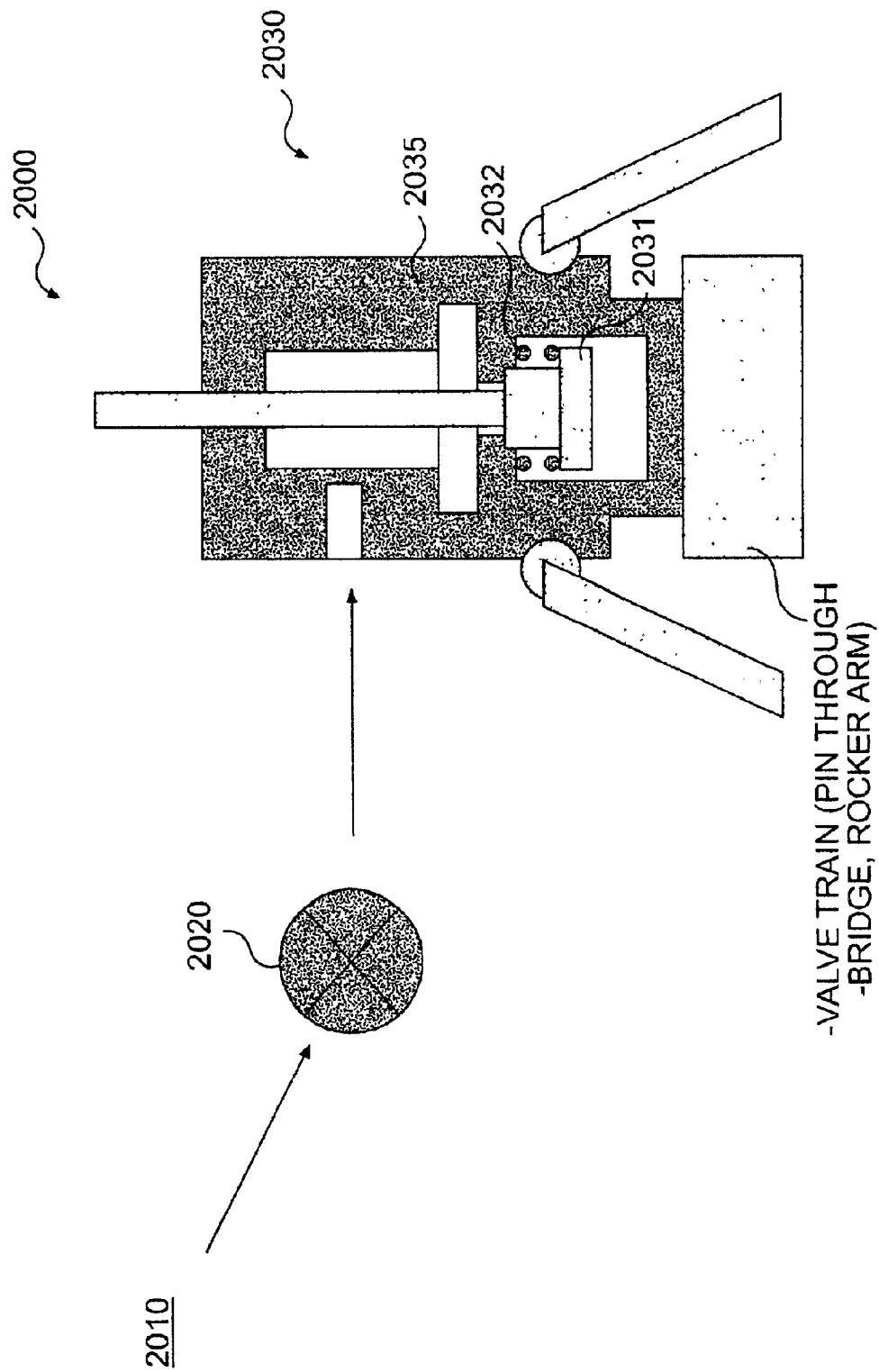
FIG. 20 is a schematic diagram of a valve actuation subsystem according to a first embodiment of the present invention.

In one embodiment of the present invention, the valve actuation subsystem 200 is a stroke-limited high-pressure bleeder brake assembly 2000, as shown in FIG. 20. In the preferred embodiment, the bleeder brake assembly 2000 includes a high-pressure fluid source 2010, a supply valve assembly 2020 for controlling the flow of the high-pressure fluid, and a valve actuation assembly 2030 for actuating and holding open the at least one engine valve during an engine braking event, securably attached to the engine housing (block) 100.

The engine housing 100 includes a hydraulic passageway (s) (not shown), which forms a hydraulic circuit. The hydraulic circuit enables fluid communication between the fluid source 2010, the supply valve assembly 2020, and the valve actuation assembly 2030.

In the preferred embodiment of the present invention, the high-pressure fluid source 2010 is part of the engine and may comprise a high-pressure plenum (not shown). The high-pressure fluid source 2010 is adapted to store high-pressure fluid, such as, but not limited to, engine fuel. In one embodiment of the present invention, the high-pressure fluid source may comprise a fuel injection system common to the engine. As will be apparent to those of ordinary skill in the art, however, any system capable of supplying high-pressure fluid during an engine braking cycle are considered well within the scope of the present invention.

Figure 46:
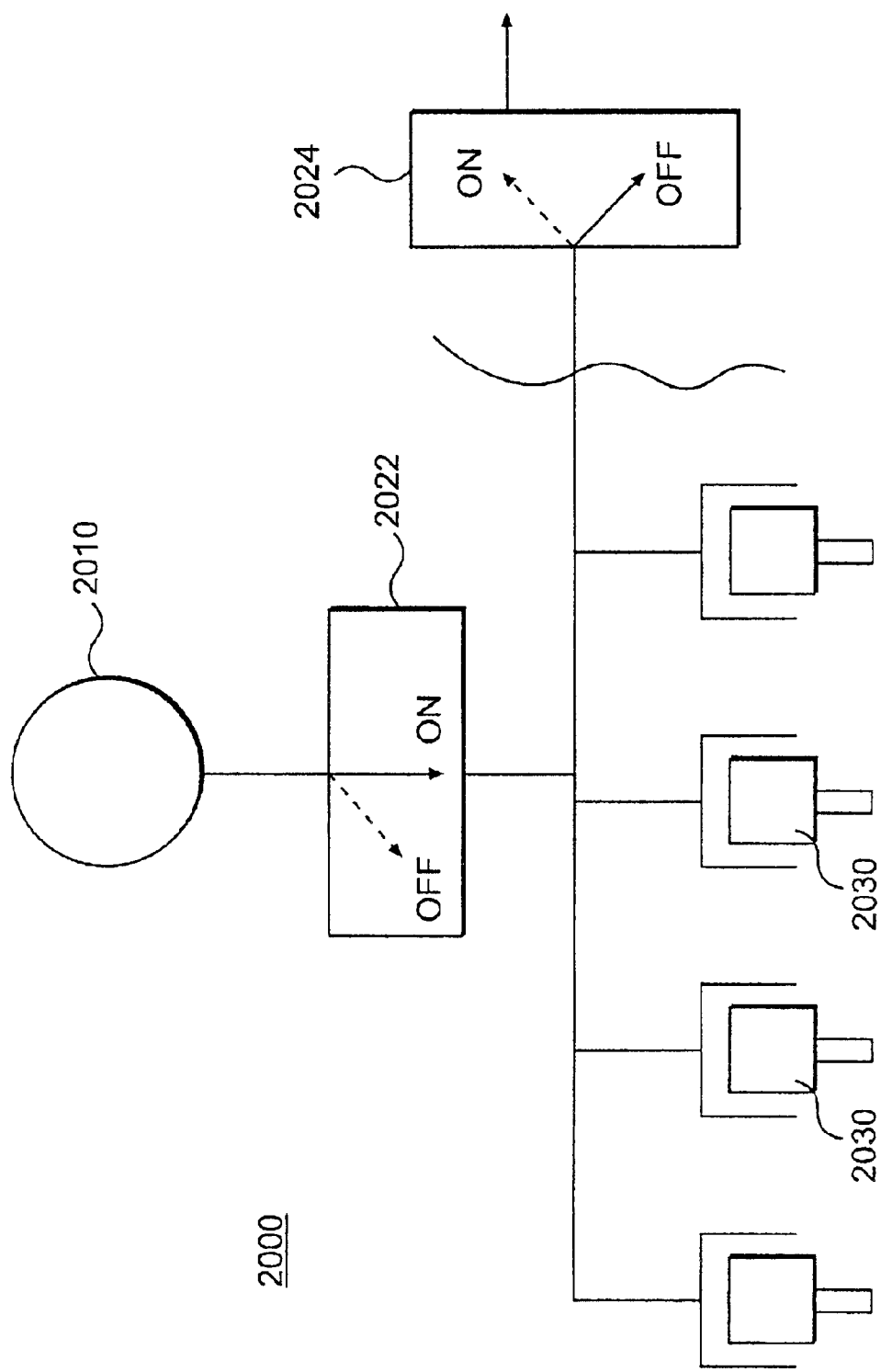
FIG. 46 is a schematic diagram of a high-pressure supply valve assembly for at least one embodiment of the valve actuation subsystem of the present invention.

In the preferred embodiment of the present invention, the supply valve assembly 2020 comprises a first high-pressure solenoid valve 2022 capable of receiving high-pressure fluid from the high pressure fluid source 2010 and controlling the flow of high-pressure fluid to the valve actuation assembly 2030 to actuate the at least one engine valve. The first solenoid valve 2022 is in fluid communication with the fluid source 2010 through the hydraulic circuit. In one embodiment of the present invention, the supply valve assembly 2020 further comprises a second high-pressure solenoid valve 2024 in fluid communication with the hydraulic circuit. The second solenoid valve 2024 is adapted to release the high-pressure fluid from the valve actuation assembly 2030 when the braking event is disabled. The fluid may be released, for example, back to the fluid source 2010, or to ambient. The supply valve assembly 2020, including the first solenoid valve 2022 and the second solenoid valve 2024, is illustrated in FIG. 46. As shown in FIG. 46, the present invention may operate in a multiple cylinder engine, wherein each cylinder includes a valve actuation assembly 2030.

As shown in FIG. 46, the first solenoid valve 2022 and the second solenoid valve 2024 are preferably high-pressure, two-way solenoid valves. However, it is contemplated that the supply valve assembly 2020 may include a single three-way solenoid valve rather than two two-way solenoid valves. As will be apparent to those of ordinary skill in the art, the single three-way solenoid valve may be adapted to supply high-pressure fluid to the valve actuation assembly 2030 during braking and release the fluid from the valve actuation assembly to disable the braking event.

In the preferred embodiment of the present invention, the valve actuation assembly 2030 comprises a stroke-limited, hydraulic piston portion 2031 capable of receiving high-pressure fluid from the supply valve assembly 2020, and a return spring 2032. The return spring 2032 is biased to push the hydraulic piston 2031 away from the at least one engine valve (braking valve) when braking is disabled. As will be apparent to those of ordinary skill in the art, the valve actuation assembly 2030 may be connected to the supply valve assembly 2020 through the hydraulic circuit.

The valve actuation assembly 2030 further includes a stopper 2035 for limiting the stroke of the hydraulic piston portion 2031 to a predetermined distance. The stopper 2035 may be adapted such that the predetermined distance is equivalent to a bleeder braking valve lift.

In addition, the hydraulic piston 2031 is sized such that the hydraulic force provided by the high-pressure fluid during engine braking is sufficient to overcome the force of the return spring 2032, the force of the engine valve spring (s), and the force of gas pressure on the at least one engine valve to initiate and maintain the braking valve lift.

Figure 47:
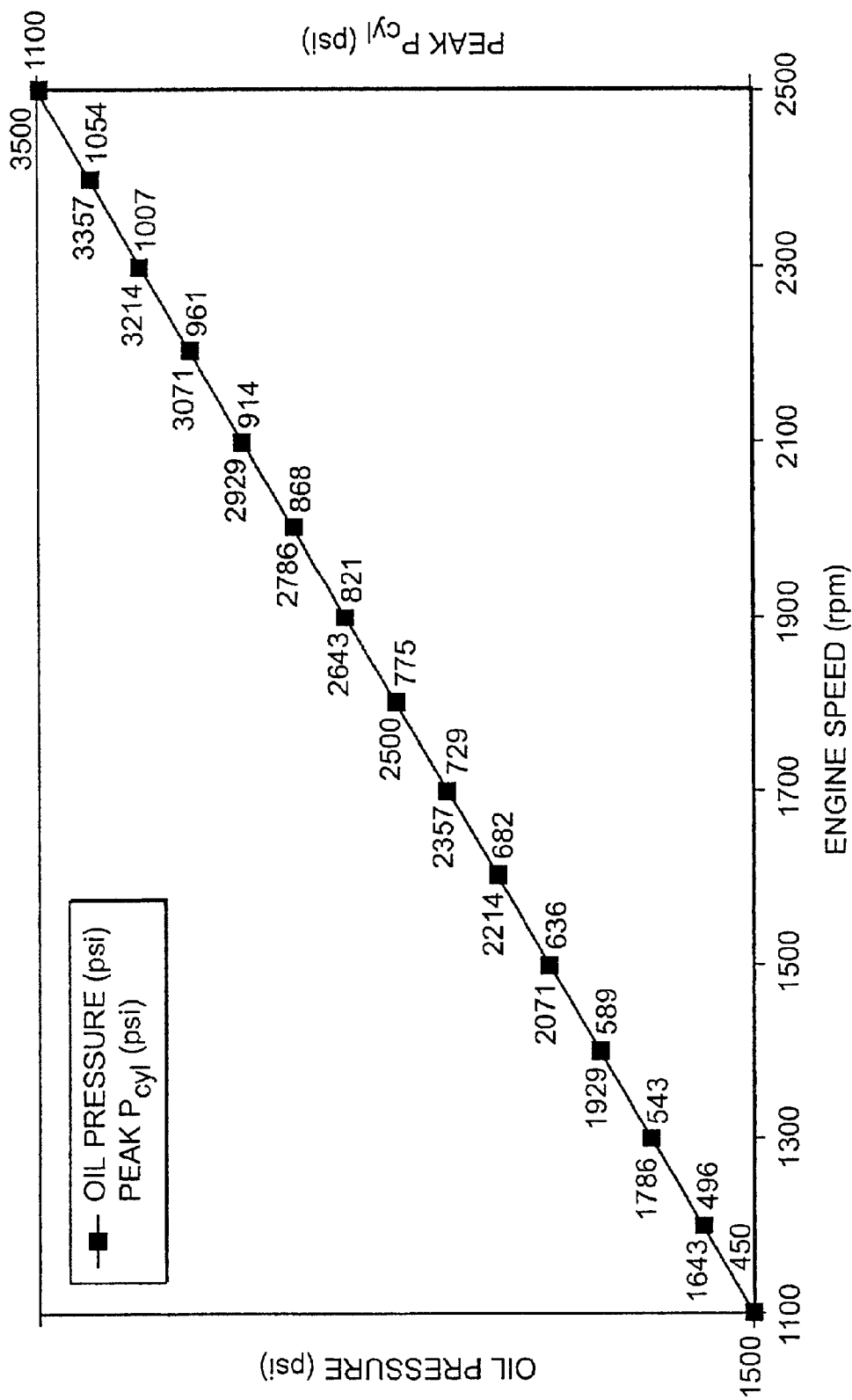
FIG. 47 is a graph illustrating braking fluid pressure versus engine speed for actuating the valve actuation subsystem of the first embodiment of the present invention.

The hydraulic force provided by the high-pressure fluid preferably varies with engine speed. FIG. 47 illustrates the fluid pressure required for actuating the valve actuation assembly 2030 at various engine speeds. For example, at an engine speed of approximately 2300 rpm, when the peak cylinder pressure is approximately 1007 psi, a braking fluid pressure of approximately 3214 psi is required to actuate the at least one engine valve. The variance in the hydraulic force provided by the high-pressure fluid helps reduce leakage and demand on the fluid source 2010. It is to be understood that FIG. 47 is for exemplary purposes only, and, as will be apparent to those of ordinary skill in the art, the actual values of braking fluid pressure versus engine speed may vary depending on a variety of factors, such as, for example, the specifications of the engine 100.

In one embodiment of the present invention, the hydraulic piston 2031 is sized such that the hydraulic force provided by the high-pressure fluid and the force differential created by the pressure regulation means 300 during the braking event are sufficient to overcome the force of the return spring 2032, the force of the engine valve spring(s), and the force of gas pressure on the at least one engine valve to initiate and maintain the braking valve lift and effectuate the braking event.

Operation of the stroke-limited high-pressure bleeder brake assembly 2000 will now be described. During positive power, the supply valve assembly 2020 is turned off such that high-pressure fluid is not supplied to the valve actuation assembly 2030. In one embodiment of the present invention, the first solenoid valve 2022 is in the "off" position and the second solenoid valve 2024 is in the "on" position. Because of the bias in the return spring 2032 and the lack of fluid pressure, the hydraulic piston 2031 does not contact the at least one engine valve. As such, positive power operation is unaffected and follows a normal valve lift profile.

During engine braking, the ECM 400 controls the high-pressure fluid source 2010 to supply the high-pressure fluid to the supply valve assembly 2020. Under control of the ECM 400, the supply valve assembly 2020 supplies the high-pressure fluid through the hydraulic passageway, to the valve actuation assembly 2030. The hydraulic force created by the high-pressure fluid displaces the piston 2031 a set distance, causing the piston 2031 to contact and actuate the at least one engine valve. The at least one engine valve is held open by the hydraulic force of the fluid for the duration of the braking cycle. In the preferred embodiment of the present invention, the braking cycle is a full-cycle bleeder braking cycle.

In one embodiment of the present invention, as shown in FIG. 46, the first solenoid valve 2022 is in the "on" position, and the second solenoid valve 2024 is in the "off" position during the braking event. When engine braking is disabled, the first solenoid valve 2022 is switched to the "off" position to prevent additional high-pressure fluid from reaching the valve actuation assembly 2030, and the second solenoid valve 2024 is switched to the "on" position and is adapted to release the high-pressure fluid from the valve actuation assembly 2030.

Because of its simple design, the stroke-limited high-pressure bleeder brake assembly of the present invention does not require control valves, master pistons, reset screws, and any additional hardware associated with these components. As such, it is cheaper, simpler, better packaged, and more reliable than known, bolt-on brakes. Additionally, there is no hydraulic compliance in the braking system because the high pressure fluid holds the piston 2031, and thus, the at least one engine valve, open against a hard stop. Therefore, the stroke-limited high-pressure bleeder brake assembly of the present invention provides better braking performance than known bleeder braking systems.

Integrated Rocker Bleeder for Full-Cycle Bleeder

Figure 21:
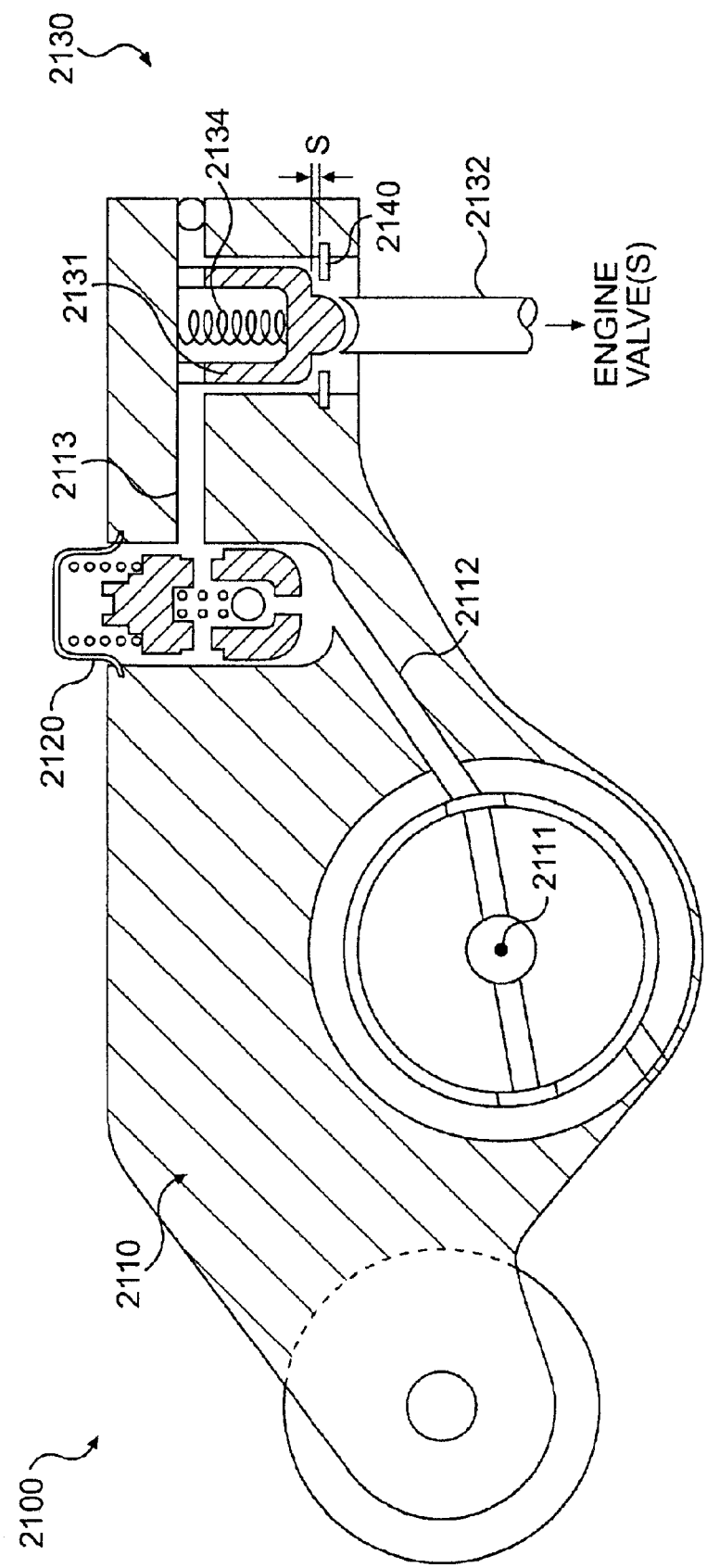
FIG. 21 is a schematic diagram of a valve actuation subsystem according to a second embodiment of the present invention.

In another embodiment of the present invention, the valve actuation subsystem 200 is an integrated rocker bleeder (IRB) assembly 2100, as shown in FIG. 21. In the preferred embodiment, the IRB assembly includes a rocker arm 2110, a valve assembly 2120, and a piston assembly 2130 for actuating at least one engine valve.

The rocker arm 2110 may include a plurality of passageways, forming a control circuit therein. The passageways are capable of receiving hydraulic fluid therein, such as, for example, engine oil. The rocker arm 2110 includes a first passageway 2111 that extends therethrough, as shown in FIG. 21. Hydraulic fluid is supplied to the IRB assembly 2100 through the first passageway 2111 from a supply valve assembly (preferably solenoid), not shown. The rocker arm 2110 also includes a second passageway 2112 that extends substantially orthogonal to the first passageway 2111. The second passageway 2112 is fluidically connected to the first passageway 2111. The rocker arm 2110 also includes a third passageway 2113. The third passageway 2113 is fluidically connected to the second passageway 2112.

The orientation of the first passageway 2111, the second passageway 2112, and the third passageway 2113, within the rocker arm 2110, may be modified based upon such factors as engine configuration and size.

The valve assembly 2120 is located within the rocker arm 2110 to control the flow of hydraulic fluid from the second passageway 2112 to the third passageway 2113. The valve assembly 2120 is preferably a control valve to prevent the backflow of hydraulic fluid from the third passageway 2113 to the second passageway 2112. As will be apparent to those of ordinary skill in the art, other suitable means may be employed to prevent the backflow of hydraulic fluid from the third passageway 2113 to the second passageway 2112.

The piston assembly 2130 is located within the rocker arm 2110. The piston assembly 2130 includes a first portion 2131 located within the third passageway 2113 and a second portion 2132 that is adapted to engage the at least one engine valve and facilitate the opening and closing of the at least one engine valve to effectuate a bleeder braking event. The first portion 2131 of the piston assembly 2130 is secured to the rocker 2110 by a spring 2134. The spring 2134 biases the piston assembly 2130 in the downward direction, which slightly separates the piston assembly 2130 from the rocker arm 2110 and facilitates the application of oil pressure on the piston assembly 2130. In addition, the spring 2134 provides an additional force on the at least one engine valve during braking to facilitate valve lift. In addition, a stopper assembly 2140 is located within the third passageway 2113 to control the travel of the first portion 2131 of the piston assembly 2130, and thus, the bleeder braking valve lift.

Operation of the IRB assembly 2100 of the present invention during a bleeder braking cycle will now be described.

In the preferred embodiment, the engine control means (ECM) 400 controls the supply valve assembly to supply engine oil to the rocker arm 2110. The engine oil flows through the first passageway 2111, through the second passageway 2112, through the control valve assembly 2120 to the piston assembly 2130. The presence of the engine oil creates a force differential across the piston assembly 2130.

Simultaneously, the ECM 400 controls the pressure regulation means 300 such that the level of pressure in the exhaust manifold 120 creates a force differential across the at least one engine valve that alone, or coupled with the pressure supplied by the engine oil and/or the force of the spring 2134 of the piston assembly 2130, is sufficient to overcome the engine valve closing force and cause the piston assembly 2130 to pop out and travel in a downward motion.

The stopper assembly 2140 limits the downward motion of the piston assembly 2130 to a pre-determined distance, s. This causes the second portion 2132 to engage the at least one engine valve and open the at least one engine valve to a predetermined distance, s, as shown in FIG. 21. This distance is much less than the valve lift for a conventional compression release brake. A comparison between the exhaust valve lift for the IRB assembly 2100 of the present invention and the exhaust valve lift for a conventional engine compression release brake is illustrated in FIG. 17.

Figure 22:
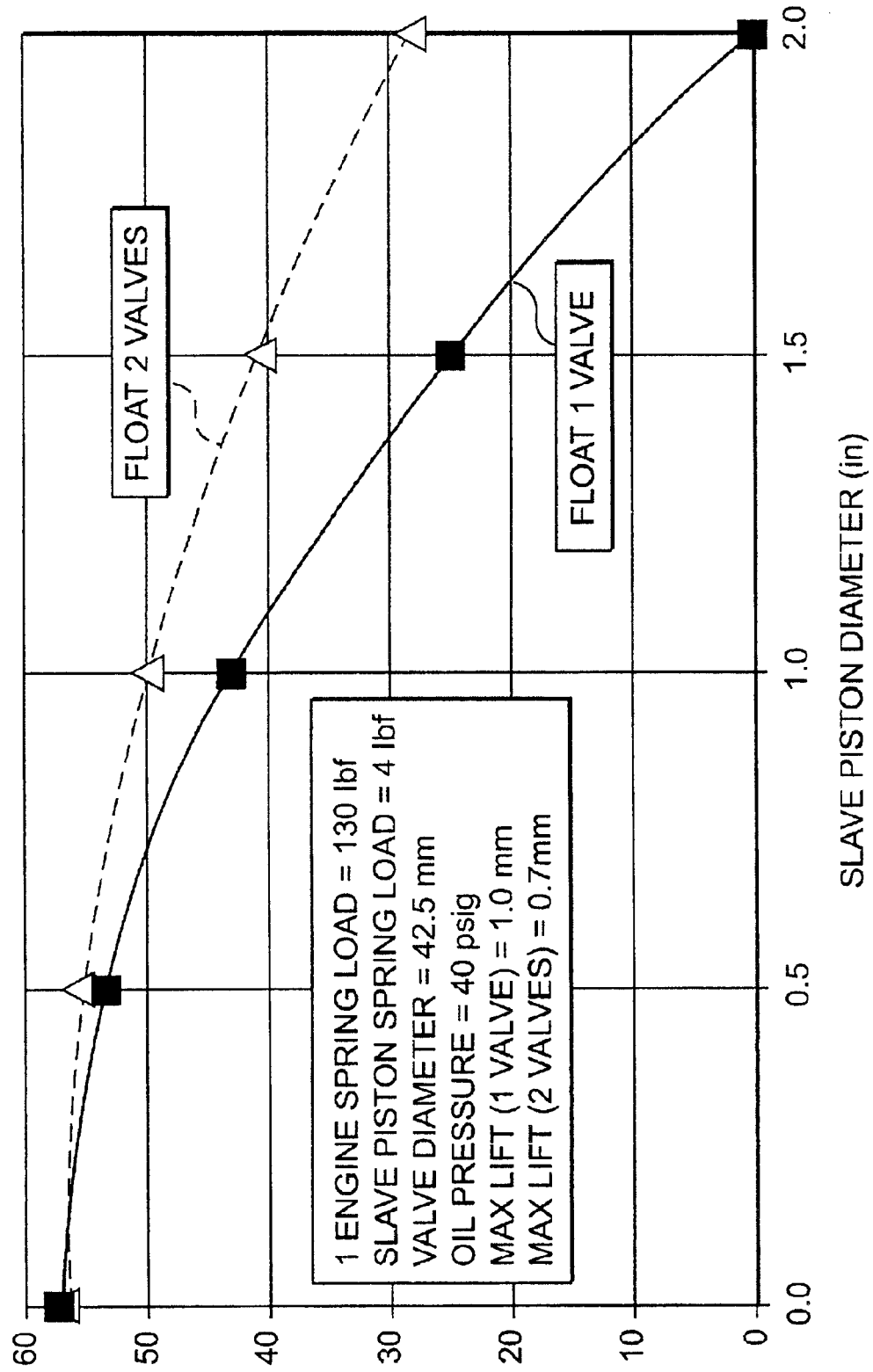
FIG. 22 is a graph illustrating the force differential required to float engine valve(s) according to one embodiment of the present invention.

An example of the pressure differential across the engine valve(s) required to float one and two exhaust valves of different diameters for the piston assembly 2130 and fixed values for the oil pressure, the engine valve spring load, and the load of the spring 2134 is illustrated in FIG. 22. For example, where the piston assembly has a diameter of 1.5 inches, a pressure differential of 25 psi across the piston assembly 2130 is required to float one exhaust valve. For a diameter of 1.0 inch, less than 45 psi pressure drop (maximum) across the valve(s) is needed to open one valve with oil pressure of 40 psi gage.

Figure 23:
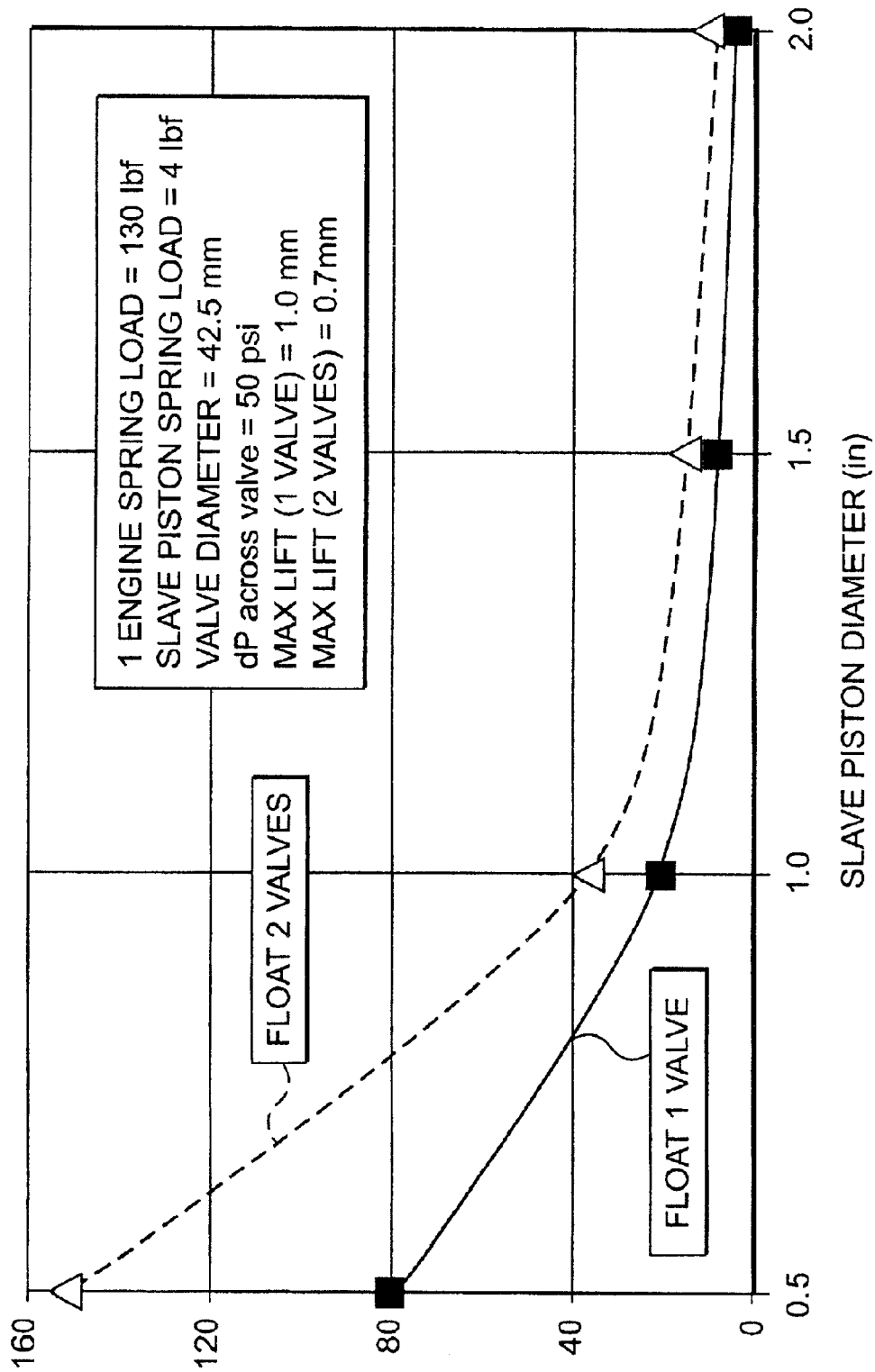
FIG. 23 is a graph illustrating the force differential required to float engine valve(s) according to another embodiment of the present invention.

Similarly, an example of the oil pressure required to float one and two exhaust valves of different diameters for the piston assembly 2130 and fixed values for the pressure differential across the valve(s), the engine valve spring load, and the load of the spring 2134 is illustrated in FIG. 23. For example, for a piston assembly 2130 diameter of 1.0 inch, an oil pressure of approximately 20 psi gage is needed to open one valve with a pressure differential across the valve(s) of 50 psi.

Other means for providing the required force differential to create the exhaust valve float are considered within the scope of the present invention. For example, hydraulic fluid pressure alone may be used to create a force differential across the piston assembly 2130 sufficient to cause the second portion 2132 to pop out, overcome the exhaust valve closing force and the load of the spring 2134, and open the exhaust valve(s).

After the engine valve float has occurred, the engine oil is trapped between the control valve assembly 2120 and the piston assembly 2130 in the third passageway 2113. This hydraulic lock holds the at least one engine valve open for a full-cycle bleeder braking cycle. As discussed below, it is contemplated that embodiments of the IRB assembly 2100 may also be used for partial-cycle bleeder braking valve lift profile.

The potential benefits of a bleeder brake are low initial braking load, low cost, and low noise. In addition, due to the introduction of methods and systems of the present invention, both the exhaust and intake manifold pressures are much higher than conventional FGT, which increases the bleeder brake performance.

With reference to FIG. 21, operation of the IRB assembly 2100 of the present invention during positive power cycles will now be described.

During positive power cycles, the supply valve assembly, not shown, shuts and cuts off the supply of engine oil to first passageway 2111. Oil trapped in the circuit is dumped out through the control valve assembly 2120 and the piston assembly 2130 re-seats. The at least one engine valve opens and closes normally. Without oil pressure to push down the piston assembly 2130 and, subsequently, the exhaust valve (s), a much higher pressure drop across the valve(s) is needed to float the valve(s). Furthermore, the exhaust pressure should be lower during positive power cycles, because higher exhaust pressure means more pumping loss which hurts fuel efficiency. Therefore, there will be no valve floating, no separation of the exhaust drive train, and no noise during positive power cycles.

Figure 24:
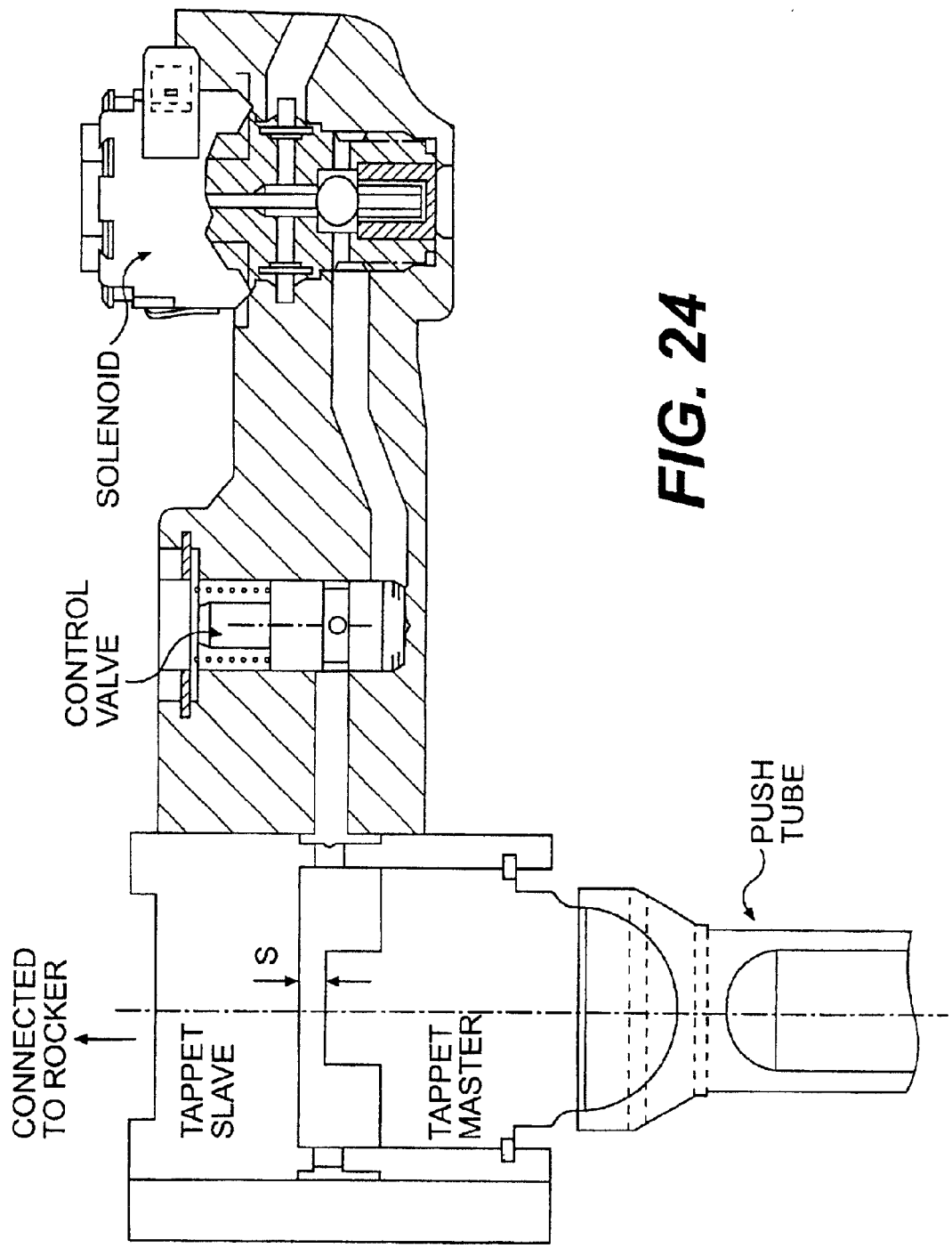
FIG. 24 is a schematic diagram of a valve actuation subsystem according to a third embodiment of the present invention.

With reference to FIG. 24, in another embodiment of the present invention, for engines with push tubes, the hydraulic actuation could be moved from the IRB assembly to the push tube side of the engine system. The actual braking process is essentially the same as with the IRB assembly. The difference is that engine oil will be supplied to the gap 2150 between a first tappet 2160 and a second tappet 2170 which separate the drive train. The trapped oil in the gap 2150 causes the at least one engine valve to open.

Compared with known integrated engine rocker brakes, the IRB assembly 2100 of the present invention has a much lower initial braking load, less weight and inertia, and does not need a reset. As such, the present invention has much better reliability and durability than prior known valve actuation subsystems. In addition, because it incorporates the methods to increase bleeder brake performance discussed above, the IRB assembly 2100 of the present invention provides better braking performance than known bleeder braking systems.

Resettable Integrated Rocker Bleeder for Partial-Cycle Bleeder

Figure 25:
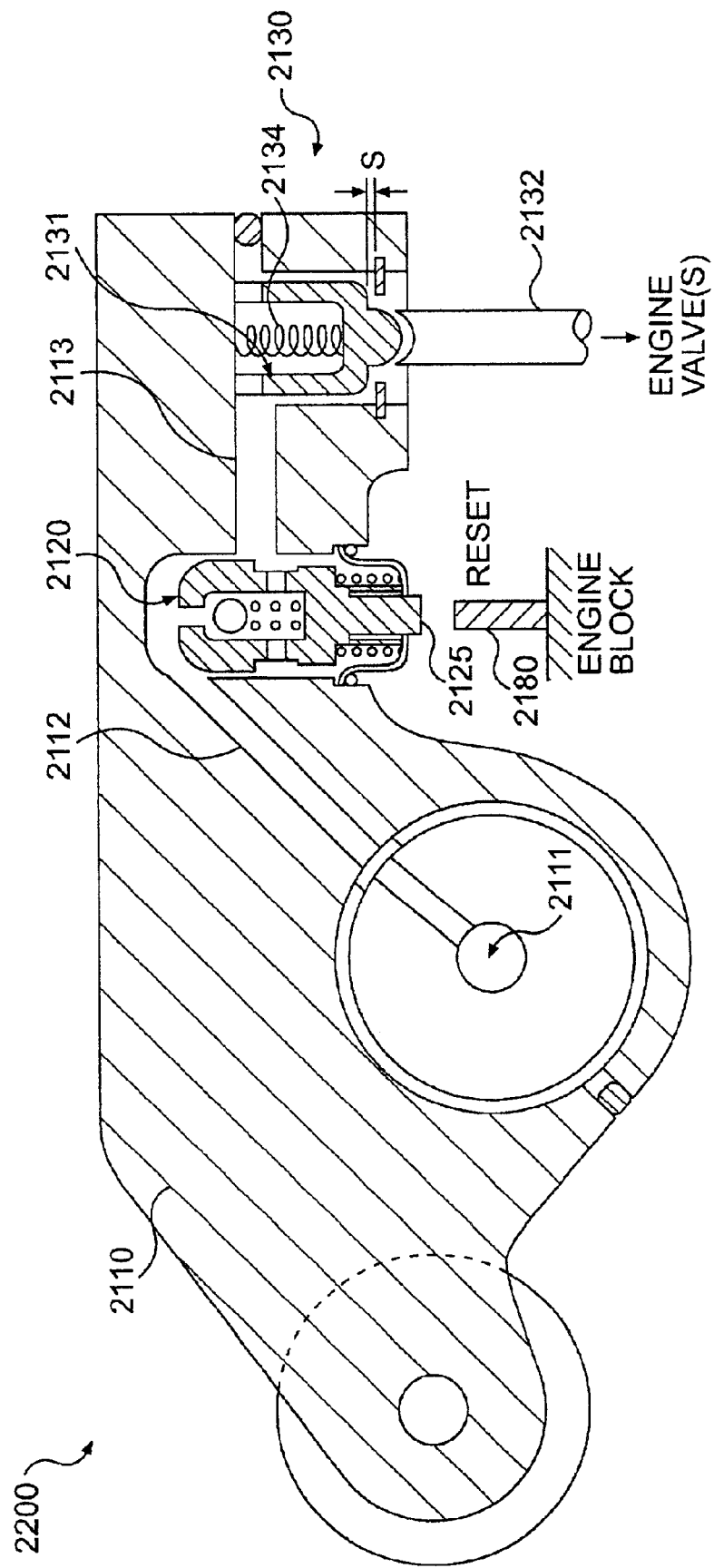
FIG. 25 is a schematic diagram of a valve actuation subsystem according to a fourth embodiment of the present invention.

In an alternative embodiment of the IRB assembly 2100 discussed above, partial-cycle bleeder brake operation is achieved with the resettable IRB assembly 2200, as shown in FIG. 25.

In this embodiment, the control valve assembly 2120 further includes a valve stem 2125 extending from the rocker arm 2110. In addition, the IRB assembly 2200 includes a reset pin 2180 mounted on the engine block below the valve assembly 2120. Operation of the IRB assembly 2200 will now be described, with reference to FIG. 25 and FIG. 26, which illustrates the valve lift profile for the present embodiment. The operation of the IRB assembly 2200 is similar to the operation of the IRB assembly 2100 discussed above, however, as the at least one engine valve moves toward peak lift, the valve stem 2125 contacts the reset pin 2180. This causes the control valve assembly 2120 to be pushed upwards into its non-braking position, where any trapped oil can be released to ambient. Once the oil column collapses, the piston assembly 2130 is re-seated and the at least one engine valve follows the valve motion for positive power cycles. This episode is represented by the spike in the valve profile shown in FIG. 26.

Figure 26:
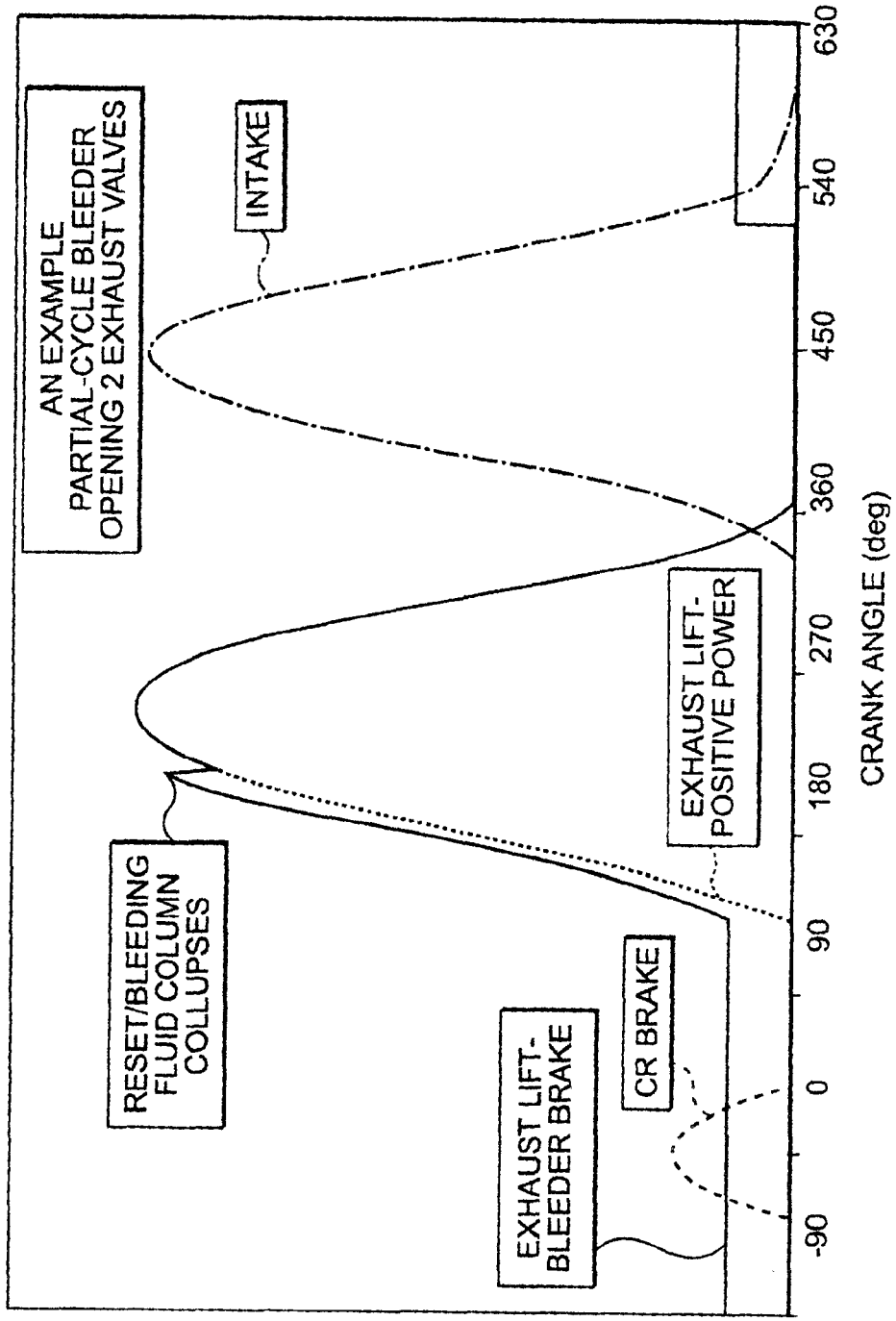
FIG. 26 illustrates a valve lift profile for at least one embodiment of the valve actuation subsystem of the present invention.

As the cam retreats from its peak lift, the valve stem 2125 separates from the reset pin 2180 and the control valve assembly 2120 is pushed back into its braking position by the refilling of supply oil pressure. However, the piston assembly 2130 does not actuate the at least one engine valve during most of the intake stroke due to a low pressure gradient across the braking valve(s) and the slow build-up of oil pressure in the third passageway 2113 by a controlled refill process. Near the end of the intake stroke, the pressure differential across the braking valve(s), or the valve float force, reaches a local maximum which can be controlled by the pressure regulation means 300. The increased valve float force combined with the established oil pressure in the passageway 2113 is sufficient to overcome the braking valve spring load and open the at least one engine valve near the end of the intake stroke to form a partial-cycle bleeder brake valve lift. This process is illustrated in FIG. 26 by the lack of valve lift during the approximate duration of the intake stroke.

Figure 27:
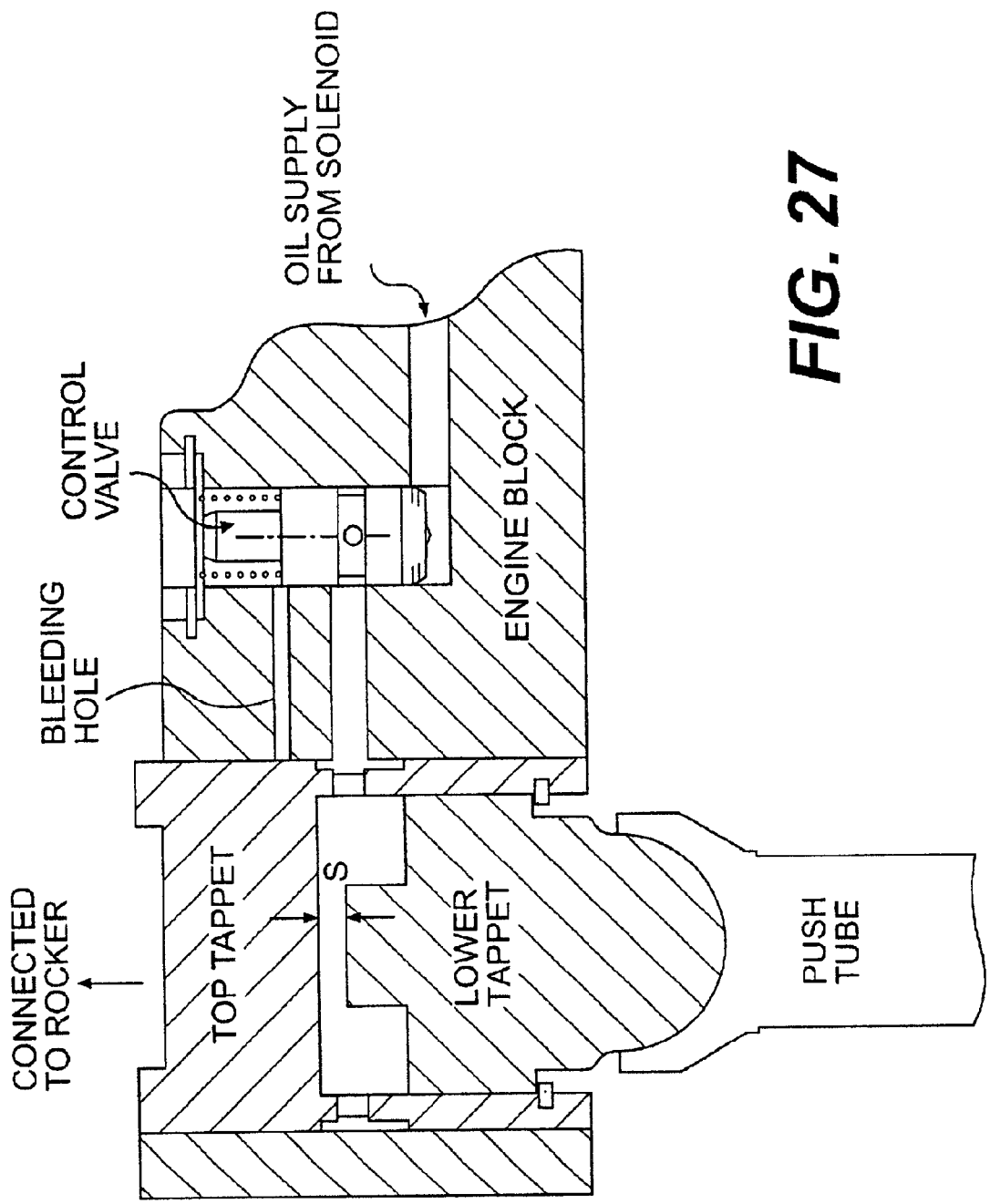
FIG. 27 is a schematic diagram of a valve actuation subsystem according to a fifth embodiment of the present invention.
Figure 28:
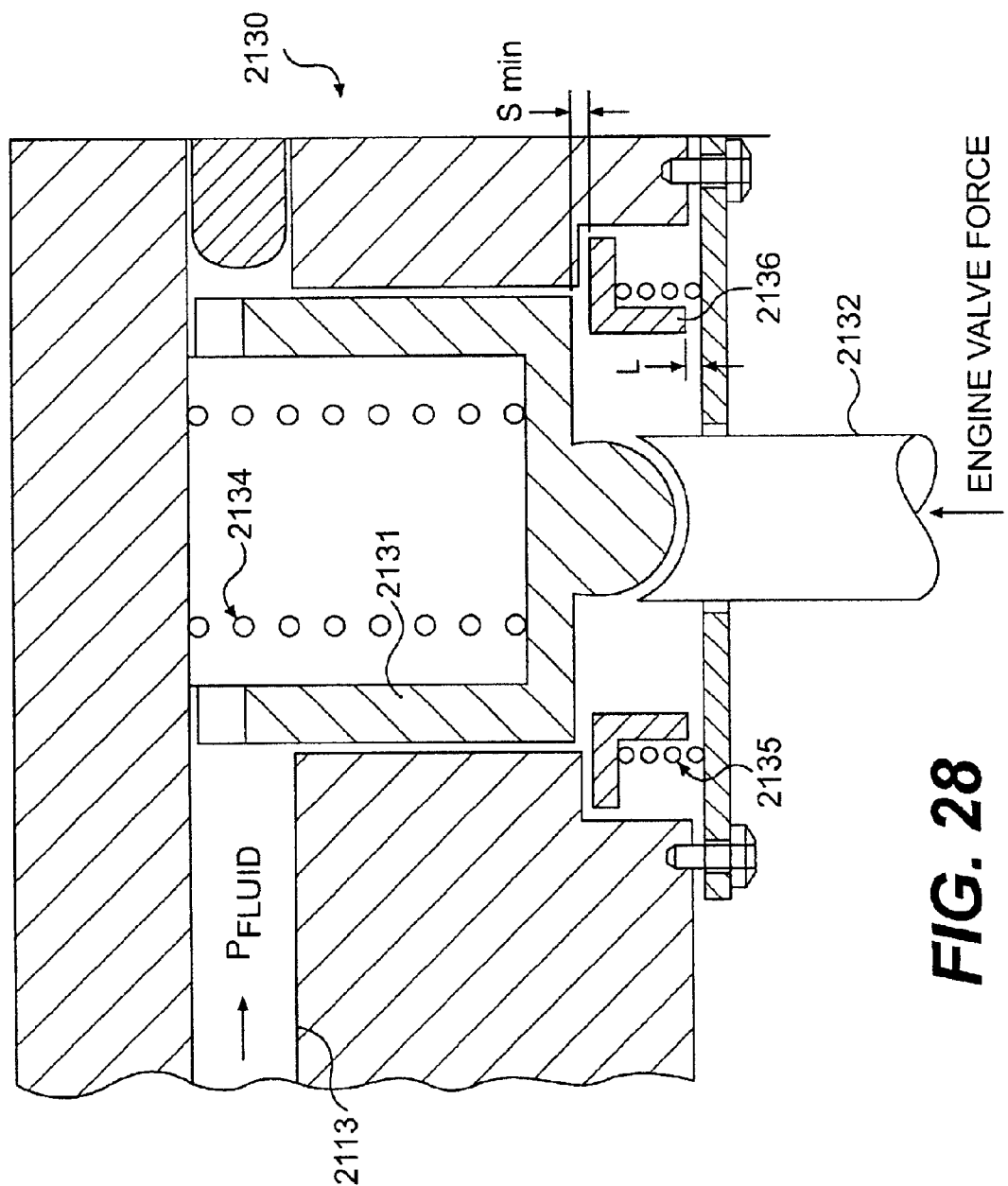
FIG. 28 is a schematic diagram of a valve actuation subsystem according to a sixth embodiment of the present invention.

It is contemplated that the same principle could be used with the push tube assembly described above through the use of a bleeding hole, as shown in FIG. 27. Furthermore, the piston assembly 2130 may include a spring 2135 and a spring guide 2136 to provide for variable bleeder lift, as shown in FIG. 28. Variable bleeder lift is desirable for braking optimization with engine speed. For example, as engine speed increases, the bleeder lift should increase to provide maximum engine braking. When engine speed is low, however, less braking, and, accordingly, less bleeder lift is required.

With reference to FIG. 28, when the engine speed is low, the pressure differential across the at least one exhaust valve (Pexh-Pcyl) is also low, and there is less tendency of valve floating. Accordingly, the piston assembly 2130 and the engine valve will travel only a small distance, S_min, as shown in FIG. 28. As the engine speed increases, the pressure differential also increases and the piston assembly 2130 is pushed against the spring 2135 and forces the spring guide 2136 into contact with the bottom surface of the rocker 2110. In this manner, the maximum travel of the piston assembly 2130, and correspondingly, the at least one engine valve, is then S_min+L, as shown in FIG. 28.

It is contemplated that the embodiment of the resettable IRB assembly 2100 may also be used for partial-cycle bleeder braking and/or compression release-type braking, as shown in FIG. 18.

Compared with known integrated engine rocker brakes, the IRB assembly 2200 of the present invention has a much lower initial braking load, less weight and inertia, and does not need a reset. As such, the present invention has much better reliability and durability than prior known valve actuation subsystems. In addition, because it incorporates the methods to control and increase bleeder brake performance discussed above, the IRB assembly 2200 of the present invention provides better braking performance than known bleeder braking systems. Furthermore, because the partial-cycle bleeder valve lift is minimal (approximately 1 mm) and does not occur during the majority of the intake stroke, the IRB assembly 2200 reduces the tendency of valve to piston contact in the engine cylinder.

Integrated Rocker Bleeder with External Actuation

Figure 29:
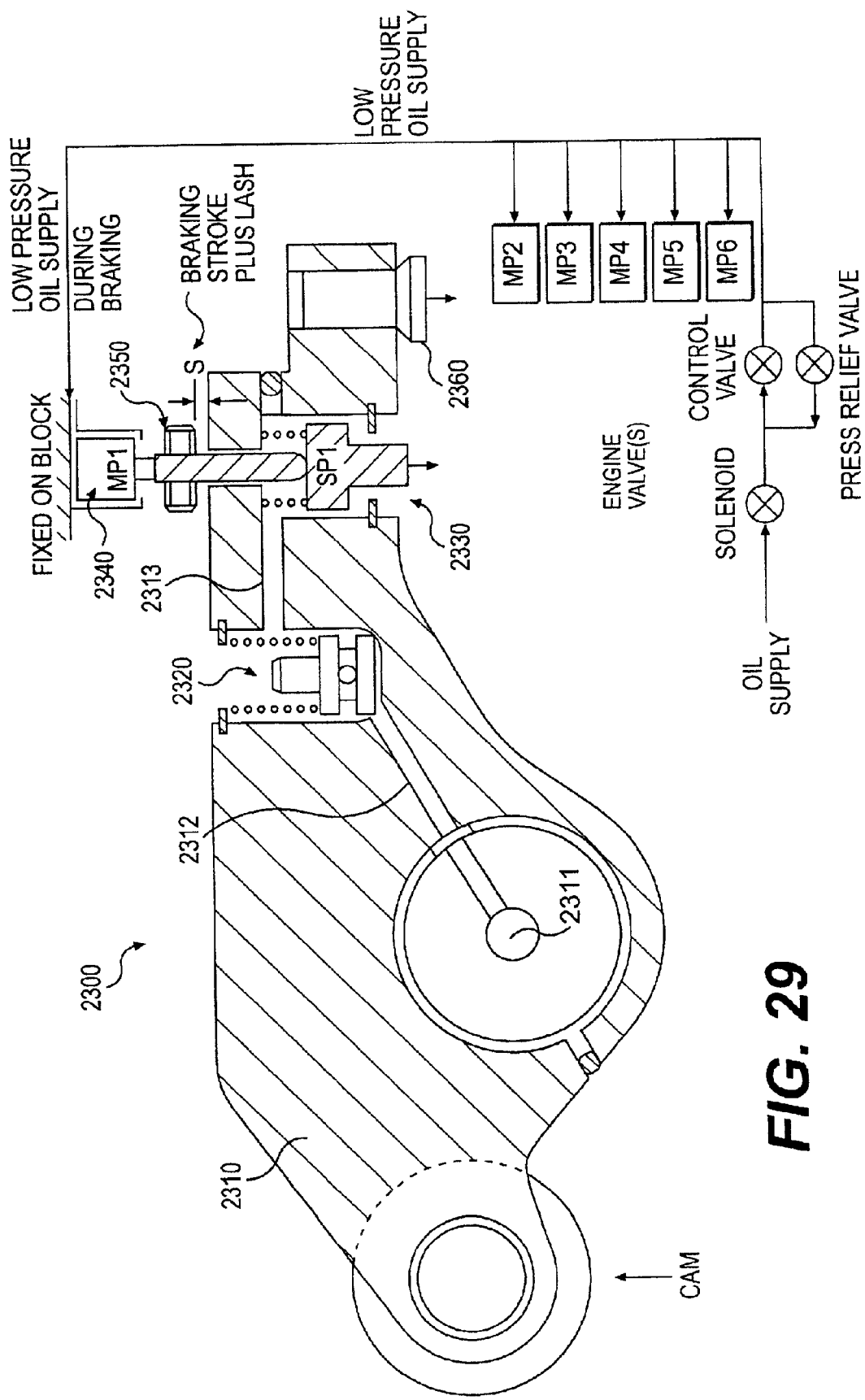
FIG. 29 is a schematic diagram of a valve actuation subsystem according to a seventh embodiment of the present invention.

In still another embodiment of the valve actuation subsystem 200 of the present invention, full-cycle bleeder brake operation is achieved with an IRB assembly 2300 that uses external actuation means instead of valve float. In the preferred embodiment, as shown in FIG. 29, the IRB assembly 2300 includes a rocker arm 2310, a supply valve assembly (not shown), a control valve assembly 2320, a slave piston assembly 2330, a master piston assembly 2340, an actuation pin 2350, and an valve actuation assembly 2360, which is connected to a valve bridge.

The rocker arm 2310 may include a plurality of passageways, forming a control circuit therein. The passageways are capable of receiving hydraulic fluid therein, such as, for example, engine oil. The rocker arm 2310 includes a first passageway 2311 that extends therethrough, as shown in FIG. 29. Hydraulic fluid is supplied to the IRB assembly 2300 through the first passageway 2311 from the supply valve assembly (preferably solenoid). The rocker arm 2310 also includes a second passageway 2312 that extends substantially orthogonal to the first passageway 2311. The second passageway 2312 is fluidically connected to the first passageway 2311. The rocker arm 2310 also includes a third passageway 2313. The third passageway 2313 is fluidically connected to the second passageway 2312.

The orientation of the first passageway 2311, the second passageway 2312, and the third passageway 2313, within the rocker arm 2310, may be modified based upon such factors as engine configuration and size.

The valve assembly 2320 is located within the rocker arm 2310 to control the flow of hydraulic fluid from the second passageway 2312 to the third passageway 2313. The valve assembly 2320 is preferably a control valve to prevent the backflow of hydraulic fluid from the third passageway 2313 to the second passageway 2312. As will be apparent to those of ordinary skill in the art, other suitable valve means may be employed to prevent the backflow of hydraulic fluid from the third passageway 2313 to the second passageway 2312.

In the preferred embodiment, the master piston assembly 2340 is fixed on the engine block 100. During braking, the master piston assembly 2340 is fluidically connected to a low-pressure oil supply, as shown in FIG. 29. As will be apparent to those of ordinary skill in the art, the low-pressure oil supply includes a solenoid valve, a control valve, and a pressure relief valve, and may feed master piston assemblies for each of the engine cylinders.

The slave piston assembly 2330 is located within the rocker arm 2310 below the master piston assembly 2340. The actuation pin 2350 is located between the slave piston assembly 2330 and the master pin assembly 2340, having a first portion extending within the rocker arm 2310 and a second portion extending outside the rocker arm 2310.

Operation of the IRB assembly 2300 that uses external actuation means instead of valve float will now be described. The IRB assembly is illustrated in positive power position in FIG. 29.

During engine bleeder braking cycles, engine oil is supplied to the rocker arm 2310. The engine oil flows through the first passageway 2311, through the second passageway 2312, through the valve assembly 2320 to the slave piston assembly 2330. Simultaneously, oil is also supplied to the external master piston assembly 2340 from the external oil supply. As the cam rotates and pushes the rocker arm 2310 and the valve actuation assembly 2360 to open the exhaust valves of the engine, the slave piston assembly 2330 and the actuation pin 2350 follow. The slave piston assembly 2330 contacts and actuates one braking valve.

As this occurs, the master piston assembly 2340 follows the actuation pin 2350 until the master piston assembly 2340 hits its bottom stop after a travel distance slightly larger than S, which is equivalent to the bleeder lift plus valve lash. As the exhaust valves return, the actuation pin 2350 contacts the master piston assembly 2340 and stops the slave piston assembly 2330 from returning. This keeps the one braking valve open while the rocker arm 2310 continues to move up until the non-braking valve actuated by the valve actuation assembly 2360 returns to its seat. This generates a relative motion, or gap, of S distance between the slave piston assembly 2330 and the rocker 2310. The gap S is filled with oil, which is trapped between the slave piston assembly 2330 and the control valve assembly 2320. The trapped oil holds the braking valve open during the entire full-cycle bleeder braking cycle. The resulting valve lift is illustrated in FIG. 17.

The oil pressure on the master piston assembly 2340 is regulated by the external pressure relief valve such that the level of force on the actuation pin 2350 is larger than the spring load of one valve (to hold the braking valve open), but smaller than the spring load of two valves (to allow the non-braking valve to return to its seat).

During positive power cycles, all supply valves shut and oil supply to the slave piston assembly 2330 and the master piston assembly 2340 is cut off. Oil trapped in the circuit is dumped out through the control valve assembly 2320. Both the braking and non-braking valves are driven by the rocker arm 2310 through the valve bridge and there is no load on the slave piston assembly 2330 and the master piston assembly 2340. As such, the normal exhaust valve lift profile for engine power operation is achieved.

Compared with known integrated engine rocker brakes, the IRB assembly 2300 of the present invention has a much lower braking load, less weight and inertia, and does not need a reset. As such, the present invention has much better reliability and durability than prior known valve actuation subsystems. In addition, because it incorporates the methods to increase bleeder brake performance discussed above, the IRB assembly 2300 provides better braking performance than known bleeder braking systems.

Integrated Rocker Bleeder with Mechanical Lock

In another embodiment of the present invention, partial-cycle bleeder brake operation is achieved with an IRB assembly 2400 that hydraulically initiates valve lift, but maintains valve lift with a mechanical lock. In this embodiment, as shown in FIG. 30, the IRB assembly includes a rocker arm 2410 having a first fluid passageway 2411 and a second fluid passageway 2412 formed therein, a supply valve assembly (not shown), an actuation pin 2420 housed in a first bore formed in the rocker arm 2410 for controlling the bleeder braking function, and a braking actuation piston assembly 2430 housed in a second bore formed in the rocker arm 2410 for actuating the at least one engine valve.

Figure 31:
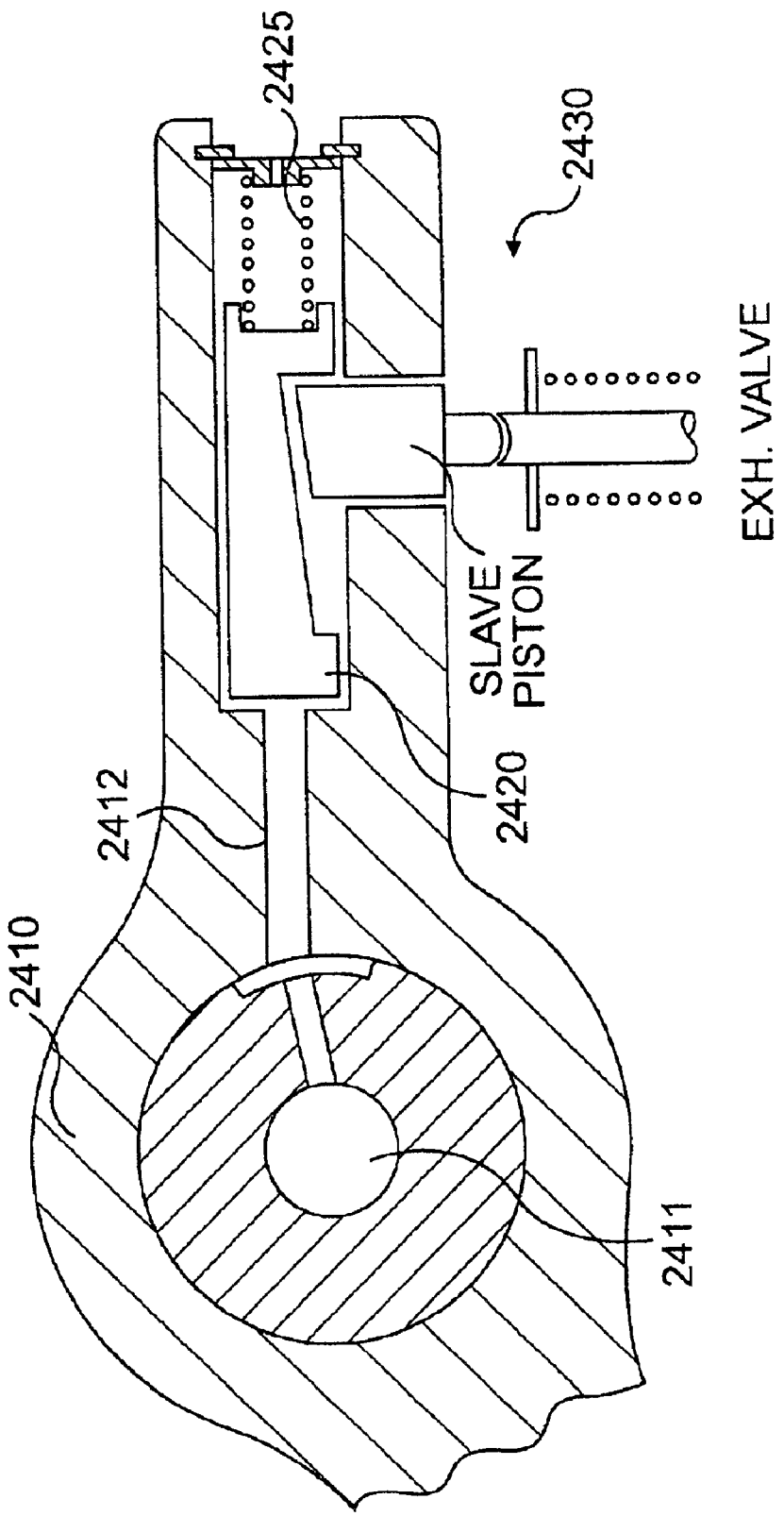
FIG. 31 is a schematic diagram of a valve actuation subsystem according to a ninth embodiment of the present invention.

In the preferred embodiment, the actuation pin 2420 includes a larger portion which is used during braking operation, and a smaller portion used during non-braking operation. Other embodiments of the actuation pin, including, but not limited to, a wedged-shaped pin, as shown in FIG. 31, could be used to accomplish the functions of the present embodiment.

Figure 30:
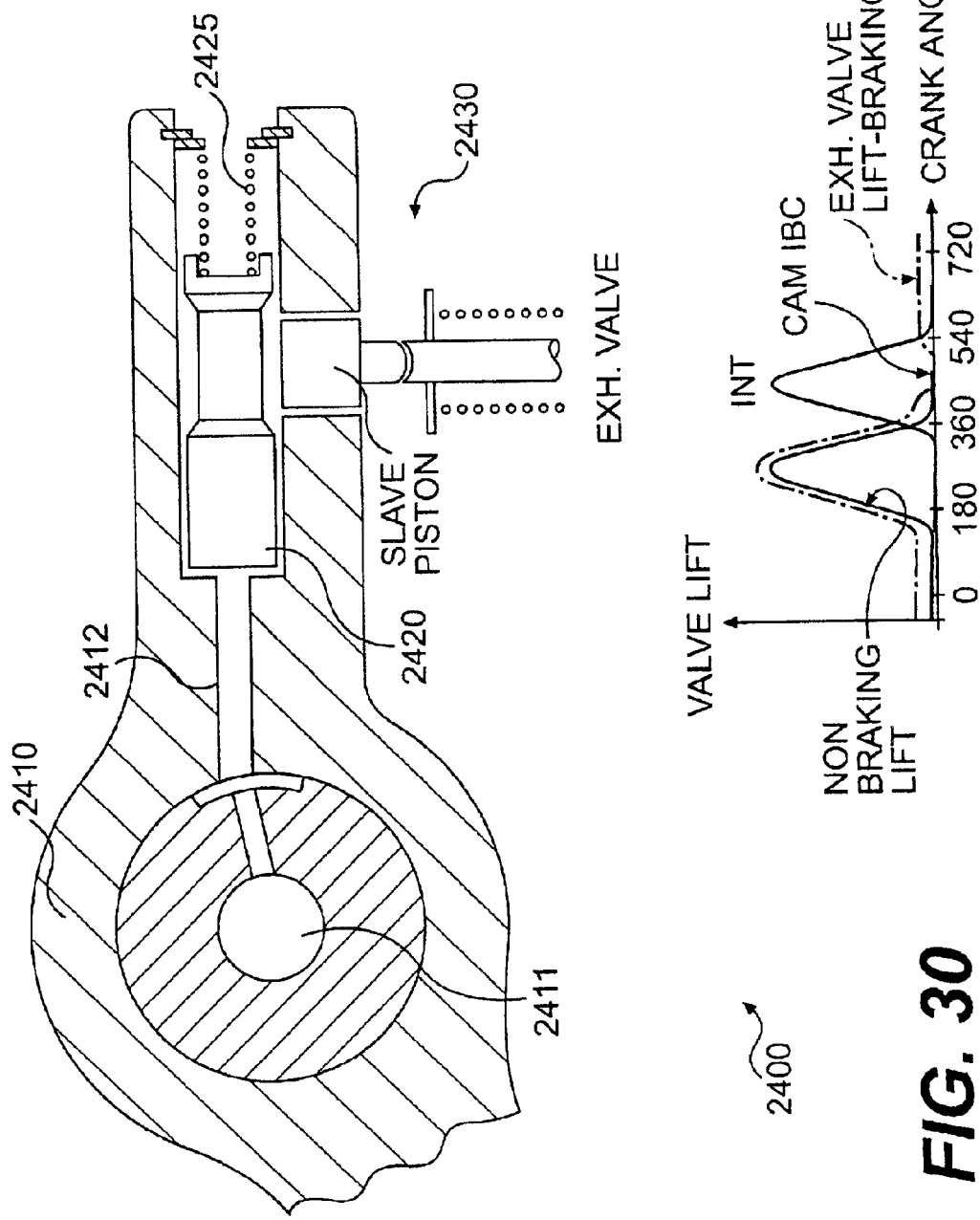
FIG. 30 is a schematic diagram of a valve actuation subsystem according to an eighth embodiment of the present invention.

During non-braking operation, the actuation pin 2420 is biased to the left, as shown in FIG. 30, by a spring 2425 secured to the rocker arm 2410. The braking actuation piston assembly 2430 is adapted such that there is a lash in the valve train which is equivalent to the bleeder brake valve lift plus the normal engine valve lash (i.e., when the engine is cold) when the cam is at the inner base circle (IBC) portion. As the cam continues to push the rocker 2410, the lash is taken up and the normal exhaust valve lift profile for engine power operation is achieved. The non-braking valve lift is represented by the thin line shown in FIG. 18.

During engine braking cycles, hydraulic fluid, such as, but not limited to, engine oil, is supplied through the supply valve means (preferably solenoid, not shown) to the rocker arm 2410 through the first fluid passageway 2411. The hydraulic fluid then flows through the second fluid passageway 2412. The fluid pressure created by the hydraulic fluid in the second fluid passageway 2412 overcomes the force of the spring 2425 and pushes the actuation pin 2420 to the right when the cam is at the IBC portion. It is contemplated that other means, including, but not limited to, hydraulic means, pneumatic means, electromagnetic means, mechanical means, and/or any combination of the above means, may be used to act on the actuation pin 2420 without departing from the scope of the present invention.

With the actuation pin 2420 forced to the right, the larger portion is engaged with the braking actuation piston assembly 2430. This forces the braking actuation piston assembly 2430 in a downward direction, taking up the lash in the valve train. The cam then continues from the IBC position, and the rocker follows. Accordingly, the valve lift follows the cam profile and partial-cycle bleeder braking operation is achieved, as illustrated by the heavy line in FIG. 18. It is contemplated that other embodiments of the bleeder assembly 2400 may be used for full-cycle bleeder braking.

For the wedged-shaped embodiment discussed above, the continuous engagement of the actuation pin 2420 and the slave piston 2430 eliminates any possibility of partial engagement. In addition, it is contemplated that the actuation pin 2420 and the spring 2425 could be flipped such that the spring force is in the same direction as the centrifugal force caused by the rotating rocker 2410. In this manner, the IRB assembly 2400 is fail-safe for both power and braking operations.

The IRB assembly 2400 of the present invention has several advantages. Because the system is simple and has fewer components, it is less expensive, easier to manufacture, and more reliable than many known bleeder braking systems. In addition, the present invention eliminates any hydraulic link. Holding a valve open to approximately 1–2 mm may be difficult using hydraulics because compliance and leakage can change the amount of lift over time and at different temperatures. As such, the present invention also eliminates the performance issues accompanying hydraulic compliance.

Integrated Rocker Bleeder with Automatic Lash Adjustment

In another embodiment of the present invention, bleeder brake operation is achieved with an IRB assembly 2500 that provides normal valve lift during positive power cycles that automatically adjusts for valve growth, valve wear and tolerance stack-up, and that provides accurate valve lift control of at least one engine valve during engine braking. It is contemplated that the present embodiment may be used for either partial-cycle or full-cycle bleeder braking.

Figure 32:
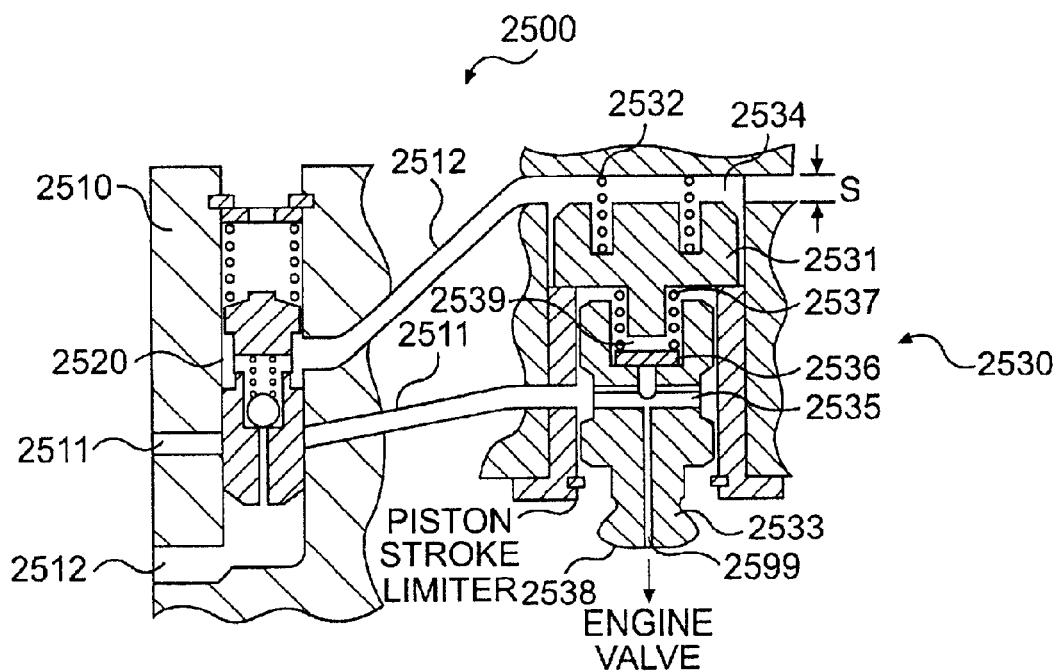
FIG. 32 is a schematic diagram of a valve actuation subsystem according to a tenth embodiment of the present invention.

One embodiment of the IRB assembly 2500 for partial-cycle bleeder braking is shown in FIG. 32. The IRB assembly 2500 includes a rocker arm 2510, a control valve assembly 2520, and a braking actuation piston assembly 2530.

The rocker arm 2510 includes a plurality of passageways, forming a hydraulic circuit therein. The passageways may include a first passageway 2511, capable of receiving hydraulic fluid supply from a first supply valve (not shown) and a second passageway 2512, capable of receiving hydraulic fluid supply from a second supply valve (not shown). In the preferred embodiment, the second supply valve is a braking solenoid valve. Other embodiments of the second supply valve for supplying hydraulic fluid to the second passageway 2512 are considered well within the scope of the present invention. The orientation of the first passageway 2511 and the second passageway 2512 within the rocker arm 2510 may be modified based upon such factors as engine configuration and size.

The control valve assembly 2520 is housed in a first bore formed in the rocker arm 2510. As will be apparent to those of ordinary skill in the art, other embodiments of the control valve are considered well within the scope of the present invention.

The braking actuation piston assembly 2530 is housed in a second bore formed in the rocker arm 2510 for actuating at least one engine valve. The braking actuation piston assembly 2530 includes an upper piston 2531, secured to the rocker arm 2510 by a first spring 2532. An upper gap 2534 is formed between the upper piston 2531 and the rocker arm 2510, having a height, S, which is preferably equivalent to the bleeder brake valve lift. The braking actuation piston assembly 2530 further includes a lower piston 2533, having a contact surface 2538 for contacting the at least one engine valve. A recess 2535 may be formed within the lower piston 2533, capable of receiving hydraulic fluid, such as, for example, engine oil therein. A spring loaded check disk 2536 is located above the lower piston 2533 and is secured to the upper piston 2531 by a second spring 2537. The check disk 2536 forms a chamber 2539 between the lower piston 2533 and the upper piston 2531.

The lower piston 2533 may also include a lubrication passage 2599 formed therein. The lubrication passage 2599 is adapted to provide lubrication, such as, for example, engine oil, to the contact surface 2538 between the lower piston 2533 and the engine valve bridge or stem (not shown). The lubrication passage 2599 may help prevent jacking from occurring during engine braking.

With continued reference to FIG. 32, operation of the IRB assembly 2500 during positive power will now be described. Engine oil is supplied through the first passageway 2511 past the control valve assembly 2520 into the recess 2535. The oil pressure overcomes the force of the second spring 2537 and flows past the check disk 2536 into the chamber 2539. The oil locked in the chamber 2539 generates a hydraulic link capable of automatically adjusting for valve growth, valve wear, and tolerance stack-up.

During positive power cycles, the braking solenoid valve is closed and no oil is supplied through the second passageway 2512 to the upper gap 2534. As such, the upper gap 2534, which has a height S, acts as a lash to absorb the bleeder brake valve lift. It should be noted that the first spring 2532 is adapted to have a force that is larger than the oil pressure force below it. In that manner, the height of the upper gap 2534 is not reduced undesirably. Because the extra bleeder lift is absorbed by the upper gap 2534, the normal exhaust valve lift profile is achieved during positive power, as shown by the thin line in FIG. 18.

Operation of the IRB assembly 2500 during braking cycles will now be described. The braking solenoid valve is opened and supplies oil to the second passageway 2512. The oil pressure created pushes the control valve assembly 2520 up and the oil is fed through the second passageway 2512 to the upper gap 2534 when the cam is at the IBC portion. As such, the engine valve lift profile now follows the cam profile with bleeder braking lift and forms a partial-cycle bleeder braking cycle, as shown by the heavy line in FIG. 18. When engine braking is no longer desired, the upper gap 2534 is drained to cause the fluid column in it to collapse. The IRB assembly 2500 then follows positive power operation, as discussed above.

Figure 33:
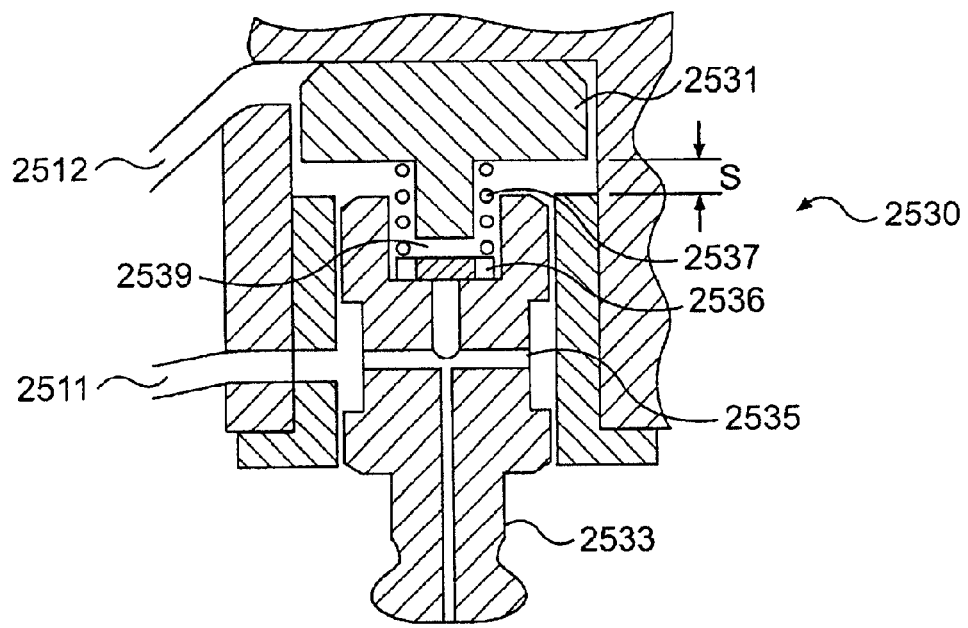
FIG. 33 is a schematic diagram of a valve actuation subsystem according to an eleventh embodiment of the present invention.

In another embodiment of the IRB assembly 2500, full-cycle bleeder braking may be achieved without altering the cam profile. The IRB assembly includes the same components, as described above, however, the design of the braking actuation piston assembly 2530 is changed, as shown in FIG. 33. The automatic valve lash adjustment is accomplished through the hydraulic link between the upper and lower pistons. During engine braking, oil pressure alone, or combined with the valve floating force, pushes the piston assembly 2530 and the braking valve(s) down to create a full-cycle bleeder braking event.

Compact Rocker Bleeder Brake

In another embodiment of the present invention, the valve actuation subsystem 200 is an integrated rocker bleeder (IRB) assembly 20200. In the preferred embodiment, as shown in FIG. 43, the IRB assembly 20200 includes a rocker arm 20210, preferably, an exhaust rocker arm, a supply valve assembly (not shown), and a braking screw assembly 20220 for actuating at least one engine braking valve.

Figure 43:
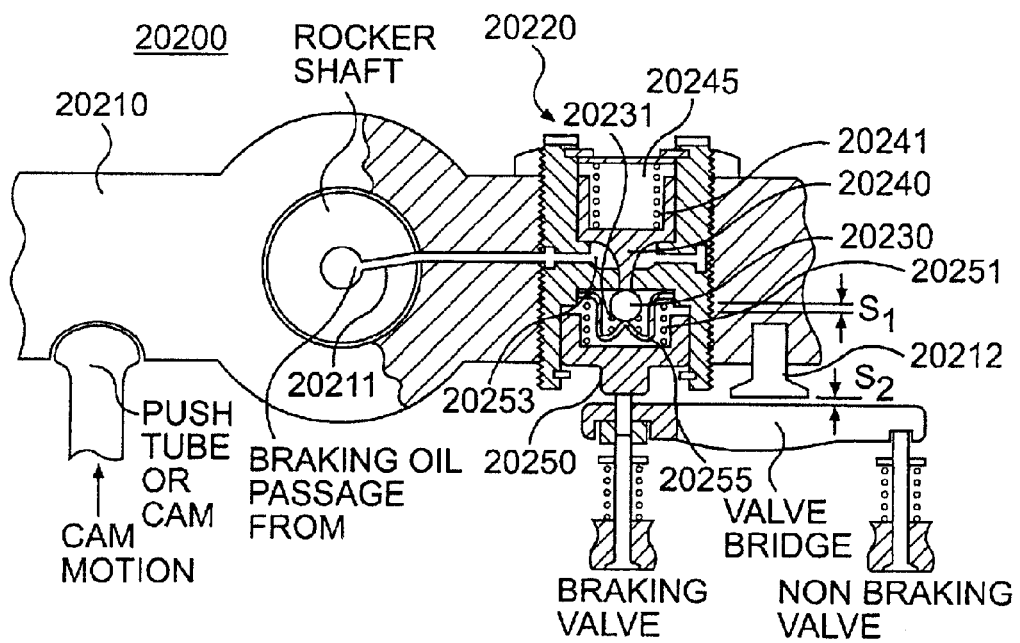
FIG. 43 is a schematic diagram of a valve actuation subsystem according to a twentieth embodiment of the present invention.
Figure 44:
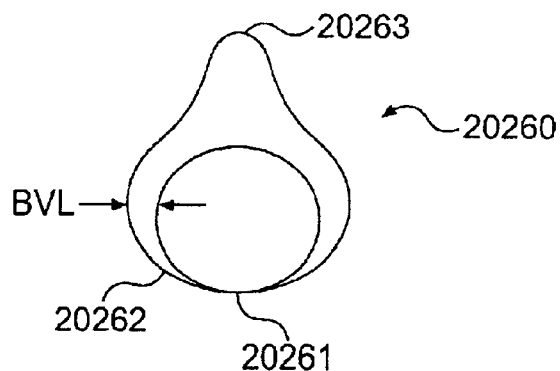
FIG. 44 is a schematic diagram of a cam lobe profile according to one embodiment of the present invention.

The rocker arm 20210 includes at least one fluid passageway 20211 formed therein, as shown in FIG. 43. The fluid passageway 20211 is adapted to receive engine fluid, such as, for example, oil, from the supply valve and supply the fluid to the braking screw assembly 20220. In the preferred embodiment of the present invention, the supply valve is a three-way solenoid valve capable of selectively supplying the fluid to the fluid passageway 20211. Other embodiments of the supply valve for supplying fluid to the rocker arm 20210, however, are considered well within the scope of the present invention. The orientation of the at least one fluid passageway 20211 within the rocker arm 20210 may be modified based upon such factors as engine configuration and size. The motion of the rocker arm 20210 is preferably derived from the motion of a cam 20260, as shown in FIG. 44. In the alternative, as will be apparent to those of ordinary skill in the art, the motion of the rocker arm 20210 may be derived from a push tube assembly.

The rocker arm 20210 further includes a valve bridge actuation assembly 20212 formed therein for contacting an engine valve bridge, which in turn, actuates the at least one engine braking valve and at least one engine non-braking valve. As shown in FIG. 43, the valve bridge actuation assembly 20212 is formed such that a lash equal to a height of $S_2$ exists between the valve bridge actuation assembly 20212 and the valve bridge itself. The height $S_2$ is preferably equal to or greater than the braking valve lift such that, during positive power operation, the braking valve lift is absorbed and the non-braking engine valve achieves the desired normal valve lift.

The braking screw assembly 20220 is housed in a bore formed in the rocker arm 20210, as shown in FIG. 43. The braking screw assembly 20220 preferably comprises a check valve 20230, a brake plunger 20240, and a braking acutation piston 20250. A first chamber 20245 is formed between the brake plunger 20240 and the top of the braking screw assembly 20220. A second chamber 20255 is formed between the braking actuation piston 20250 and the check valve 20230. An area 20253 is also formed between the brake plunger 20240 and the check valve 20230.

The check valve 20230, preferably a ball check valve, is biased upwards against the bottom end of the brake plunger 20240 by a spring 20231. During engine braking operation, when the brake plunger 20240 is pushed away (upwards) by engine fluid pressure, the check valve 20230 is biased upwards against its seat. The brake plunger 20240 is biased downwards against its seat and the check valve 20230 by a spring 20241 to form a normal open position for non-braking operation. The braking actuation piston 20250 is biased downwards against the engine valve by a spring 20251 such that the rocker arm 20210 and the engine valve remain in contact all the time. This arrangement helps to avoid rocker flipping that may occur due to the valve lash $S_2$.

As shown in FIG. 43, a gap equal to a height of $S_1$, which is preferably the height of the braking valve lift, is formed between the braking actuation piston 20250 and the rocker arm 20210.

Figure 45:
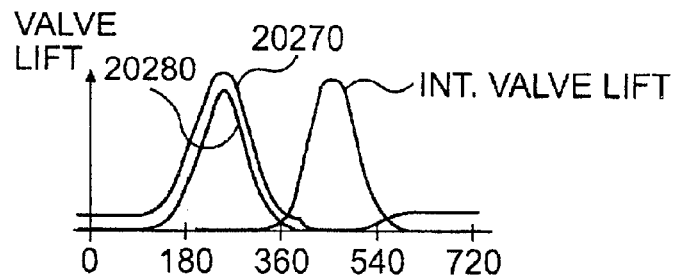
FIG. 45 illustrates a valve lift profile for at least one embodiment of the valve actuation subsystem of the present invention.

Operation of the IRB assembly 20200 of the present invention during engine braking will now be described. FIG. 45 illustrates the braking valve lift profile 20270 and the non-braking valve lift profile 20280 that may be experienced with the preferred embodiment of the IRB assembly 20200.

Engine fluid is supplied from the supply valve to the rocker arm 20210 through the fluid passageway 20211. As the engine fluid fills the fluid passageway 20211 and the area 20253, the fluid pressure pushes the brake plunger 20245 upwards, separating it from the check valve 20230. Simultaneously, the fluid pressure pushes the check valve 20230 downwards and the engine fluid fills the chamber 20255. The filling of the chamber 20255 preferably occurs while the cam is at its inner base circle (IBC) portion during most of the intake valve lift period. The cam IBC portion is illustrated by the lobe portion 20261, as shown in FIG. 44.

Once the chamber 20255 is filled with fluid, the bias of the spring 20231 pushes the ball of the check valve 20230 back to its seat, separating the fluid in the area 20253 from the chamber 20255. This creates a hydraulic link between the braking actuation piston 20250 and the check valve 20230. As the cam 20260 rotates, the rocker arm 20210 rotates around the rocker shaft and the braking actuation piston 20250 actuates the braking valve. As illustrated by the braking valve lift profile 20270 in FIG. 45 and the lobe portion 20262 in FIG. 44, the braking valve lift begins around bottom dead center (BDC) of the intake valve closing (IVC). Because of the preset lash $S_2$ between the valve bridge and the valve bridge actuation assembly 20212, the cam lobe portion 20262 does not cause the valve bridge actuation assembly 20212 to actuate the non-braking valve.

As the cam 20260 continues to rotate, the braking valve is held open by the hydraulic link between the braking actuation piston 20250 and the check valve 20230. When the cam 20260 reaches the cam lobe portion 20263 for the main exhaust event, the valve bridge actuation assembly 20212 contacts the valve bridge and opens the braking valve and the non-braking valve. As the cam 20260 returns to the IBC 20261, the braking valve and the non-braking valve re-seat. Once the valves are seated, it is contemplated that additional fluid could refill the hydraulic circuit to compensate for any leakage that may have occurred during engine braking operation. The braking event continues cycle by cycle until the braking-off signal is issued. At this point, the braking fluid is dumped to the ambient through the supply valve.

During positive power operation, the supply valve shuts off and no fluid is delivered to the rocker arm 20210. Without fluid pressure in the area 20253, the brake plunger 20240 moves down by the bias of the spring 20241 and pushes the check valve 20230 off its seat. The fluid in the chamber 20255 is drained, breaking the hydraulic link between the braking actuation piston 20250 and the check valve 20230. As the cam 20260 rotates, this allows the braking actuation piston 20250 to move up a distance $S_1$. Because of the lash $S_2$ between the valve bridge and the valve bridge actuation assembly 20212, the braking valve lift on the cam 20260 is absorbed. Thus, during positive power operation, only normal exhaust valve lift is achieved, as illustrated by the non-braking valve lift profile 20280 in FIG. 45. It is contemplated that lubrication may be provided to the braking actuation piston 20250 and the valve bridge actuation assembly 20212.

The IRB assembly 20200 of the present invention has several advantages over known engine braking systems. Because the system is simple and combines multiple functionality into one screw assembly, it is less expensive, and easier to manufacture than many known bleeder braking systems. Moreover, given the reduced valve lift of the present bleeder braking system, as compared with the valve lifts of known compression release braking systems, the present invention reduces valve bridge tilt and side loading, and the potential of valve to piston contact. This leads to a more reliable braking system. Furthermore, the present invention reduces the exhaust and intake valve overlap to improve braking performance.

Bleeder Brake with Collapsible Adjusting Screw

Figure 34:
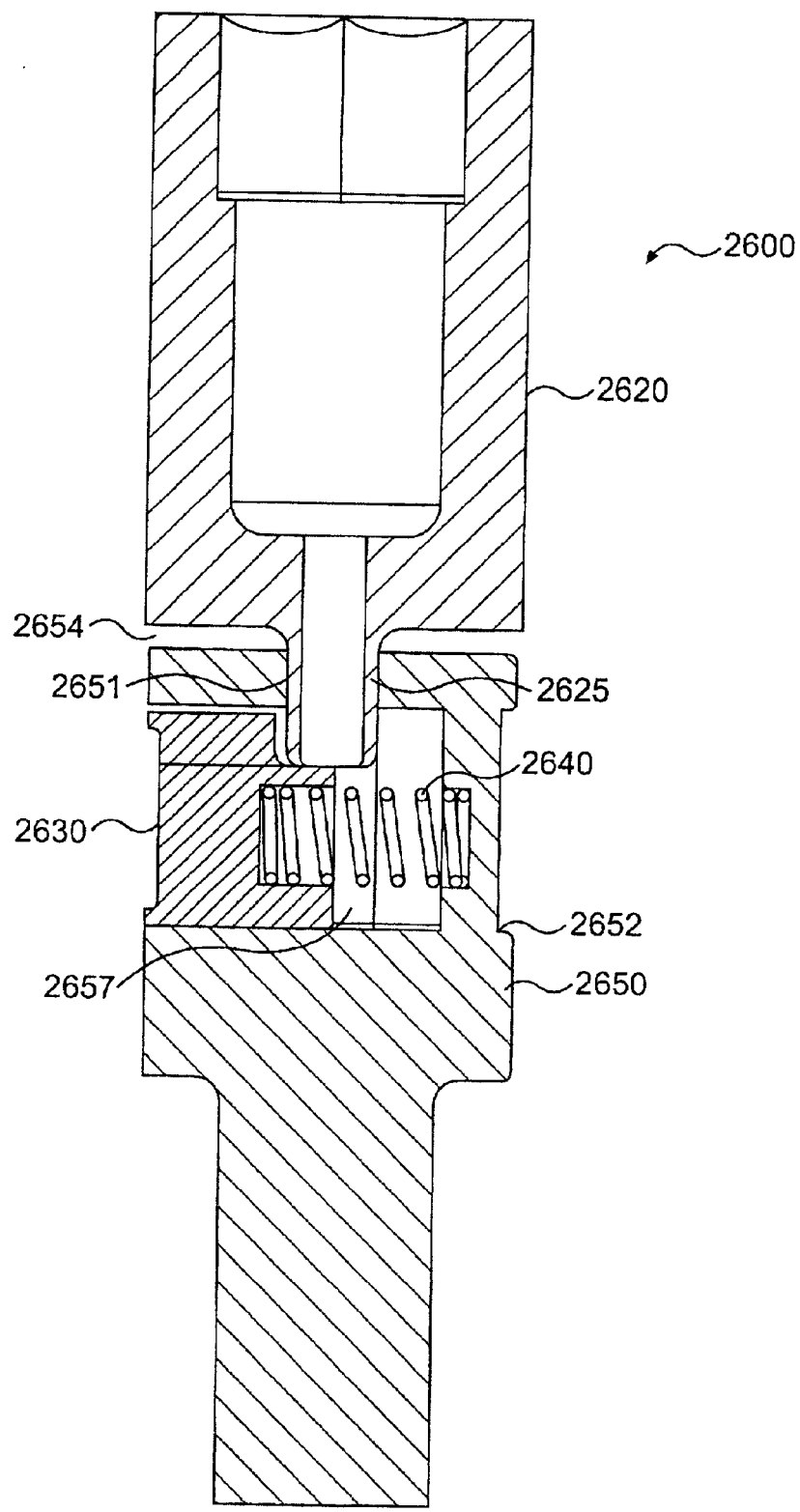
FIG. 34 is a schematic diagram of a valve actuation subsystem according to a twelfth embodiment of the present invention.

In another embodiment of the present invention, bleeder brake operation is achieved with a mechanical bleeder assembly 2600, as shown in FIG. 34, that is hydraulically actuated, but maintains the valve lift for at least one engine valve with a mechanical lock. It is contemplated that embodiments of the bleeder assembly 2600 may be used for either partial-cycle or full-cycle bleeder braking.

For partial-cycle bleeder braking, the bleeder assembly 2600 includes a rocker arm 2610 (not shown), an adjusting screw 2620, a locking piston 2630, a return spring 2640, and a collapsible piston 2650.

The rocker arm 2610 includes a bore, formed therein at the end, that is drilled, reamed, and tapped to a desired depth for receiving the components of the bleeder assembly 2600 and such that the collapsible piston 2650 has a typical piston fit therein. The rocker arm 2610 is driven by a cam (not shown) having a cam profile designed with a bleeder lift of approximately 1 mm for achieving partial-cycle bleeder brake operation.

The adjusting screw 2620 threads into the bore at the end of the rocker arm 2610. The adjusting screw 2620 includes a protrusion 2625 extending from the bottom of the adjusting screw 2620, as shown in FIG. 34.

The collapsible piston 2650 is received in the bore of the rocker arm 2610 and includes a cutout 2651 that receives the protrusion 2625 of the adjusting screw 2620. A locking volume 2657 where the collapsible piston 2650 is adapted to slide with respect to the adjusting screw 2620 is also formed therein. The collapsible piston 2650 further includes an annular portion 2652, forming an annulus around the collapsible piston 2650. A gap 2654 is also formed between the collapsible piston 2650 and the adjusting screw 2620. The annular portion 2652 is in fluid communication with the gap 2654.

The locking piston 2630 is located in the annular portion 2652 of the collapsible piston 2650, and has an annular portion equivalent in diameter to the annulus around the collapsible piston 2650, as shown in FIG. 34. The return spring 2640 is secured to the locking piston 2630 and biases the locking piston 2630 against the bore of the rocker arm 2610. Against the force of the return spring 2640, the locking piston 2630 is slidably moveable within the locking volume 2657.

Operation of the bleeder assembly 2600 during positive power will now be described. During positive power, the return spring 2640 biases the locking piston 2630 against the bore of the rocker arm 2610. As the cam pushes the rocker arm 2610, the collapsible piston 2650 contacts the at least one engine valve, but the collapsible piston 2650 collapses into the gap 2654, preventing the at least one engine valve from actuating. The bleeder assembly 2600 is adjusted such that the distance that the collapsible piston 2650 collapses is equal to the desired lash, i.e., the bleeder valve lift plus any desired valve growth. For example, if the bleeder valve lift is to be approximately 1 mm, and valve growth is measured to be approximately 0.25 mm, the bleeder assembly may be adjusted such that the collapsible piston 2650 collapses approximately 1.25 mm. The collapsing of the collapsible piston 2650 effectively eliminates any brake motion during positive power. As the cam continues to rotate, the entire lash is absorbed and the actuator portion 2653 eventually actuates the at least one engine valve for a main exhaust event. As such, a normal exhaust valve lift profile is achieved during positive power.

Operation of the bleeder assembly 2600 during engine braking will now be described. When engine braking is required, a supply valve (not shown) communicates hydraulic fluid through a hydraulic circuit formed in the rocker arm 2610 to the bleeder assembly. In the preferred embodiment of the present invention, the hydraulic fluid is engine oil and the supply valve is a solenoid valve.

The engine oil acts to pressurize the annular portion 2652. This pressure acts against the force of the return spring 2640 and causes the locking piston 2630 to begin to slide into the locking area 2657. Simultaneously, the oil travels into the gap 2654 between the collapsible piston 2650 and the adjusting screw 2620. This causes the collapsible piston 2650 and the adjusting screw 2620 to separate from each other and allows the locking piston 2630 to move into the locking area 2657 and into a locked position. In this position the collapsible piston 2650 cannot collapse because the locking piston 2630 abuts the protrusion 2625 which translates load through it.

With the collapsible piston 2650 extended there is no brake lash and the collapsible piston 2650 contacts the at least one engine valve. The cam rotates and the rocker 2610 follows. As such, the bleeder assembly 2600 follows the cam profile to achieve a partial-cycle bleeder brake operation.

The bleeder assembly 2600 of the present invention has several advantages over known bleeder brakes. Because the system is simple and has fewer components, it is less expensive, and easier to manufacture than many known bleeder braking systems. Moreover, given the sufficient contact area of the collapsible piston 2650 and the relatively small brake lift, the impact stresses are low and the bleeder assembly 2600 is more reliable. In addition, the present invention eliminates any hydraulic link. Holding a valve open to approximately 1–2 mm is difficult using hydraulics because compliance and leakage can change the amount of lift over time and at different temperatures. As such, the present invention also eliminates the performance issues accompanying hydraulic compliance.

Figure 35:
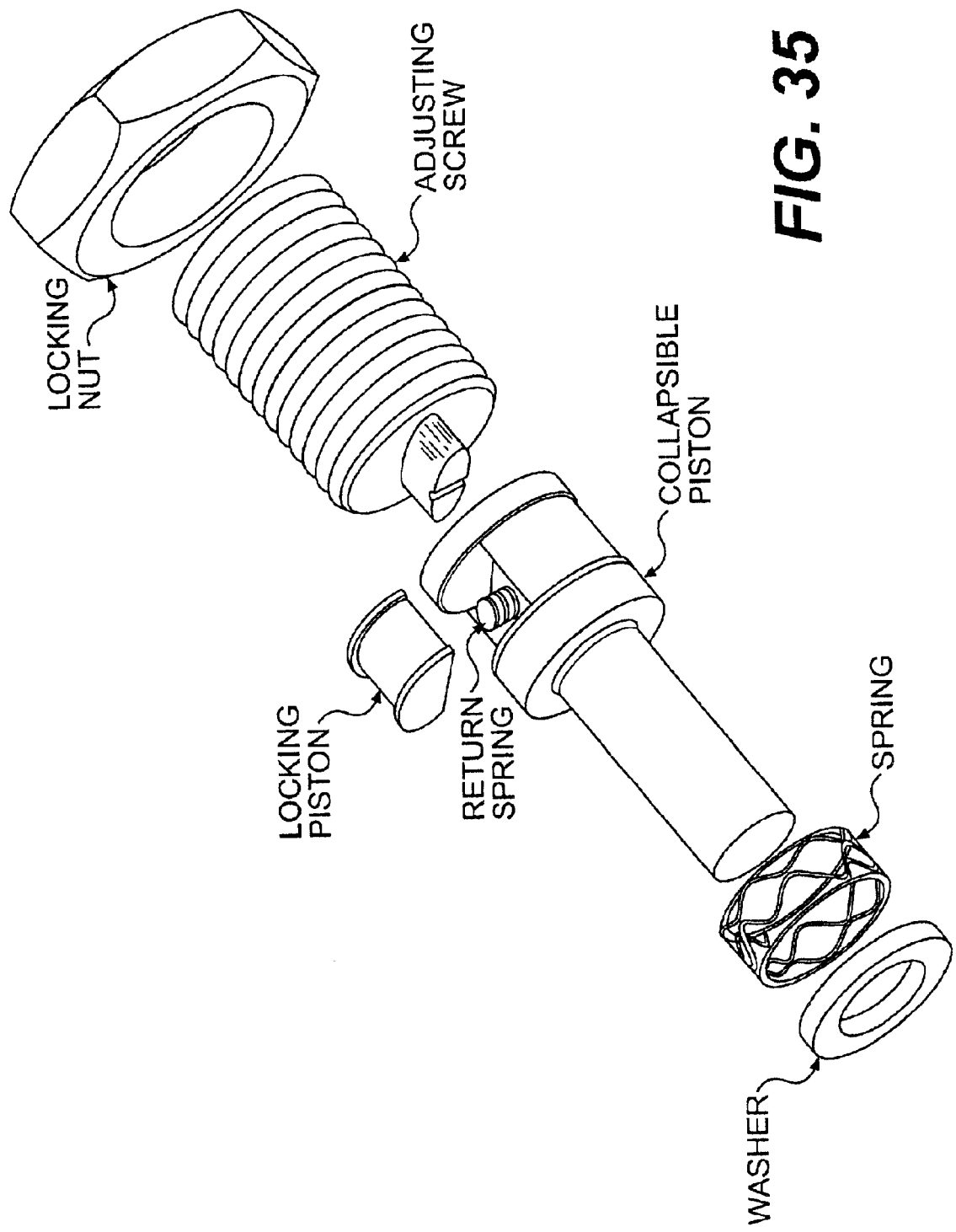
FIG. 35 is a schematic diagram of a valve actuation subsystem according to a thirteenth embodiment of the present invention.

In an alternative embodiment, as shown in FIG. 35, the bleeder assembly 2600 may be slightly modified for full-cycle bleeder brake operation. The bleeder assembly 2600 may be threaded into a bolt-on brake housing (not shown) rather than the rocker arm 2610 and positioned above the at least one engine valve, or in the alternative, an exhaust rocker. In addition, the bleeder assembly 2600 may further include a light spring located around the collapsible piston 2650. During positive power, the bleeder assembly 2600 does not follow the motion of the cam because it is no longer housed in the rocker arm 2610. Rather, the spring 2680 holds the collapsible piston 2650 in the brake housing and a typical brake lash is set to allow for valve growth. As such, positive power is not affected and the valve profile includes a main exhaust event. During engine braking operation, the bleeder assembly 2600 functions as described above.

Figure 36:
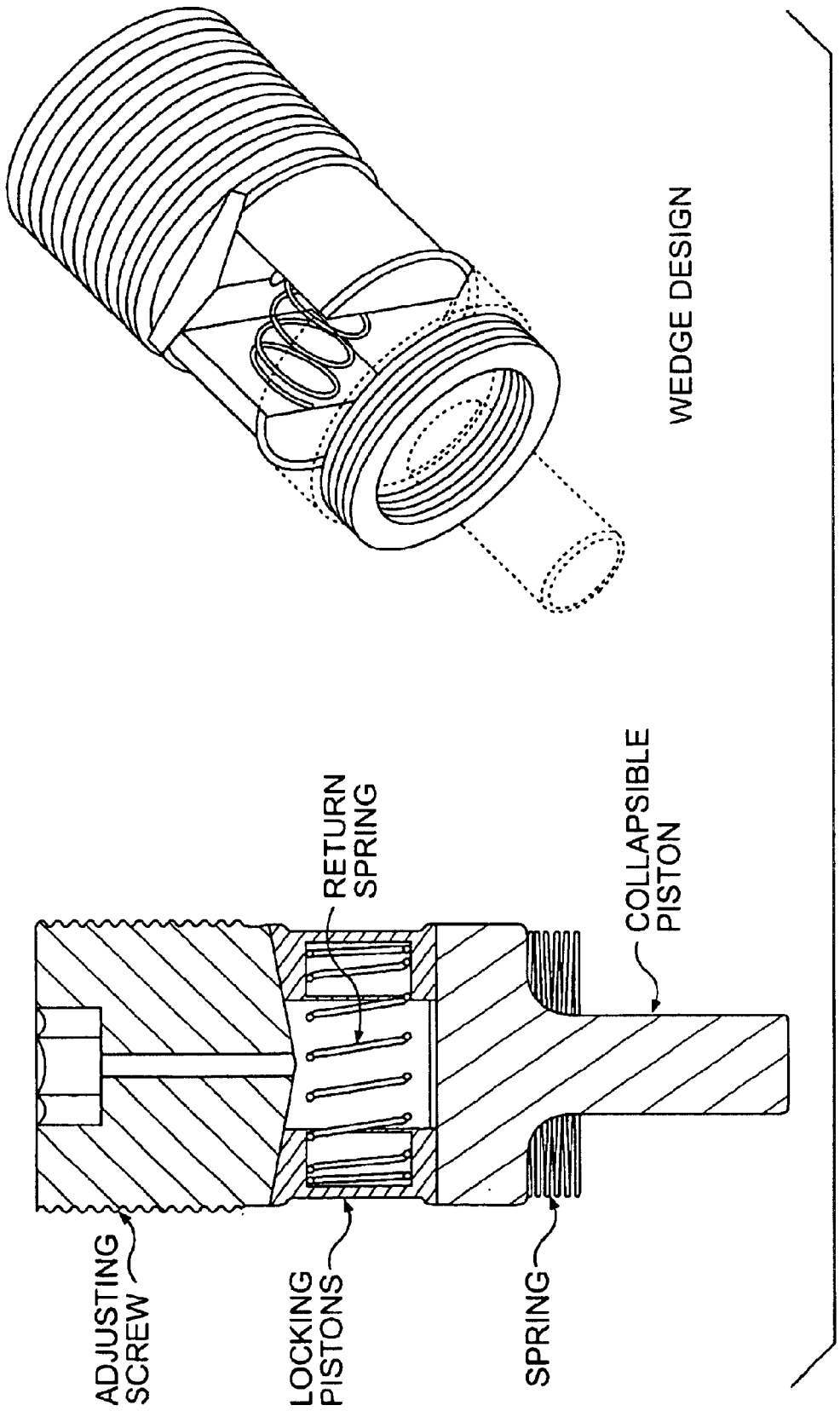
FIG. 36 is a schematic diagram of a valve actuation subsystem according to a fourteenth embodiment of the present invention.

In an alternative embodiment, as shown in FIG. 36, the bleeder assembly 2600 may be slightly modified for partial or full-cycle bleeder operation by using two wedge-shaped locking pistons 2630. This design does not require hydraulic pressure to separate the collapsible piston 2650 and the adjusting screw 2620. Rather, the locking pistons 2630 mechanically separate the components as the they slide into the locking volume 2654. The continuous engagement of the locking pistons 2630 eliminates any possibility of partial engagement.

Partial-Cycle Bleeder Brake by Intake Valve Return Motion

Figure 37:
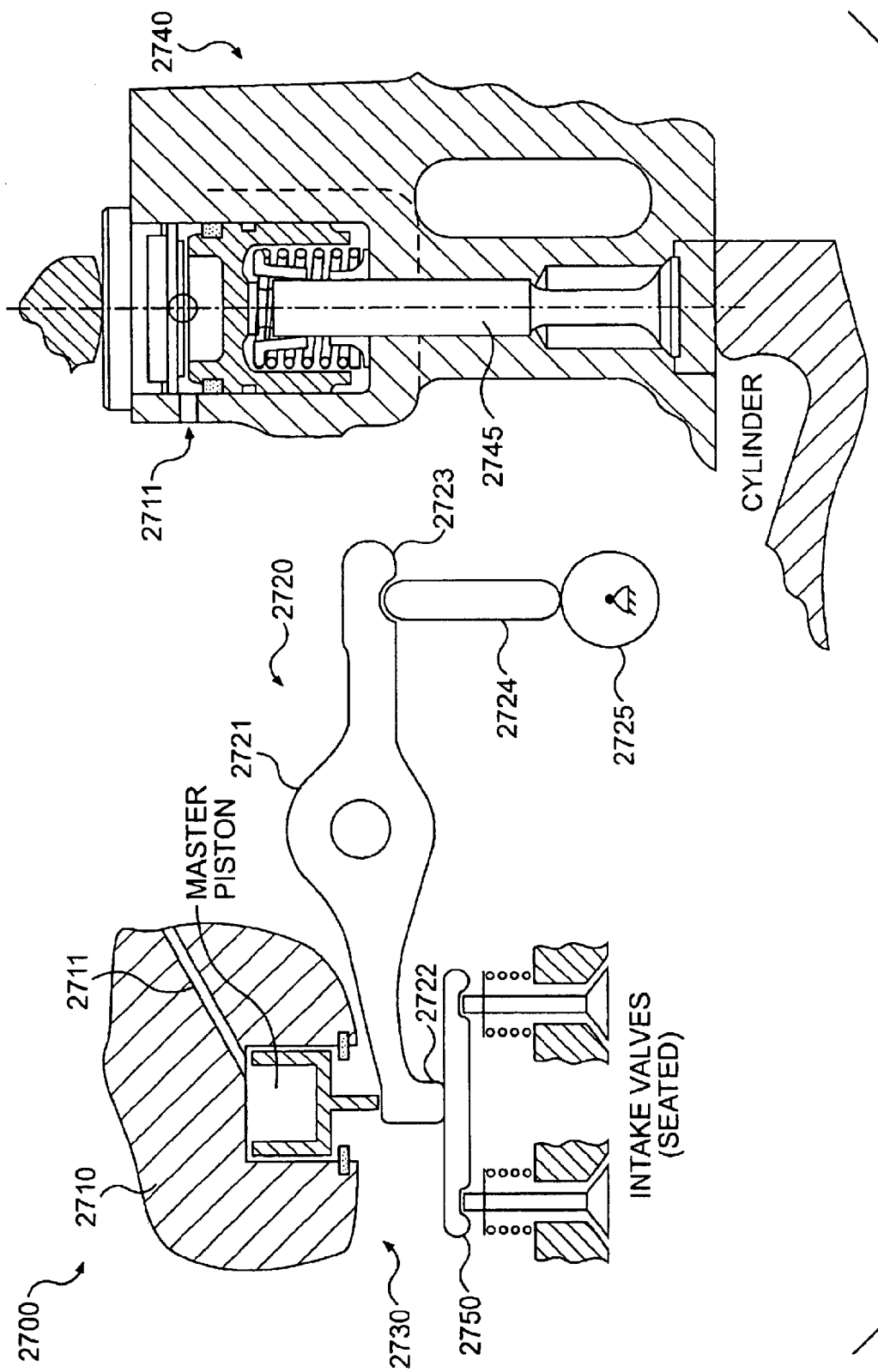
FIG. 37 is a schematic diagram of a valve actuation subsystem according to a fifteenth embodiment of the present invention.

In another embodiment of the present invention, the valve actuation subsystem 200 is a bolt-on bleeder brake assembly 2700 that utilizes intake valve return motion to achieve a partial-cycle bleeder brake operation. In the preferred embodiment, as shown in FIG. 37, the bleeder brake assembly includes a housing 2710, an intake rocker assembly 2720, a master piston assembly 2730 located in a first bore formed in the housing 2710, and a slave piston assembly 2740. The housing 2710 includes at least one passageway 2711 formed therein for hydraulic communication between the master piston assembly 2730 and the slave piston assembly 2740.

The intake rocker assembly 2720 includes an intake rocker arm 2721 having a first end 2722 and a second end 2723. The first end 2722 of the intake rocker arm 2721 is in contact with the master piston assembly 2730 and an intake valve bridge 2750 which actuates at least one intake engine valve. The intake rocker assembly 2720 further includes a push tube assembly 2724 having a first end in contact with an intake cam 2725 and a second end in contact with the second end 2723. Other means for driving the intake rocker assembly 2720 are considered within the scope of the present invention. For example, it is contemplated that the intake rocker may be directly driven by the cam 2725.

The slave piston assembly 2740 is located in a second bore formed in the housing 2710. The slave piston assembly 2740 includes an actuation piston 2745 for actuating at least one engine exhaust valve. In the preferred embodiment of the present invention, the at least one engine exhaust valve is a dedicated fifth braking valve. It is contemplated, however, that the bleeder brake assembly 2700 could be modified to open at least one regular engine exhaust valve. These modifications would include the addition of a control valve (not shown) between the master piston assembly 2730 and the slave piston assembly 2740 in order to hold the higher braking load from the regular exhaust valve.

Operation of the bleeder brake assembly 2700 during engine braking operation will now be described. As the intake cam 2725 pushes the intake rocker arm 2721, the intake rocker arm 2721 rotates causing the first end 2722 to push down the intake valve bridge 2750, which in turn actuates the at least one engine intake valve. As the intake valves open, the master piston assembly 2730 is pushed out by oil pressure in the passageway 2711. As the intake valves return, the intake valve bridge 2750 pushes the first end 2722 of the intake rocker arm 2721 up. The first end 2722 of the intake rocker arm 2721 transfers this motion to the master piston assembly 2730. Through the hydraulic fluid in the passageway 2711, the master piston assembly 2730 transfers the motion to the slave piston assembly 2740. The hydraulic fluid pressure, in turn, causes the actuation piston 2745 to actuate the at least one exhaust valve. The timing and magnitude of the bleeder valve lift can be controlled by the hydraulic ratio in the passageway 2711 and/or by the lash between the actuation piston 2745 and the at least one exhaust valve. The fact that two intake valves are actuating (preferably) one exhaust valve is also considered when overcoming the braking load from the fifth braking valve.

After the intake valves return to their seats, the bleeder valve lift is held constant until the intake valves open again. At this point, the master piston assembly 2730 again follows the intake valve motion, causing the hydraulic link in the passageway 2711 to break, and the slave piston assembly 2740 and the exhaust valve(s) to re-seat. The valve lift profile for the bleeder brake assembly 2700 is illustrated in FIG. 18.

Other embodiments of the valve actuation system 200 are considered within the scope of the present invention:

Air Actuated, Mechanically Locked Full-Cycle Bleeder Brake

Figure 38:
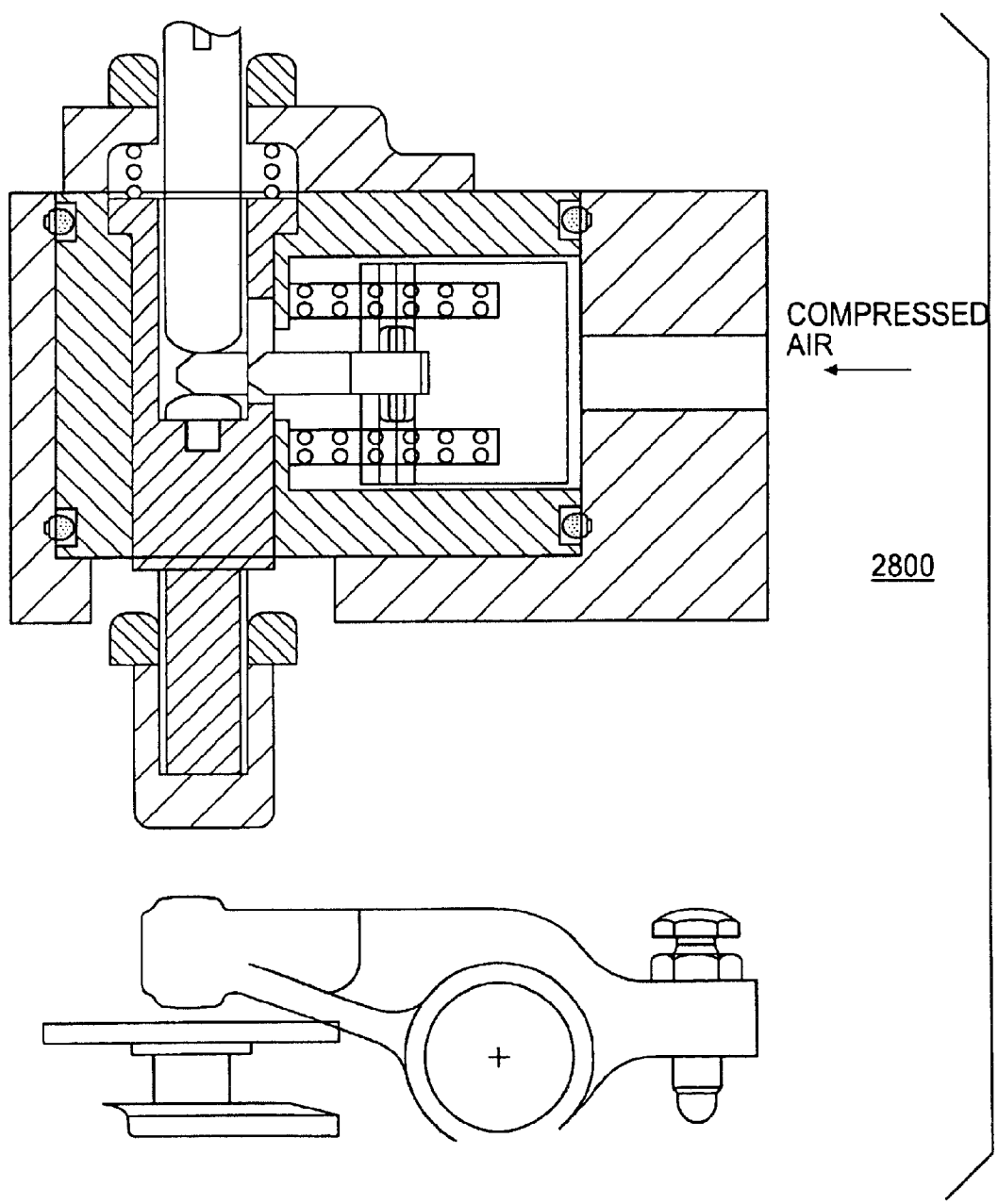
FIG. 38 is a schematic diagram of a valve actuation subsystem according to a sixteenth embodiment of the present invention.

In another embodiment of the present invention, the valve actuation subsystem 200 is a bleeder brake assembly 2800, as shown in FIG. 38, that is actuated by compressed air generated by the air compressor of the vehicle and that mechanically locks open at least one engine valve during braking. The bleeder brake assembly 2800 also provides cold startability aid during cold start cranking of the engine.

Compact Full-Cycle Bleeder Mechanism

Figure 40:
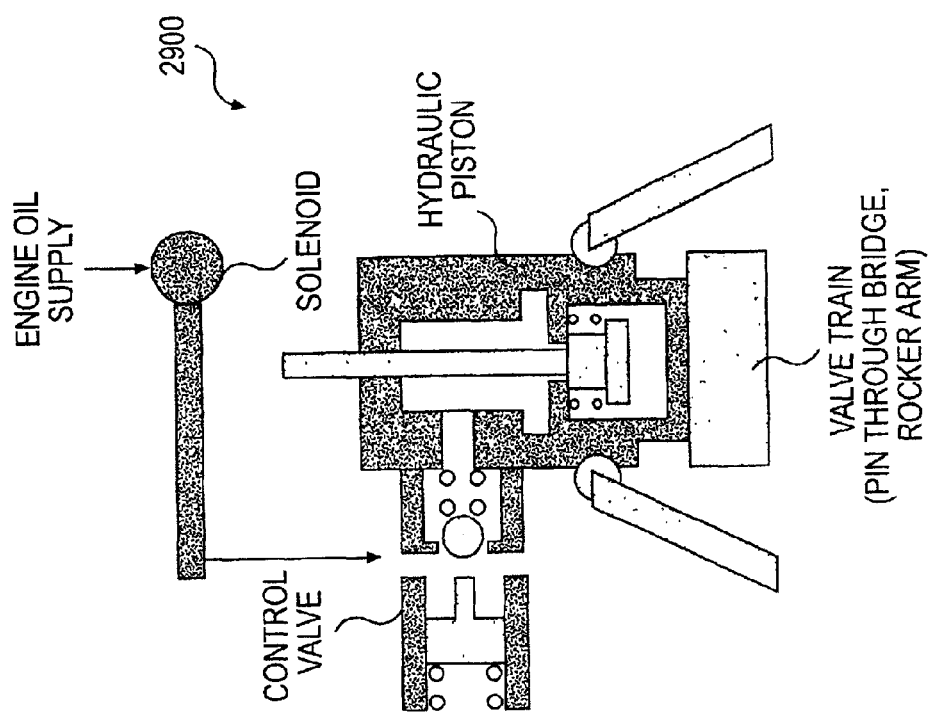
FIG. 40 is a schematic diagram of a valve actuation subsystem according to a eighteenth embodiment of the present invention.
Figure 39:
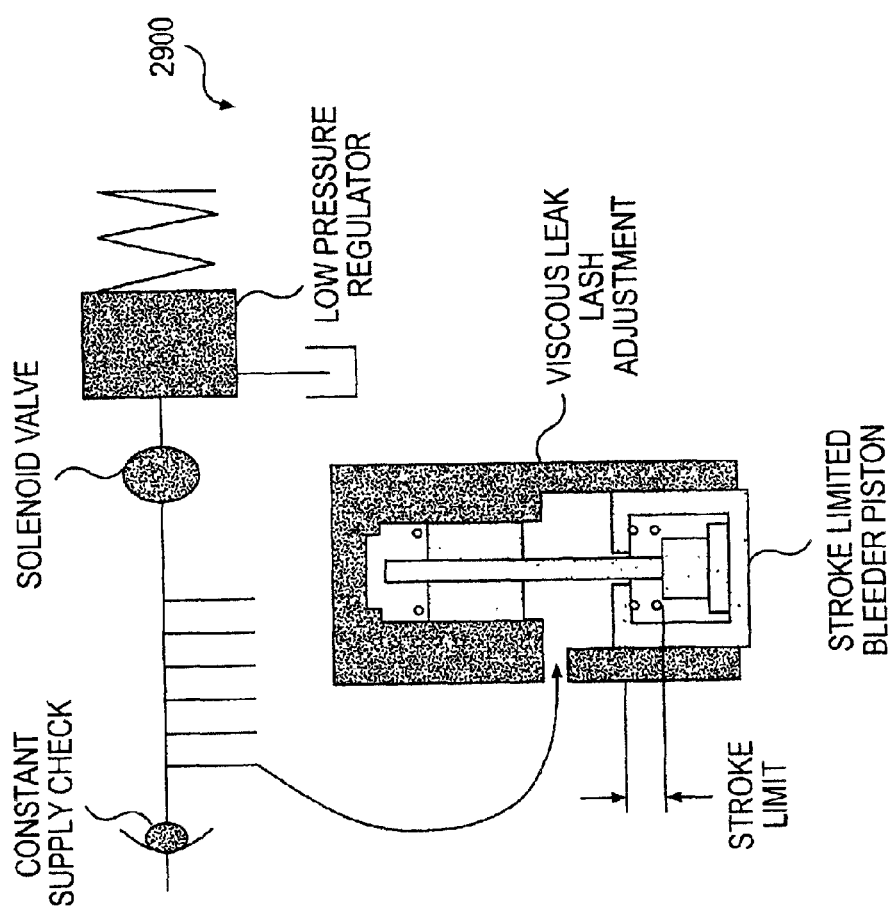
FIG. 39 is a schematic diagram of a valve actuation subsystem according to a seventeenth embodiment of the present invention.

In another embodiment of the present invention, the valve actuation subsystem 200 is a compact bleeder brake assembly 2900 with lash adjustment for accomplishing full-cycle bleeder brake operation, as shown in FIGS. 39 and 40.

Bleeder Brake System for Internal Combustion Engines (Full-Cycle Bleeder)

Figure 41:
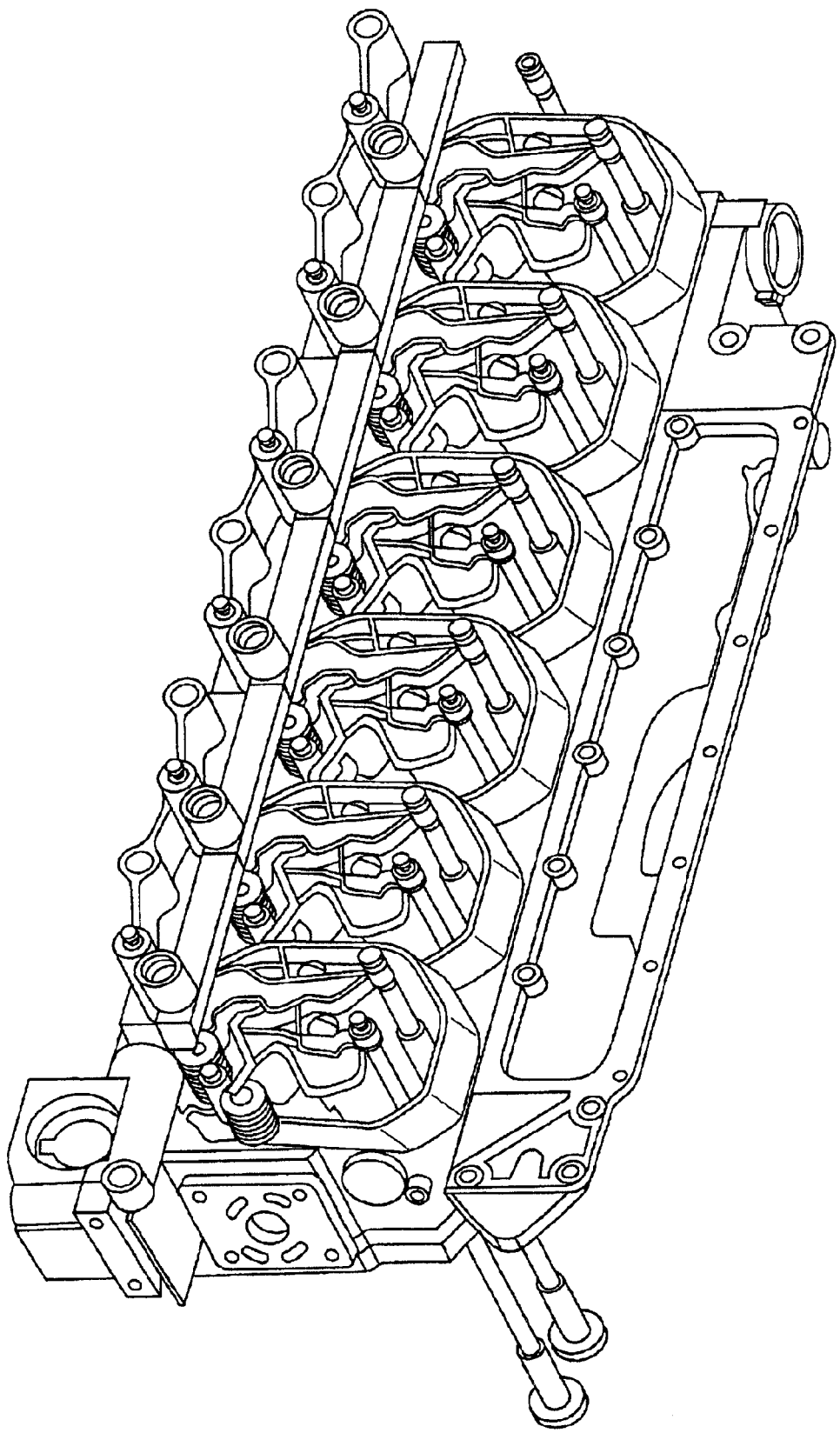
FIG. 41 is a schematic diagram of a valve actuation subsystem according to a nineteenth embodiment of the present invention.
Figure 42:
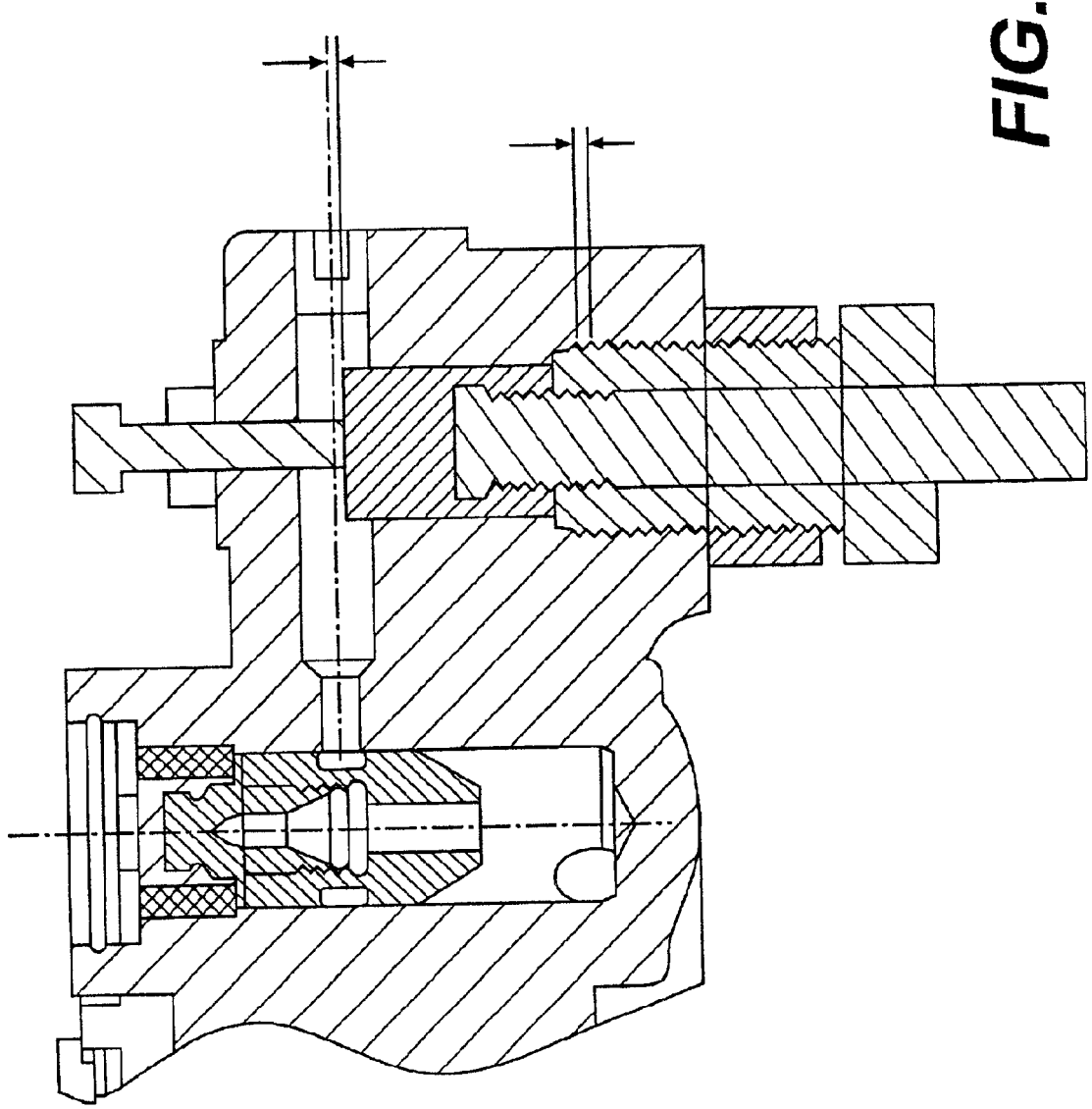
FIG. 42 is a schematic diagram of a brake housing for a valve actuation subsystem according to an embodiment of the present invention.

In another embodiment of the present invention, the valve actuation subsystem 200 is a bolt-on bleeder brake assembly 20100. The bleeder brake assembly 20100 includes a plurality of brake housing assemblies, a supply valve assembly, and an actuator piston assembly, as shown in FIGS. 41 and 42.

While this invention has been described in conjunction with specific embodiments thereof, it is evident that many alternatives, modifications and variations will be apparent to those skilled in the art. Accordingly, the preferred embodiments of the invention as set forth herein we intended to be illustrative, not limiting. Various changes may be made without departing from the spirit and scope of the invention as defined in the following claims.

What is claimed is:

1. An engine braking system for producing a bleeder braking event in a multiple cylinder engine, wherein each cylinder is connected to intake and exhaust manifolds, has an engine valve, and has a piston which reciprocates in the engine cylinder to provide intake, compression, combustion, and exhaust strokes, the engine braking system comprising:
   a hydraulic fluid source;
   a hydraulic valve;
   a first engine valve actuator operatively connected to a first engine cylinder;
   a second engine valve actuator operatively connected to a second engine cylinder;
   a hydraulic circuit connecting said hydraulic valve to said fluid source and to each of said first and second engine valve actuators; and
   means for controlling said hydraulic valve to cause each of said first and second engine valve actuators to actuate and hold open the engine valve during at least a substantial portion of the compression, combustion, and exhaust strokes.

2. The system of claim 1, wherein said fluid source comprises a high-pressure plenum located on the engine.

3. The system of claim 1, wherein each a said first and second engine valve actuators comprises:
   a piston housing;
   a piston adapted to move within said piston housing, wherein the hydraulic force created by the hydraulic fluid causes said piston to actuate and hold open the engine valve during the braking event; and
   a return spring, having a first end secured to said piston housing and a second end secured to said piston, wherein said return spring biases said piston away from the engine valve when the braking event is disabled.

4. The system of claim 3, wherein each of said first and second engine valve actuators further comprises means for limiting the stroke of said piston to a predetermined distance.

5. The system of claim 4, wherein the predetermined distance is adapted to produce a bleeder braking valve lift.

6. The system of claim 1, further comprising:
   means for regulating the pressure of at least one of the intake and exhaust manifolds and creating a force differential across the engine valve, said pressure regulating means comprising:
   a turbocharger connected to the intake and exhaust manifolds, wherein said turbocharger is adapted to change the flow of exhaust gases through the turbocharger; and
   a pressure regulation valve coupled to at least one of the intake and exhaust manifolds.

7. The system of claim 1, wherein said hydraulic valve comprises a first solenoid valve for receiving the hydraulic fluid from said hydraulic fluid source and supplying the hydraulic fluid to each of said first and second engine valve actuators during the braking event.

8. The system of claim 7, wherein said first solenoid valve comprises a two-way solenoid valve.

9. The system of claim 7, further comprising a second solenoid valve for releasing the hydraulic fluid from each of said first and second engine valve actuators when the braking event is disabled.

10. The system of claim 9, wherein said second solenoid valve comprises a two-way solenoid valve.

11. The system of claim 1, wherein said hydraulic valve comprises a three-way solenoid valve for supplying hydraulic fluid to each of said first and second engine valve actuators during braking and for releasing hydraulic fluid from each of said first and second engine valve actuator to disable the braking event.

12. The system of claim 1, wherein said hydraulic fluid source comprises a fuel injection system.

13. The system of claim 1, wherein said first and second engine valve actuators actuate and hold open the engine valve during at least a substantial portion of the compression, combustion, exhaust, and intake strokes.

14. A method for controlling a bleeder braking event in a multiple cylinder engine, wherein each cylinder is connected to intake and exhaust manifolds, has an engine valve, and has a piston which reciprocates in an engine cylinder to provide intake, compression, combustion, and exhaust strokes, the method comprising the steps of:
   supplying hydraulic fluid from a hydraulic fluid source to a hydraulic valve;
   selectively activating the hydraulic valve to communicate the hydraulic fluid to first and second engine valve actuators operatively connected to first and second engine cylinders;

actuating and holding open the engine valves corresponding to the first and second engine cylinders with the hydraulic force created by the hydraulic fluid communicated to the first and second engine valve actuators during at least a substantial portion of the compression, combustion, and exhaust strokes; and releasing the hydraulic fluid when the bleeder braking even is disabled.

* * * * *